United States Patent
Shefet et al.

(10) Patent No.: US 7,040,975 B2
(45) Date of Patent: May 9, 2006

(54) AUTOMATED SUPPLY, LOAD AND TAKE-AWAY SYSTEMS AND RELATED DEVICES AND METHODS FOR LENGTHS OF ELONGATED PRODUCT

(75) Inventors: Sarid M. Shefet, Cary, NC (US); Lawrence Alan Chandler, Raleigh, NC (US); John Michael Phillips, State Road, NC (US); Frank Michael Horvath, Jr., Harmony, NC (US); Richard Rodeheaver Hawkins, Raleigh, NC (US); Larry Jones, Garner, NC (US)

(73) Assignee: ConAgra Foods, Inc., Edina, MN (US)

( * ) Notice: Subject to any disclaimer, the term of this patent is extended or adjusted under 35 U.S.C. 154(b) by 0 days.

(21) Appl. No.: 10/172,331

(22) Filed: Jun. 13, 2002

(65) Prior Publication Data
US 2003/0171084 A1    Sep. 11, 2003

Related U.S. Application Data

(60) Provisional application No. 60/370,874, filed on Apr. 8, 2002, provisional application No. 60/362,375, filed on Mar. 7, 2002.

(51) Int. Cl.
*A22C 15/00* (2006.01)
(52) U.S. Cl. ............................... 452/51; 452/31
(58) Field of Classification Search ............... 452/30, 452/31, 35, 36, 37, 46, 47, 48, 49, 50, 51, 452/177, 179, 180, 181, 182, 183, 184; 99/352, 99/355, 443 C, 443 R, 483, 494
See application file for complete search history.

(56) References Cited

U.S. PATENT DOCUMENTS 2,697,850 A * 12/1954 Cross ........................ 452/47
3,022,745 A    2/1962 Roberts ..................... 104/99

(Continued)

FOREIGN PATENT DOCUMENTS

DE           3137276      *   4/1983

(Continued)

OTHER PUBLICATIONS

Article, "Continuous Process Systems", Alkar, http://www.alkar.com (date unavailable; believed to be dated before Mar. 1, 2002) pp. 1-3.

(Continued)

*Primary Examiner*—Peter M. Poon
*Assistant Examiner*—David J. Parsley
(74) *Attorney, Agent, or Firm*—Myers Bigel Sibley & Sajovec PA

(57) ABSTRACT

Methods, systems, and associated devices for supplying support members to a product loading station, loading, and automatically removing loaded members therefrom include: (a) advancing in spaced-apart relationship, a plurality of carrier members having opposing first and second ends and an associated width and length, along a selected travel path to a loading station; (b) straddling elongated product over each respective carrier member at the loading station so that portions of the elongated product are serially draped over the corner member along a length thereof, the straddling being carried out so that certain lengths of the elongated product hang from opposing sides of the carrier member; and (c) advancing the carrier members loaded with the straddled product downstream of the loading station.

35 Claims, 32 Drawing Sheets

U.S. PATENT DOCUMENTS

| | | | |
|---|---|---|---|
| 3,533,495 A | 10/1970 | Wallace | |
| 3,964,129 A | 6/1976 | Townsend | |
| 4,060,875 A | 12/1977 | Gosling et al. | |
| 4,079,666 A | 3/1978 | Plemons et al. | |
| 4,112,546 A | 9/1978 | Muller | |
| 4,129,923 A * | 12/1978 | Hoegger | 452/46 |
| 4,218,003 A * | 8/1980 | Plewa et al. | 452/31 |
| 4,565,282 A | 1/1986 | Olsson et al. | |
| 4,582,047 A | 4/1986 | Williams | |
| 4,612,684 A * | 9/1986 | Kollross | 452/35 |
| 4,644,607 A | 2/1987 | Sziede | 17/45 |
| 4,682,385 A | 7/1987 | Kasai et al. | |
| 4,761,854 A | 8/1988 | Schnell et al. | 17/1 R |
| 4,766,645 A | 8/1988 | Lamartino et al. | |
| 4,880,105 A * | 11/1989 | Kasai et al. | 198/465.4 |
| 4,997,365 A | 3/1991 | Lanham | |
| 5,049,108 A | 9/1991 | Staudenrausch | |
| 5,078,120 A | 1/1992 | Hwang | |
| 5,098,332 A * | 3/1992 | Handel | 452/46 |
| 5,277,301 A | 1/1994 | Fenty | |
| 5,354,229 A * | 10/1994 | Markwardt et al. | 452/51 |
| 5,354,230 A | 10/1994 | McFarlane et al. | 452/51 |
| 5,480,346 A | 1/1996 | Kasai et al. | |
| RE35,259 E | 6/1996 | Williams | |
| 5,788,563 A | 8/1998 | Nakamura et al. | |
| 5,830,050 A * | 11/1998 | Nakamura et al. | 452/31 |
| 5,942,265 A | 8/1999 | Roberds et al. | |
| 6,066,035 A * | 5/2000 | Hergott et al. | 452/31 |
| 6,071,186 A | 6/2000 | Shibata et al. | |
| 6,213,368 B1 * | 4/2001 | Vermeer et al. | 226/104 |
| 6,277,018 B1 * | 8/2001 | Cody et al. | 452/51 |
| 6,468,143 B1 * | 10/2002 | White et al. | 452/32 |
| 6,523,462 B1 | 2/2003 | Johnson et al. | 99/443 C |
| 2003/0171086 A1 | 9/2003 | Shefet et al. | 452/177 |
| 2003/0171088 A1 | 9/2003 | Shefet et al. | 452/187 |
| 2003/0190382 A1 | 10/2003 | Shefet et al. | 425/32 |

FOREIGN PATENT DOCUMENTS

| | | | |
|---|---|---|---|
| EP | 0399582 | * | 1/1990 |
| FR | 2.088.622 | | 4/1970 |

OTHER PUBLICATIONS

Article, "Batch Ovens", Alkar, http://www.alkar.com (date unavailable; believed to be dated before Mar. 1, 2002) pp. 1-3.

Brochure, "Fessmann Turbomat 7000: Industrial Smoking and Cooking", Fessman Group (date unavailable; believed to be dated before Mar. 1, 2002) pp. 1-8.

Brochure, "Fessmann Smoking and Cooking Cooling", Fessman Group (date unavailable; believed to be dated before Mar. 1, 2002) pp. 1-8.

Brochure, "Fessmann Transfer 4000: Continuous Smoking, Cooking and Cooling", Fessman Group (date unavailable; believed to be dated before Mar. 1, 2002) pp. 1-9.

Pictures of the inside of a conventional prior art oven from Alkar.

* cited by examiner

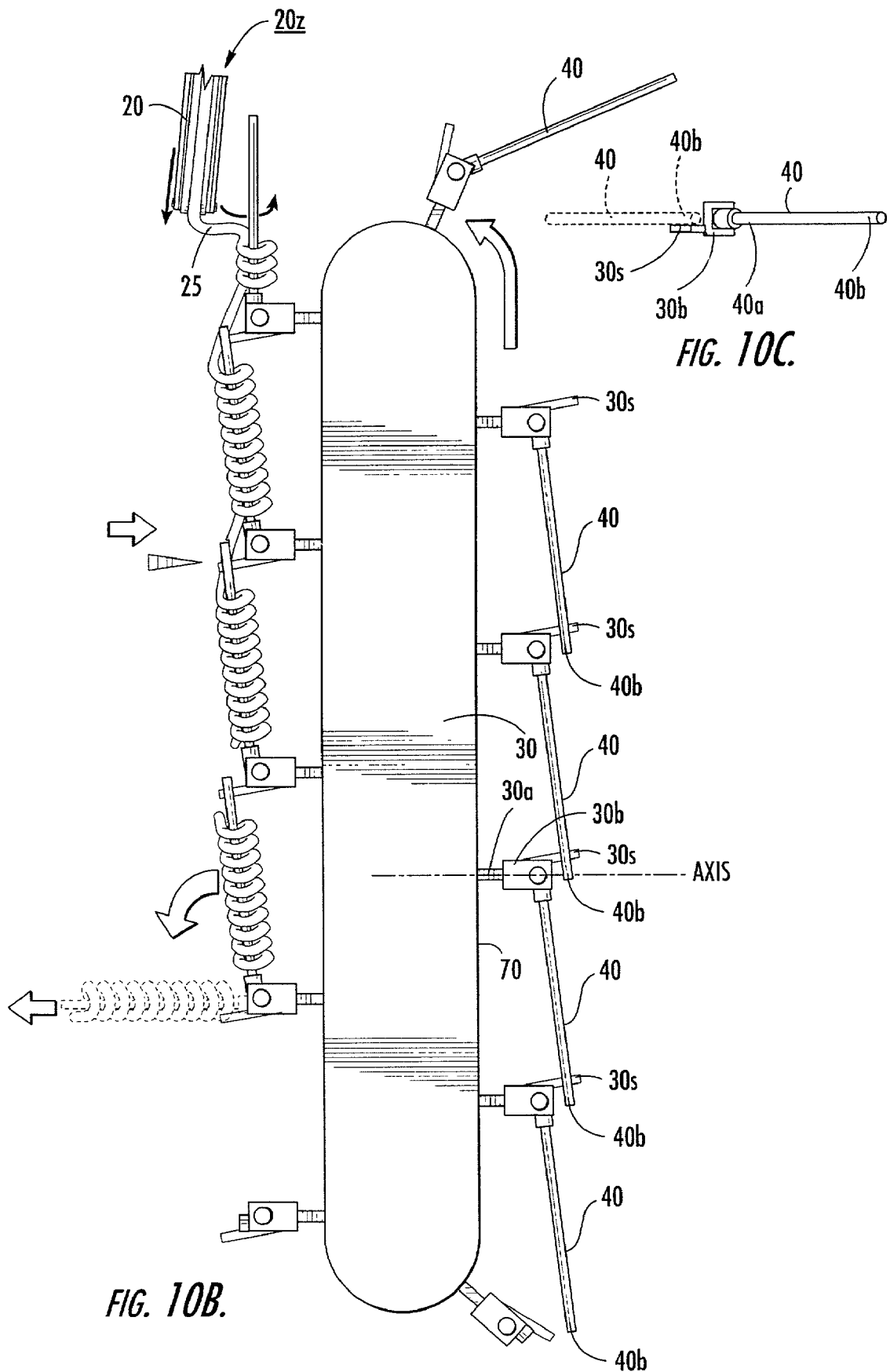

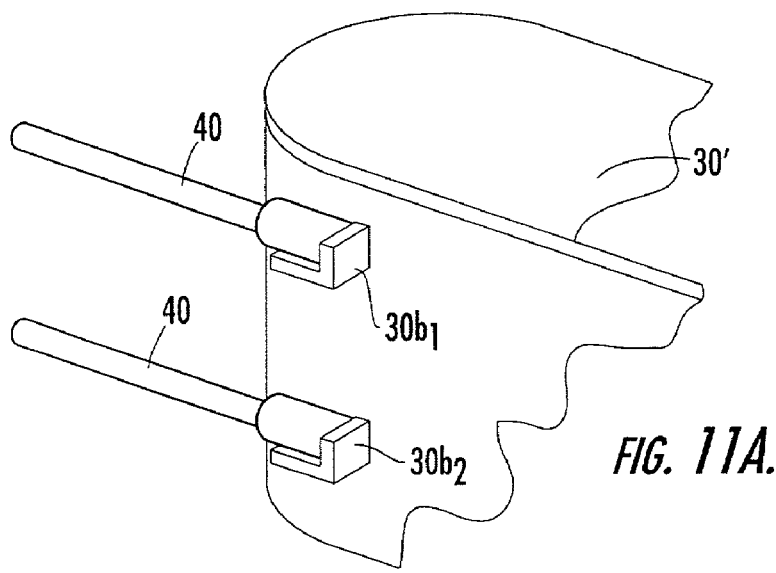
FIG. 11A.
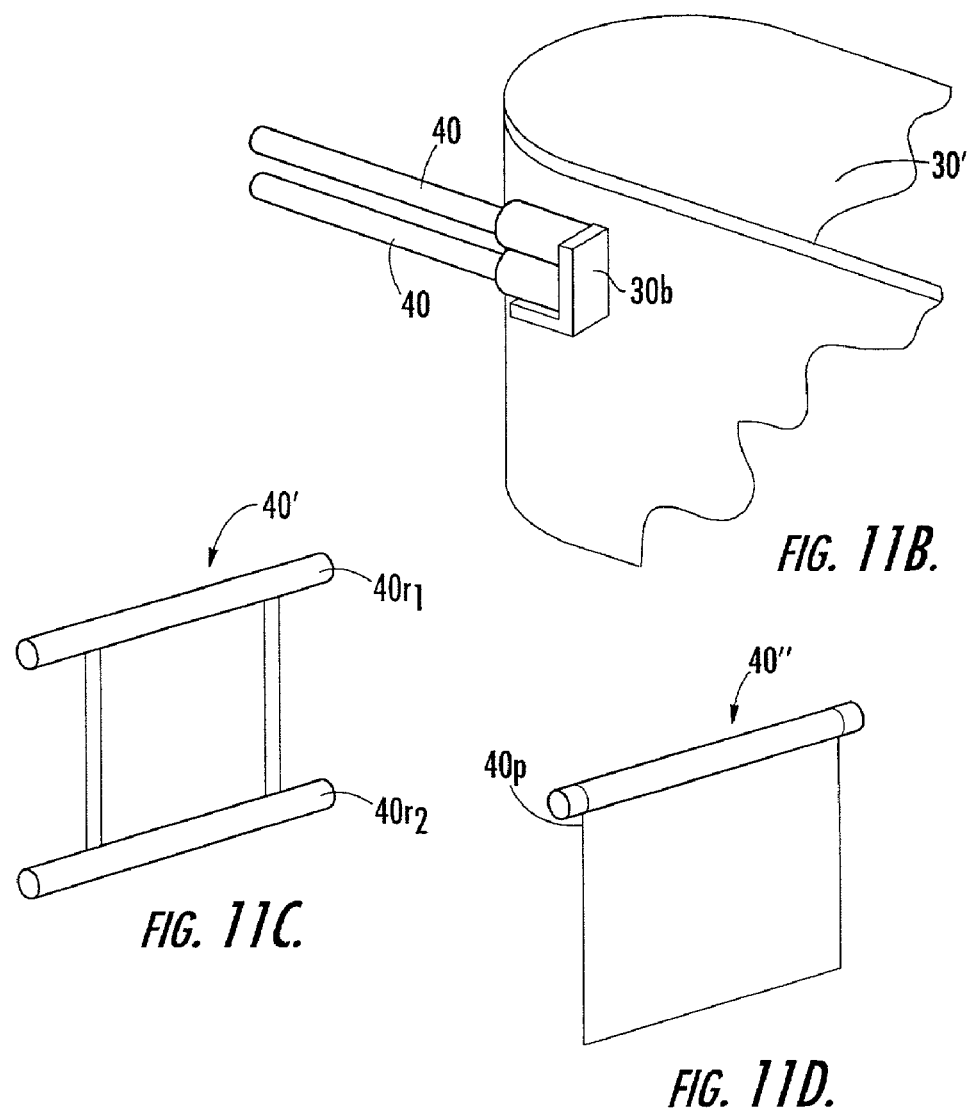
FIG. 11B.
FIG. 11C.
FIG. 11D.

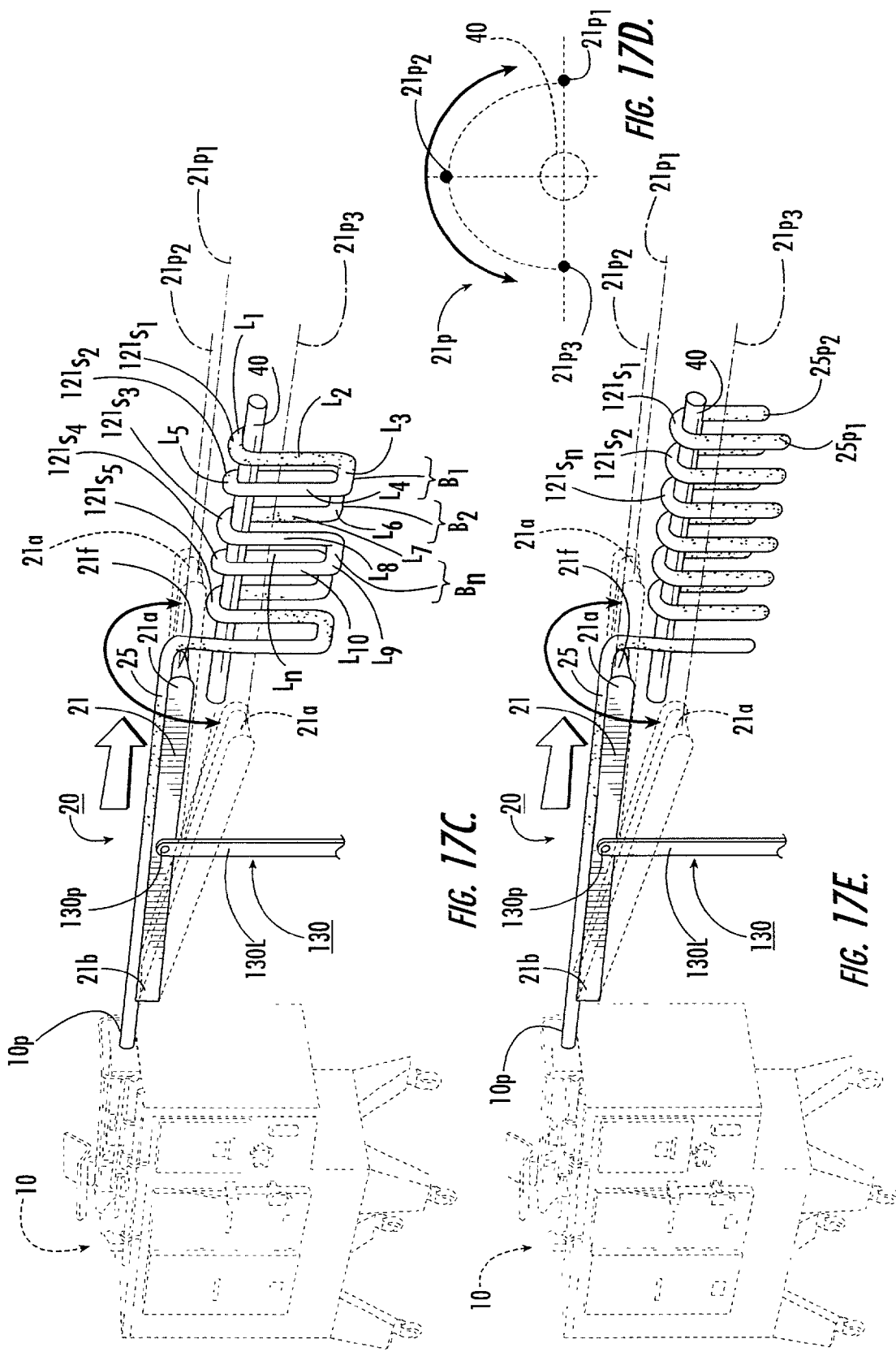

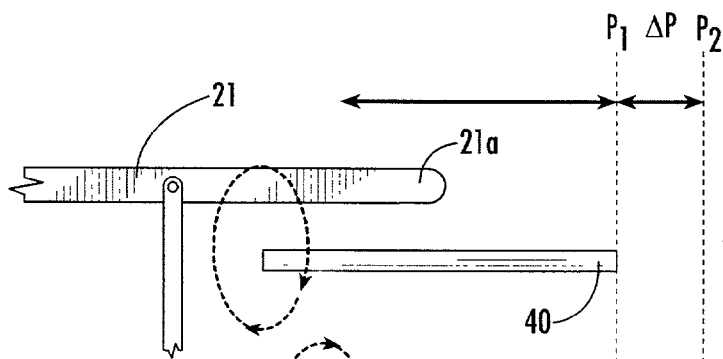
FIG. 18A.
FIG. 18B.
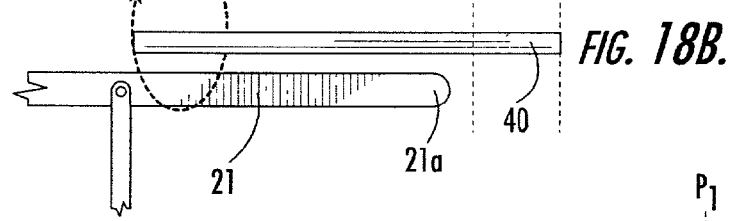
FIG. 18C.
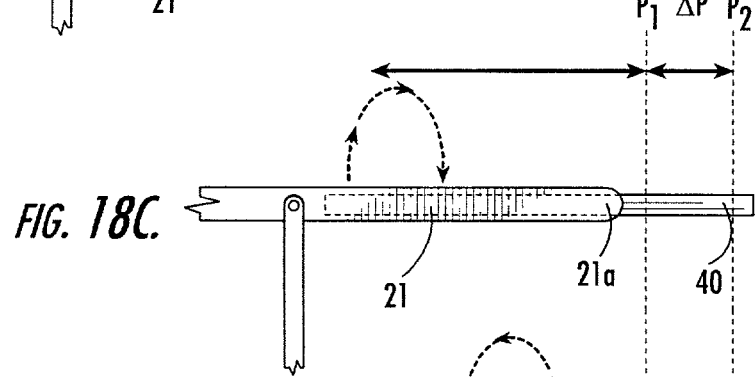
FIG. 18D.
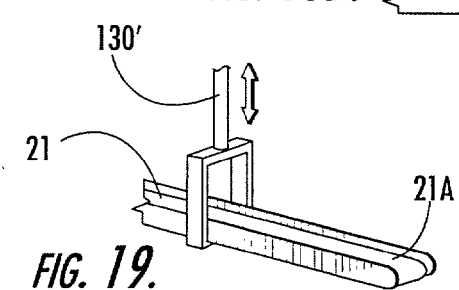
FIG. 19.
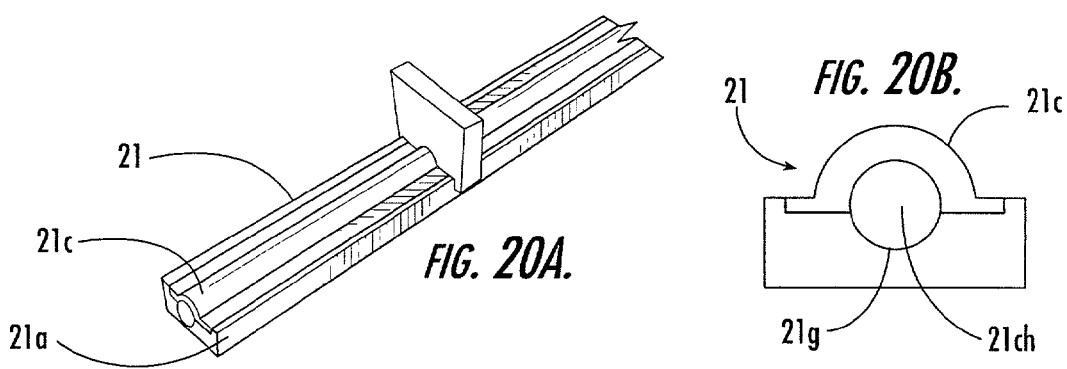
FIG. 20A.
FIG. 20B.

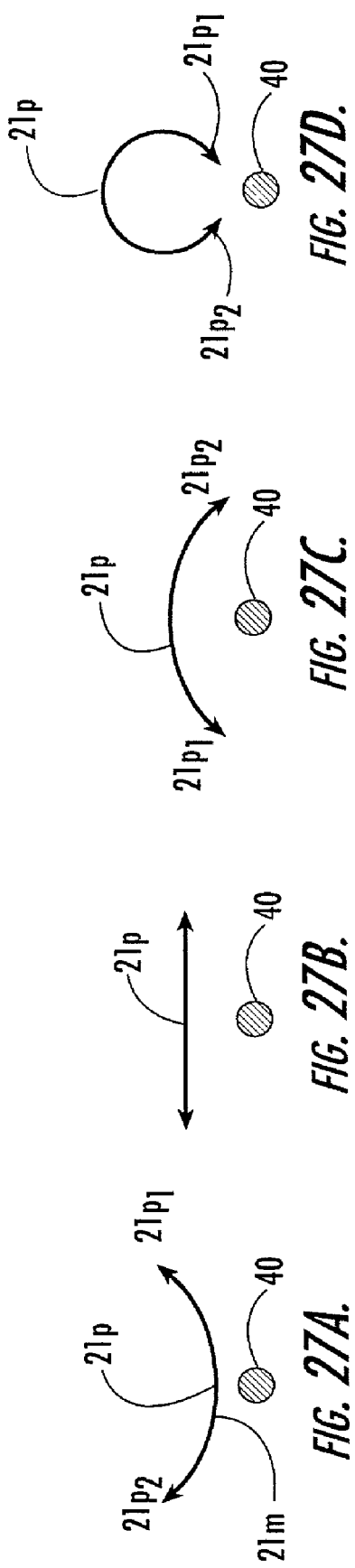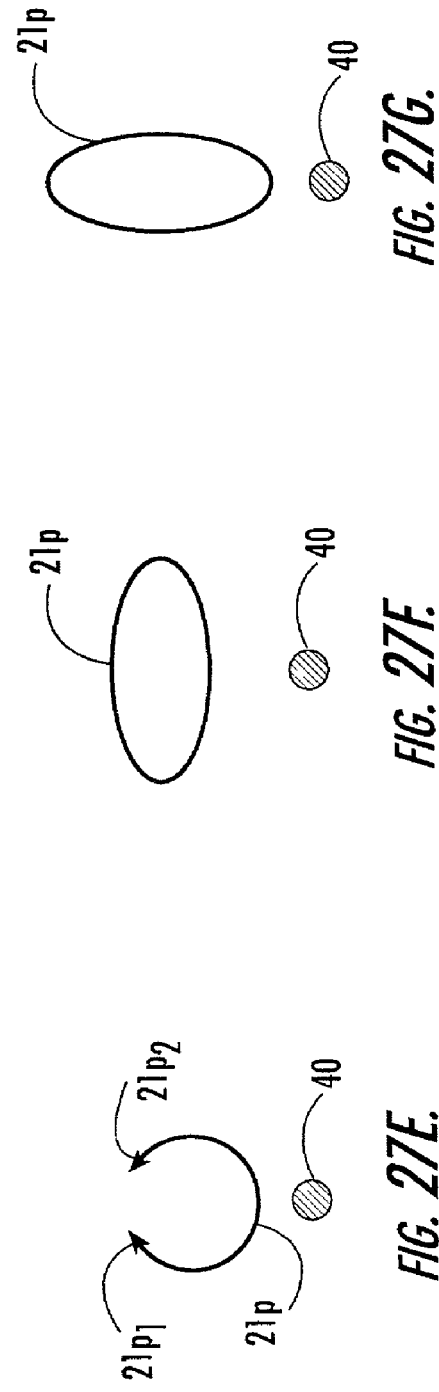

US 7,040,975 B2

AUTOMATED SUPPLY, LOAD AND TAKE-AWAY SYSTEMS AND RELATED DEVICES AND METHODS FOR LENGTHS OF ELONGATED PRODUCT

RELATED APPLICATIONS

This application claims priority from U.S. Provisional Patent Application Ser. No. 60/362,375 filed Mar. 7, 2002, and U.S. Provisional Patent Application Ser. No. 60/370,874 filed Apr. 8, 2002, the contents of which are hereby incorporated by reference as if recited in full herein.

FIELD OF THE INVENTION

The present invention relates to movement or transfer of product within processing facilities and is particularly suitable for loading and automatically loading and positioning rods or product support members in food preparation and production systems that include extruders or stuffers.

BACKGROUND OF THE INVENTION

Conventionally, extruded or stuffed food products such as pasta, dough, and meats such as hot dogs, links, or sausages, can be processed so that the desired food material is extruded or mixed and prepared, then propelled through a "stuffer machine" that includes a stuffing nozzle, extrusion machine, or co-extrusion machine. In operation, in certain food items, as the food moves through the stuffing nozzle or extrusion head, a natural or synthetic casing is disposed about and/or deposited or wrapped around the external surface of the food material to form a continuous length of encased elongated food product. To form certain products (such as hotdogs and sausages), the casing can be twisted, tied, nipped, and/or crimped at certain intervals, forming a chain-like string or strand of encased food product. Extruders and co-extruders are available from various commercial manufacturers including, but not limited to, Townsend Engineering Co., located in Des Moines, Iowa. Stuffers are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill. Exemplary stuffer and/or linker apparatus are also described in U.S. Pat. Nos. 5,788,563; 5,480,346; 5,049,108; and 4,766,645. The contents of these patents are hereby incorporated by reference as if recited in full herein.

After stuffing or extruding, the encased elongated food product is expelled from the stuffer or extruder via a material discharging exit port. FIG. 1A illustrates a conventional stuffer 10 and stuffer material discharge port 10p. The stuffer discharge port 10p is positioned proximate a "linker" or looping and transferring device 15 (FIG. 1B) that rotates an endless chain of hooks 15h about the discharge port 10p. Generally described, the material discharge port 10p is configured so that, during operation, the product is expelled and directed so that the traveling hooks, which serially travel to be adjacent the discharge port 10p, catch a portion of the length of the product, with the result that the product forms loops on the hooks at certain intervals. More specifically, certain devices are configured so that the hooks 15h travel to the discharge port 10p and the discharge port 10p discharges into a downwardly inclined channel that directs the elongated food downward and, as the hooks turn to face the discharged food, the hooks sequentially individually reach out to grasp the product at certain intervals. Other devices propel the encased product onto hooks that rotate thereabout (typically under) to catch the product at certain intervals to transfer the encased material onto the transfer device. The hooks 15h then suspend the product in a looped configuration (hanging in a vertical orientation) as shown in FIG. 1B, with each hook 15h supporting a single loop of product.

FIG. 1C illustrates a slightly different prior art stuffer 10 and associated linker 15 with hooks that are oriented to rotate in a different plane from that shown in FIG. 1A (i.e., a vertical plane rather than a horizontal plane). In addition, in this prior art stuffer/linker, the discharge port 10p terminates into a short expanse of tubing that forms a rotating discharge nozzle 10r. The rotating nozzle 10r, again, propels the extruded encased product onto the hooks 15h.

After the product is suspended on the hooks 15h, a rod or stick is typically manually inserted through the suspended looped product above the hooks and below the upper looped portion of the food, and the product is manually lifted up and off the hooks 15h and transferred to a trolley, oven, or other food processing station.

In view of the foregoing, there is a need to provide automated processing systems that can improve the production process to facilitate the loading of food receiving members such as sticks and/or reduce the need for manual labor to load sticks.

SUMMARY OF THE INVENTION

Certain embodiments of the present invention provide automated loading, positioning and removal systems of carrier members with elongate product that can automate the loading of empty and/or the removal or subsequent downstream transfer of carrier members loaded with elongate product. The carrier members may be elongated members, such as bars, rods or sticks. The system may employ carrier members that are the same or different configurations, sizes, or lengths. The system may also include a packing mechanism to arrange the suspended elongate product so that suspended regions reside more closely together on the carrier member, thereby providing a high-density product distribution arrangement.

In particular embodiments, the carrier members can be food support members that are portable and adapted to hold, carry, and transfer, away from the loading station (such as proximate an extruder/stuffer), an elongated, extruded, and/or stuffed product. The food support members can be used to directly capture and hold the product at the extruder/stuffer discharge port and then to deliver the product to a trolley or desired workstation or other desired equipment or component.

In certain embodiments, the positioning, advancing and/or removal systems provided by the present invention can be configured with a carousel portion that can substantially continuously provide a series of unloaded (empty) rods to a loading station and then automatically take-away the rods from the loading station when they are loaded with straddled, cut, bights or looped product. The positioning and removal systems may be configured as endless systems with a fixed travel path associated with a predetermined travel track that, in operation, continuously serially advances the rods.

Certain embodiments are directed to methods for supplying and loading carrier members at a loading station comprising a winding mechanism with an associated winder arm. The method includes: (a) advancing in spaced-apart relationship, a plurality of carrier members having opposing first and second ends and an associated width and length, along a selected travel path to a loading station; (b) presenting, in serial order, the carrier members to the loading station in a substantially horizontal orientation; (c) discharging elongated product from a winder arm that moves in a selected pattern about the carrier member at the loading station; (d) straddling elongated product over each respective carrier member at the loading station responsive to the discharging step so that portions of the elongated product are serially draped over the carrier member along a length thereof, the straddling being carried out so that certain lengths of the elongated product hang from opposing sides of the carrier member; and (e) advancing the carrier members loaded with the straddled product away from the loading station along the selected travel path to cause the loaded members to travel downstream of the loading station.

The arm can be configured to repetitively translate in a desired loading pattern so as to allow the elongated item(s) to drape over the carrier member in straddled arrangements such as in loops, bights, or discrete lengths.

In certain embodiments, the winder arm can be configured to move a sufficient vertical and/or horizontal distance so as to travel above and below and/or side to side about a suitably aligned rod or carrier member that can be automatically located in the loading zone during the transfer or loading by the automated positioning and takeaway system.

The arm may be configured to move one or more of: up and down, forward and rearward, and/or back and forth across the aligned carrier member. In certain other embodiments, the arm can rotate in a substantially circular, oval, elliptical, or other desired motion. The generated motion may be a closed loop path that has two different directions of travel, such as a motion that includes both x and y axis directional components. The rod or food transfer or support member may be configured to automatically unidirectionally (linearly) translate forward as the arm translates (moved either forward or backward toward or away from the stuffer discharge port) so that the automated winder can wrap or drape discrete lengths or continuous lengths of bights or loops of the released product starting at one end portion of the carrier member and terminating at the opposing end portion so that a major portion, and in certain embodiments, substantially the entire length (or a desired length), of the carrier member is covered with a discontinuous lengths of discrete straddled product and/or a continuous length of straddled, draped and/or looped product.

In certain embodiments, the winder can load discontinuous lengths of product, shown as a plurality of cut lengths of elongated product that are straddled onto and/or draped over the support member. In other embodiments, the winder loads a continuous length of product onto the carrier member. Combinations of the loading techniques can also be employed. The product can be loaded onto the support member such that the strands have substantially the same suspended lengths, or to have varying lengths, along the same or different rods or support members.

The rod or carrier member can be one, or more, portable stick members, upon which, the wrapped continuous length product can be suspended in a looped or straddled arrangement, each loop or draped straddle segment can have a substantially uniform length or different lengths.

Other embodiments are directed to systems for supplying support members to a product loading station, loading the members, and automatically removing loaded support members therefrom. The systems include: (a) advancing means for advancing, in serial order and in spaced-apart relationship, a plurality of elongated support members having opposing first and second ends and an associated length, along a selected travel path to a loading station; (b) loading means for straddle loading each of the elongated support members individually with a respective length or lengths of elongated product formed into multiple loops, bights, or a plurality of discrete lengths of elongated product at the loading station; (c) advancing means for advancing the loaded elongated support members away from the loading station along the selected travel path to cause the loaded elongated support members to travel downstream of the loading position; and (d) packing means for moving adjacent segments of straddled product closer together on the carrier member to thereby allow increased density loading of the product on the carrier member.

In other embodiments, an automated support member supply, load, and removal system includes a supply and removal system that includes a central platform member; a travel track mounted to the platform member that, in operation, is configured to advance continuously about an endless path about the platform member; and a plurality of mounting brackets, each individually mounted to said travel track in spaced apart intervals, the mounting brackets being configured to travel along the endless path. The system also includes a plurality of elongated support members, each having an end portion configured to attach to a respective mounting bracket of the supply and removal system. The system additionally includes a loading station positioned in cooperating alignment with the supply and removal system, and the loading station comprising. The loading station includes a winder arm with a discharge end portion, the winder arm defining a floor for directing elongated food product to travel thereover and exit at the discharge end portion; and a winding mechanism operably associated with the winder arm. In operation, the winding mechanism is configured to move the winder arm in a predetermined travel path.

Additional embodiments are directed to an automated food handling system. The system includes: (a) a plurality of elongated support members having a length and sized and configured to hold multiple loops, bights of an elongated food product thereon and/or multiple discrete lengths of draped elongated product thereon; (b) an automated winder with a winder arm configured to be cooperatively positioned and aligned with the discharge port of an extrusion and/or stuffer device configured to discharge-elongated food product therefrom, the automated winder comprising; and (c) an automated positioning and advancing system for substantially continuously presenting and positioning in serial order a respective one of the plurality of elongated support members to the winding arm so that the winding arm is positioned in spaced apart cooperating alignment with the elongated support member and is able to load the support members with a plurality of loops or discrete lengths of the elongated food product.

The automated winder can include: (a) an elongated arm having an associated length that is about equal to or greater than the length of the elongated support member, said elongated arm having opposing first and second end portions, wherein, in position, said first end portion is adapted to receive the elongated product thereon from the extrusion and/or stuffer device, wherein said second end portion is configured to release the elongated product therefrom after the product travels greater than a major portion of the length of the arm in a direction that is away from the extrusion and/or stuffer device; and (b) a winding mechanism attached to said elongated arm, said winding mechanism being configured to cause said elongated arm to travel repetitively in a desired motion so that, in operation, the winding mechanism causes the elongated product to individually travel about one of the support members as it is released from the second end portion of the arm.

In certain embodiments, the automated positioning and advancing system is configured to continuously sequentially and serially present the plurality of support members so that each is aligned with the arm of the winder for a desired interval of time so as to successively substantially continuously transfer and wind elongated product onto each of the plurality of support members.

In certain embodiments, the selected travel path defined by the positioning and advancing system includes a linear portion, and the loading step is carried out while the respective elongated support member being loaded is continuously advancing forward along the linear portion of the selected travel path. The travel path may also include a curvilinear portion.

Still other embodiments are directed to an automated loading system. The system includes: (a) a plurality of elongated support members having a length and sized and configured to hold multiple loops or a plurality of discrete lengths of an elongated product thereon; (b) an automated winder configured to be cooperatively positioned and aligned with the discharge port of an extrusion/stuffer device configured to discharge-elongated product therefrom, the automated winder comprising; and (c) an automated apparatus for continuously presenting and positioning in serial order a respective one of the plurality of elongated support members to the winding arm so that the winding arm is positioned in spaced apart cooperating alignment with the elongated support member and is able to load the support members with a plurality of loops of the elongated product. The automated winder includes: (a) an elongated arm having an associated length that is about equal to or greater than the length of the elongated support member, said elongated arm having opposing first and second end portions, wherein, in position, said first end portion is adapted to receive an elongated product thereon from the extrusion device, wherein said second end portion is configured to release the elongated item therefrom after the item travels greater than a major portion of the length of the arm in a direction that is away from the extrusion/stuffer device; and (b) a winding mechanism attached to said elongated arm, said winding mechanism being configured to cause said elongated arm to travel repetitively in a desired motion so that, in operation, the winding mechanism causes the elongated product to wind serially about one of the support members as it is released from the second end portion of the arm.

In certain embodiments, the automated apparatus continuously translates the elongated support member away from the extrusion/stuffer device during operation so as to distribute multiple loops or bights or a plurality of discrete lengths of suspended product over a desired length of the support member.

In particular embodiments, the carrier member is linearly translated forward away from the extrusion or stuffer device during loading so as to receive the wound product so that it is distributed over a desired length of the support member. The wound product may be arranged in substantially uniform looped or draped lengths of product hung or suspended from the carrier member. The system may be arranged so that over a desired time period, the winder is substantially continuously operated to load a plurality of support members that are serially aligned with the arm for a desired interval of time so as to successively transfer and wind elongated product thereon.

Further, in certain embodiments, the carrier member(s) is a stick or rod that can mount to conventional trolleys, rails, conveyors, railcars, drive tracks, and/or be used to support the elongated product at and/or through storage and/or the next active workstation that may be an oven, a smoker, a curer, packaging or other food preparation and/or processing station.

These and other objects and aspects of the present invention are explained in detail in the specification set forth below.

BRIEF DESCRIPTION OF THE DRAWINGS

FIG. 10B is a schematic top view of an alternative configuration of an automated positioning and removal system for supplying a continuous supply of empty rods for loading according to embodiments of the present invention.

FIG. 10C is a side view of a portion of a mounting configuration for a support member shown in FIG. 10B according to embodiments of the present invention.

FIG. 11A is a perspective view of a portion of an apparatus that can hold, advance, and concurrently position pairs of elongated support members according to embodiments of the present invention.

FIG. 11B is a perspective view of a portion of an apparatus that can hold, advance, and concurrently position pairs of elongated support members according to other embodiments of the present invention.

FIG. 11C is a perspective view of another alternative configuration of an elongated support member according to embodiments of the present invention.

FIG. 11D is a perspective view of an additional alternative configuration of an elongated support member according to embodiments of the present invention.

FIG. 17C is a side view of a portion of an automated winder similar to that shown in FIG. 17A illustrating a different winding pattern according to embodiments of the present invention.

FIG. 17D is a schematic illustration of an exemplary motion pattern of the arm of the automated winder of FIG. 17C according to embodiments of the present invention.

FIG. 17E is a side view of a portion of an automated winder similar to that shown in FIGS. 17A and 17C illustrating yet another different winding pattern according to embodiments of the present invention.

FIG. 18A is a schematic illustration of a portion of the automated winder illustrated in FIG. 17A showing the winder arm above the loading stick or receiving member.

FIG. 18B is a schematic illustration of a portion of the automated winder illustrated in FIG. 18A showing the winder arm below the loading stick or receiving member.

FIG. 18C is a schematic illustration of a portion of the automated winder illustrated in FIG. 17C showing the winder arm at a first position with respect to the loading stick or receiving member.

FIG. 18D is a schematic illustration of a portion of the automated winder illustrated in FIG. 18C showing the winder arm at a second position with respect to the loading stick or receiving member.

FIG. 19 is a partial perspective view of a portion of the winder arm of the winder of FIG. 17A with the winding mechanism attached above the winder arm according to embodiments of the present invention.

FIG. 20A is a top perspective view of a portion of a winder arm illustrating an enclosed chute or channel according to embodiments of the present invention.

FIG. 20B is an end view of the winder arm shown in FIG. 20A.

FIGS. 27A–27G are schematic front views of illustrations of exemplary winding patterns that may be used to straddle load, wrap, or position product onto a receiving member according to embodiments of the present invention.

DESCRIPTION OF EMBODIMENTS OF THE INVENTION

Figure 1A:
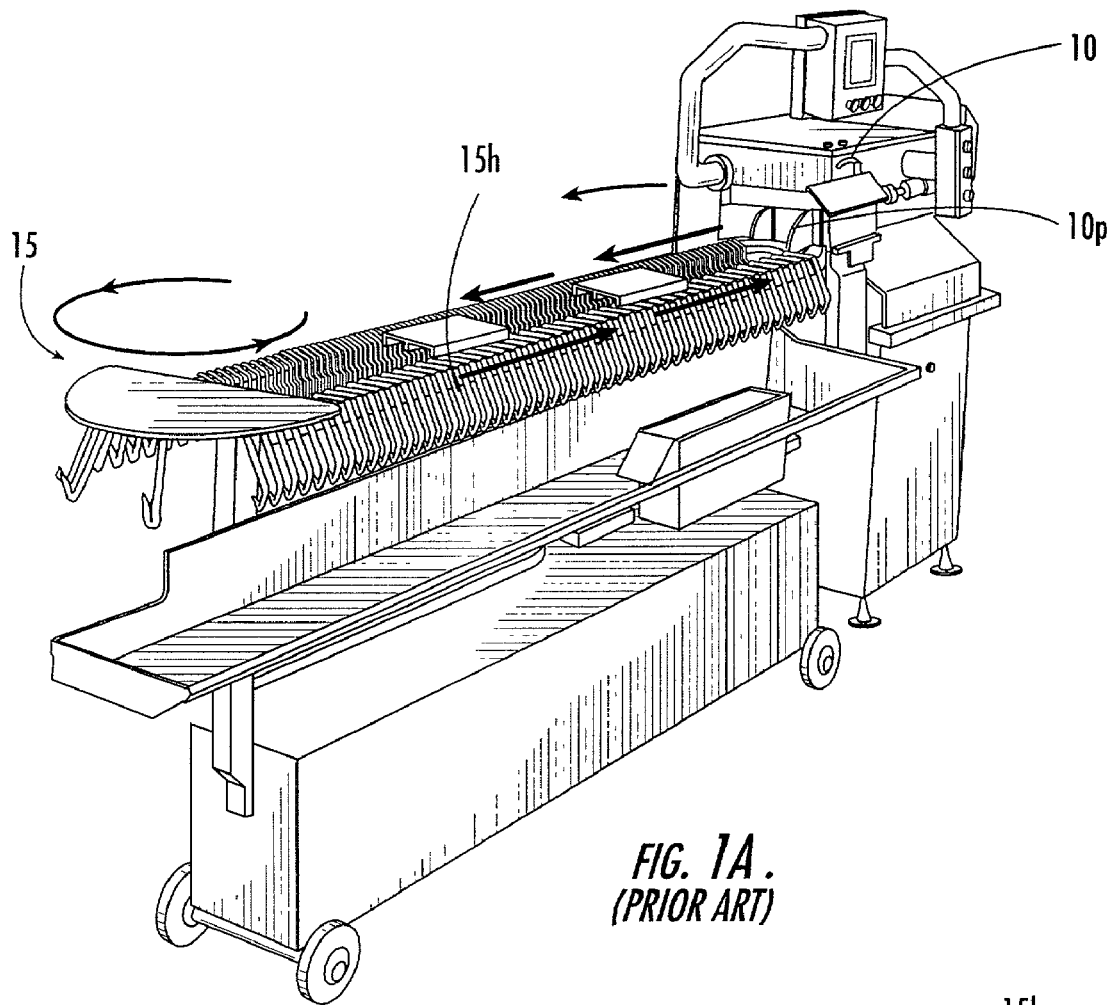
FIG. 1A is a perspective view of a prior art extruded food stuffer and associated linker or transferring and looping device.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. The sequence of operations (or steps) is not limited to the order presented in the claims unless specifically indicated otherwise. Where used, the terms "attached", "connected", "contacting", and the like, can mean directly or indirectly, unless stated otherwise.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The automated apparatus, systems and methods of the present invention may be particularly suitable to provide a substantially continuous supply of empty food support members such as rods for automated loading with elongated food items. When "loaded," the support members or rods can support multiple draped lengths of food as the food is transported downstream onto a trolley, car, track, or the next desired workstation and/or for storage or in an in-process queue. As used herein, the terms "support member" or "transfer support member" are used interchangeably with the term "carrier member." The support member 40 (FIG. 2A) may be elongated and can have any suitable configuration with a length sufficient to hold the desired amount of product thereon. Examples of elongated support members include, but are not limited to, bars, rods, or vertically spaced connected or independent pairs of bars or rods. The support member may be a substantially straight elongated rod or bar having a circular cross-section with a non-disrupted or continuous outer perimeter surface or may be otherwise configured as will be discussed further below. However, it will be appreciated by those of skill in the art that the present invention encompasses a number of different configurations that can act as suitable support members and the present invention is not limited to the embodiments described herein. In addition, in operation, a plurality of elongated support members, of the same or different configurations, may be sequentially serially loaded and removed from the automated positioning apparatus. The product may be loaded in substantially even lengths of loops or in uneven lengths of loops, or combinations thereof, over each or particular ones of the support members.

Examples of elongated food items include, but are not limited to, elastic or partially elastic food items such as cheese (e.g., mozzarella strands), dough (for incubation), pasta, meat sticks or strands, licorice or other strands of candy, and meat products. Of course, the processing system can be configured to wind or transfer other items. For example, other elongated products include candles, ropes, cables, wires, hose, tubing, and the like.

In certain embodiments, the present invention is used to transfer and load a length of an elongated extruded product held in a casing onto a support member. The casing can be any suitable casing (edible or inedible, natural or synthetic) such as, but not limited to, collagen, cellulose, plastic, elastomeric or polymeric casing. The elongated product can be an elongated meat product. Exemplary meat products include, but are not limited to, strands of meat (that may comprise pepperoni, poultry, and/or beef or other desired meat), processed meat products such as strand(s) or continuous lengths of meat sticks (including whole or partial meat mixtures), sausages, hotdogs, and the like. The term "continuous" is used interchangeably with "contiguous" to mean that the product is connected or joined (directly or indirectly) over its length.

The elongated product can be configured as a continuous length of product having a length of at least about 20–25 feet per strand, and typically at least about 50 feet. In other embodiments, the length continuous product may be up to about 150–200 feet, or even longer. The elongated product may be segmented or non-segmented, i.e., a length of chain-like linked items, or a strand or multi-stranded length of non-chain linked product. Other embodiments may load the elongated product in a series of non-looped discrete lengths. The discrete lengths may be any desired length or combinations of lengths, such as, but not limited to, lengths between about 1–20 feet.

The elongated food item may be elastic (at least in tension) so as to allow some stretching without unduly altering or deforming its desired shape and/or cross-section during processing. The elongated food item may be an extruded product that is held in a natural or synthetic casing as noted above. Other embodiments contemplate product that have rigid configurations but are movable link to link, such as chains of material having sufficient rigidity to retain its shape during processing and/or use (formed of a solid or composite metal, polymer, and/or plastic and the like).

In operation, in certain embodiments, the elongated product may have an exterior surface that, during the loading process, exhibits increased friction relative to a finished, cured, or dried configuration. For example, a processed meat mixture that is held in a collagen casing, prior to finishing, can be described as having a relatively gelatinous, sticky external residue that can cause the food to attempt to stick to a support surface.

Figure 2A:
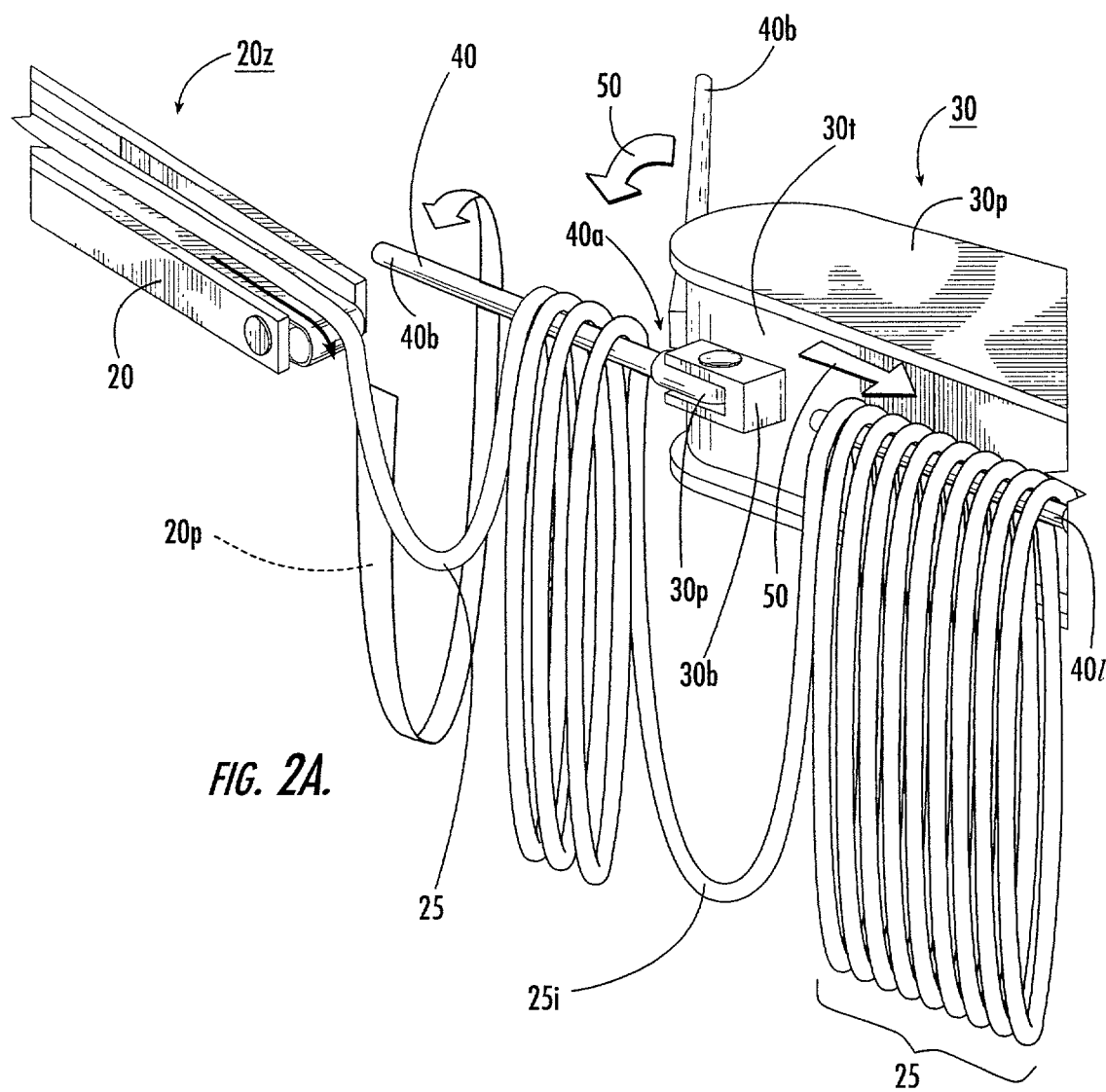
FIG. 2A is a perspective view of a portion of an automated rod positioning system and loading station according to embodiments of the present invention.

Turning now to FIG. 2A, one embodiment of an apparatus 30 for automatically providing, presenting, and/or positioning carrier members 40 for loading is shown. The apparatus 30 is configured to hold and move serially, a plurality of spaced-part carrier members 40 along a desired travel path 50 that is defined by a travel track 30*t* associated with the platform or carousel of the apparatus 30*p* which the members 40 follow. As shown, the automated apparatus 30 can be configured such that a portion is adjacent a product loading zone 20*z* that discharges elongated continuous lengths of product 25 therefrom. The apparatus 30 can be configured to serially automatically present (align and/or position) the carrier or support members 40 such that they are in cooperating communication with the loading equipment in the loading zone 20*z*.

The apparatus 30 includes a plurality of mounting brackets 30*b* that are operatively associated with the track 30*t*. The mounting brackets 30*b* are held in spaced apart intervals or locations about the track 30*t* or perimeter of the apparatus 30 and are configured to receive and releasably secure the end portion 40*a* of the carrier or support member therein.

The mounting brackets 30*b* can hold the end portion 40*a* in a manner that allows the member 40 to pivot about a pivot joint 30*p*. The mounting brackets 30*b* are operatively associated with the track 30*t* that advances and moves the mounting brackets 30*b*, which, in turn, move the respective elongated carrier support members 40, about the travel path 50. The mounting brackets 30*b* may be outwardly extending to allow for ease of alignment during loading. In other embodiments, the mounting brackets 30*b* may be flush with the track or mounted inwardly of the apparatus (not shown).

Figure 3:
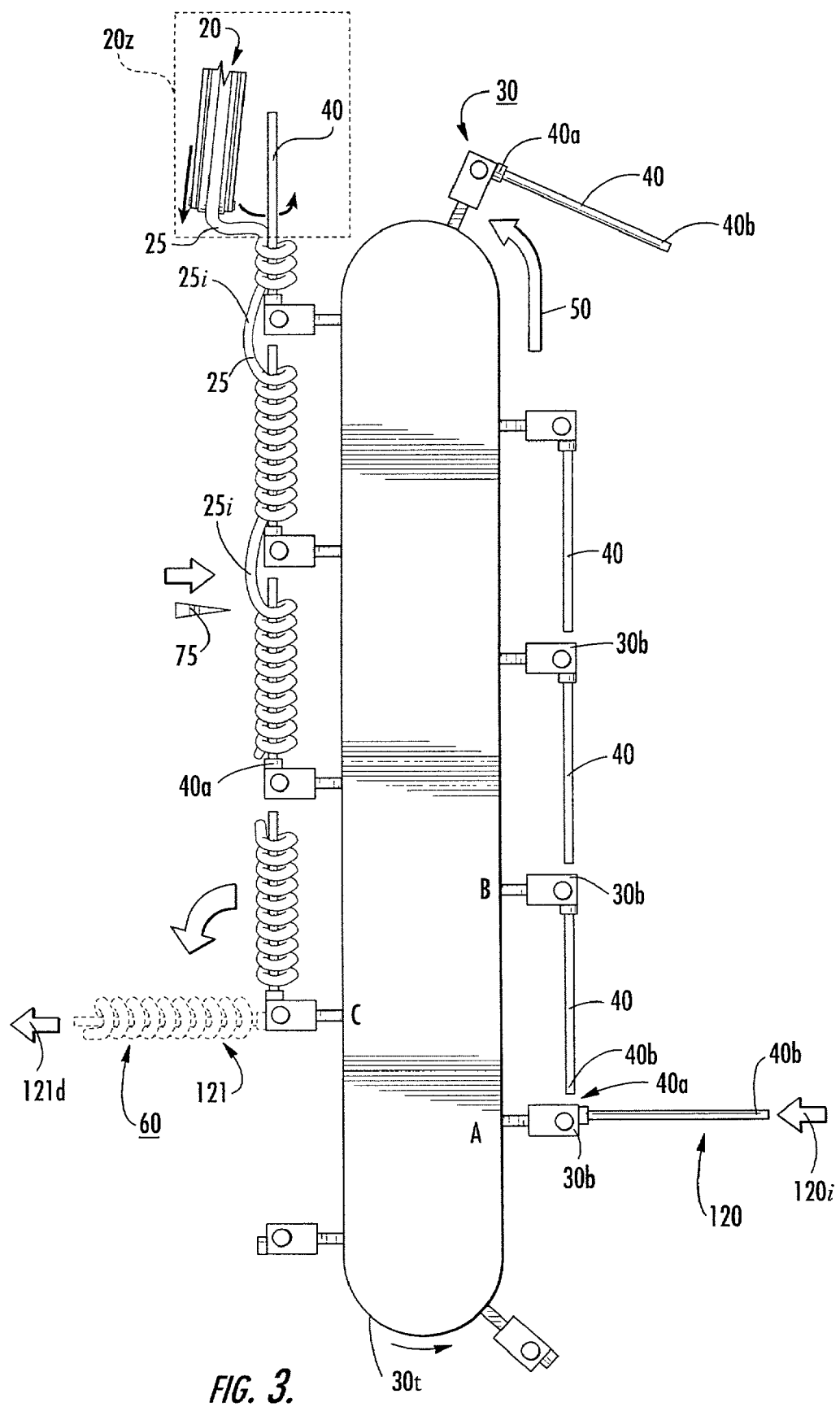
FIG. 3 is a schematic top view of an exemplary rod loading and/or positioning and removal system according to embodiments of the present invention.

The track 30*t* of the apparatus 30 may be endless and/or curvilinear as shown in FIG. 3. As is also shown in FIG. 3, the carrier members 40 can be elongated and may be configured to travel only a portion (typically a major portion) of the length of the track 30*t*. In the embodiment shown, empty support members 40 can be introduced individually at a first location "A" disposed upstream of a loading zone 20*z* and the loaded or filled support member 40 can be removed at second location "C", located downstream of the loading zone 20*z*. As such, the brackets 30*b* may travel without support members for a minor portion of the track 30*t*. Other track and path configurations may be employed and a common location or a plurality of entry/exit locations maybe used so that the elongated members 40 travel the entire or a subset of the length of the track 30*t* (not shown).

As noted above, a first end portion 40a of the carrier members 40 can be pivotably attached to the apparatus 30 so that each is able to independently move with respect thereto. In operation, as shown in FIG. 3, this mounting configuration allows the second end portion 40b of the members to retract toward or extend away from the track 30t (toward and/or away from the carousel body or platform 30p of the apparatus) during operation.

The track 30t may be operatively associated with an advancement or drive system that moves the brackets 30b forward along the track or desired travel path. As such, the advancement system can comprise one or a series of conveyors, belts, cables, or chains, gearing, cams, or mechanical, electrical, pneumatic, hydraulic powered mechanisms, linkage assemblies, or combinations of same, as well as other suitable drive means and/or transport mechanisms.

In certain embodiments, the carrier or support members 40 travel substantially continuously at a substantially constant speed along a major portion, or all, of the travel path 50. In other embodiments, the members 40 may operate at a variable speed, or intermittently slow or halt to interrupt forward movement so as to allow the support members 40 and/or brackets 30b to dwell at a particular location for a desired amount of time.

FIG. 3 also illustrates that the carrier member 40 can move from a first location "A" where it has a first orientation such that the elongated support member 40 is held substantially orthogonal to the direction of travel associated with the predetermined travel track 30t to a second location "B" with a different orientation. At location "B", as shown, the elongated support member 40 is held substantially parallel to the direction of travel associated with the predetermined travel track 30t. At location "C", the member 40 may be again rotated to be substantially orthogonal to the direction of travel associated with the travel track 30t. Location A may be associated with a new or "empty" member loading or supply station 120 (represented by the insertion arrow 120i), and location C may be associated with a loaded or "full" member removing station 121 (represented by the detachment arrow 121d). As such, the (elongated) carrier members 40 are individually releasably mounted to mounting brackets 30b spaced apart a distance so as to define the spacing between adjacent members 40 during operation. In use, "fresh" sanitized/sterilized support members 40 are individually introduced at one or more locations (shown as a single location A), and individually removed at one or more locations (shown as a single location B) after the members 40 are loaded.

In other embodiments, the carrier members 40 can be configured to permanently mount to the track 30t and/or carousel 30 so as to repeatedly travel the circuit. In this embodiment, the food can be unloaded at a desired unloading station or stations, manually or automatically. "Permanently" as used herein means that the members 40 may be used repetitively during a production shift, remaining mounted, without requiring removal from the device 30. However, selected ones or all members 40 may be removed for periodic repair or cleaning as desired.

As shown in FIGS. 2A and 3, the loaded members 40 may be interconnected with intermediate lengths of product 25i strung between adjacent ones of the elongated support members 40. In such embodiments, as shown in FIG. 3, it may be desirable to cut the product along the intermediate segment 25i. FIG. 3 illustrates that such cutting may be carried out automatically with a cutting implement 75 configured to advance and cut the product 25 at desired time intervals set to correspond to the speed of the elongated members 40 so that adjacent members are detached and/or unconnected.

FIG. 2A illustrates that, in position in the loading zone 20z, the member 40 is located in cooperating alignment with the loader that discharges the product onto the support member. As shown, the loading zone comprises a suitably located winder arm 20. However, other loader, discharge configurations, mechanisms, and devices may also be used to supply the product desired to be loaded.

As shown, the member 40 extends within the perimeter of the travel path 20p defined by the translating winder arm 20. In certain embodiments, the support member 40 can be located so that it is centrally located within the boundary of the movement of the arm 20 during the loading operation. In other embodiments, the carrier member 40 can be asymmetrically positioned (such as closer to the top, bottom or one side of the winder arm 20). The direction of travel of the arm 20 is shown as counterclockwise in FIG. 2A, but may be configured to be clockwise as well. The support member 40 may be configured to travel proximate the loading zone 20z and downstream thereof in a unidirectional manner as the winder arm 20 translates to distribute multiple loops of product along a desired length of the support member 40. The timing, movement pattern, and product release rate, can be coordinated with the spacing of the support members 40 and the speed of movement of the support member 40 in the apparatus 30 to substantially continuously feed serially presented empty support members into the loading zone 20z after an immediately forward one is full and departs the loading zone 20z.

As shown by the arrow in FIG. 2A and FIGS. 27F–27G, the winder arm 20 can move in a predetermined directional pattern 20p which is a closed path including two different axis of travel, typically including both X and Y axis directional components. The closed path may be shaped in any desired suitable configuration, including, but not limited to, oval, teardrop, circular, elliptical, hourglass, square, or rectangular, so that, in operation, it causes the elongate product to wrap to the desired configuration. FIGS. 2B and 27A–27E illustrates that the winder arm 20 may be configured to move in a transverse (open or closed) pattern 20p so as to serially load or drape over the member 40 discrete lengths of non-looped elongated suspended lengths of product along the support member 40.

Figure 13A:
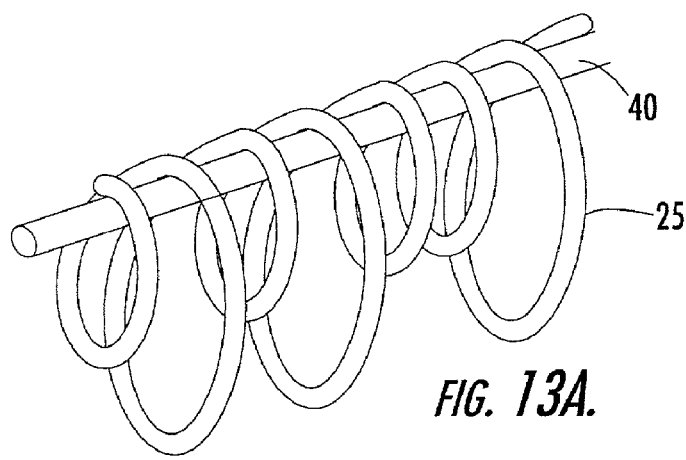
FIG. 13A is a side view of a loaded support member according to embodiments of the present invention.
Figure 13B:
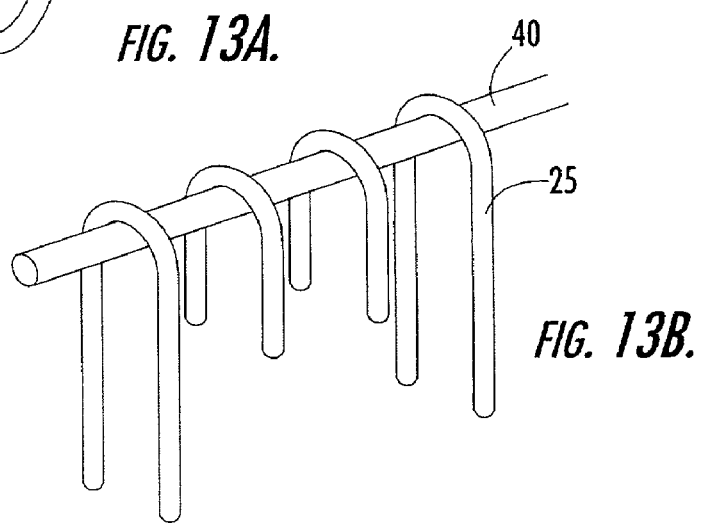
FIG. 13B is a side view of a loaded support member according to embodiments of the present invention.

The elongated continuous or discrete length of product may be loaded so that it has substantially uniform suspended lengths along the member 40 as shown in FIGS. 2A, 2B, 17A, 17C, 17E or may be loaded to provide non-uniform suspended lengths of product 25 (FIGS. 13A, 13B).

The winder arm 20 may be programmably configured to alter its winding pattern, winding speed, and the like, depending on the product being processed. In any event, the winder arm 20 is configured to move a sufficient distance above and below the support member 40 so as to load or loop the elongate product 25 thereon.

Figure 1B:
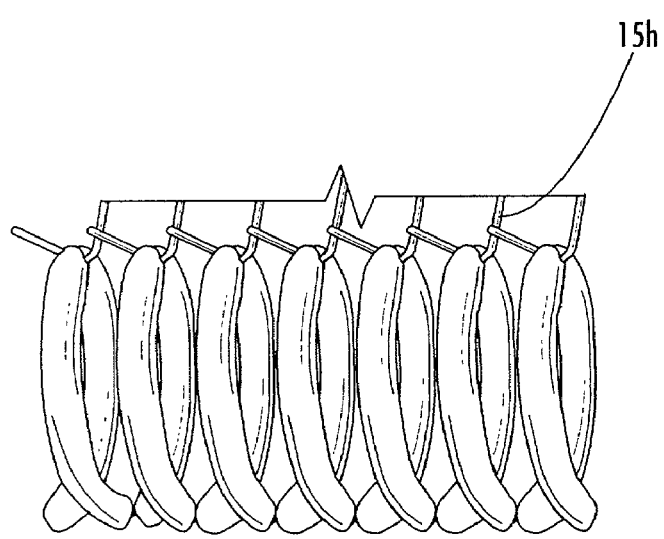
FIG. 1B is an enlarged view of the looping hooks of the device shown in FIG. 1A showing an elongated extruded encased food product suspended thereon.
Figure 1C:
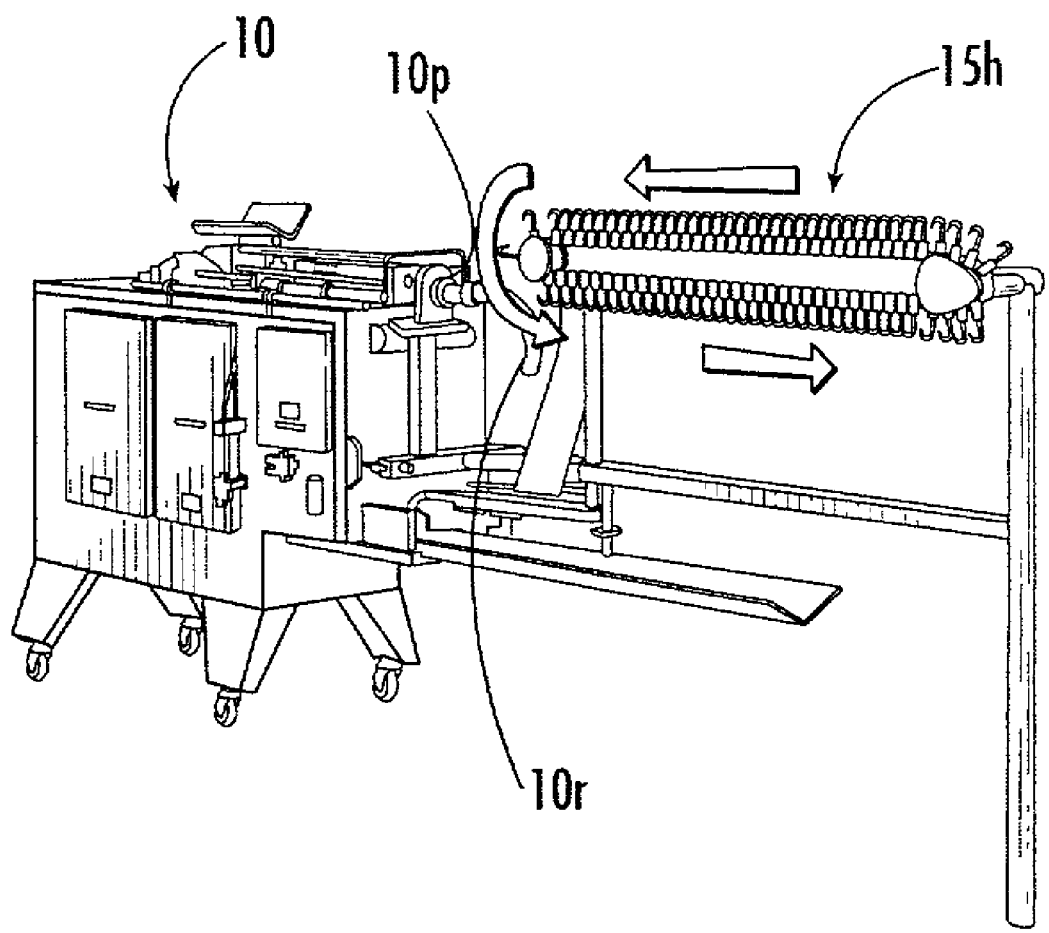
FIG. 1C is a perspective view of another prior art stuffer and linker.

In certain embodiments, the upstream processing station that feeds the loading station 20z winder arm 20 can be the extruder 10 (such as the conventional extruders/stuffers as shown in FIGS. 1A–1C) and the upstream portion of the winder arm 20 can be positioned proximate to, and in cooperating alignment with, a discharge port 10p of the extruder (or stuffer) 10 or intermediately positioned member such as a chute.

Figure 2B:
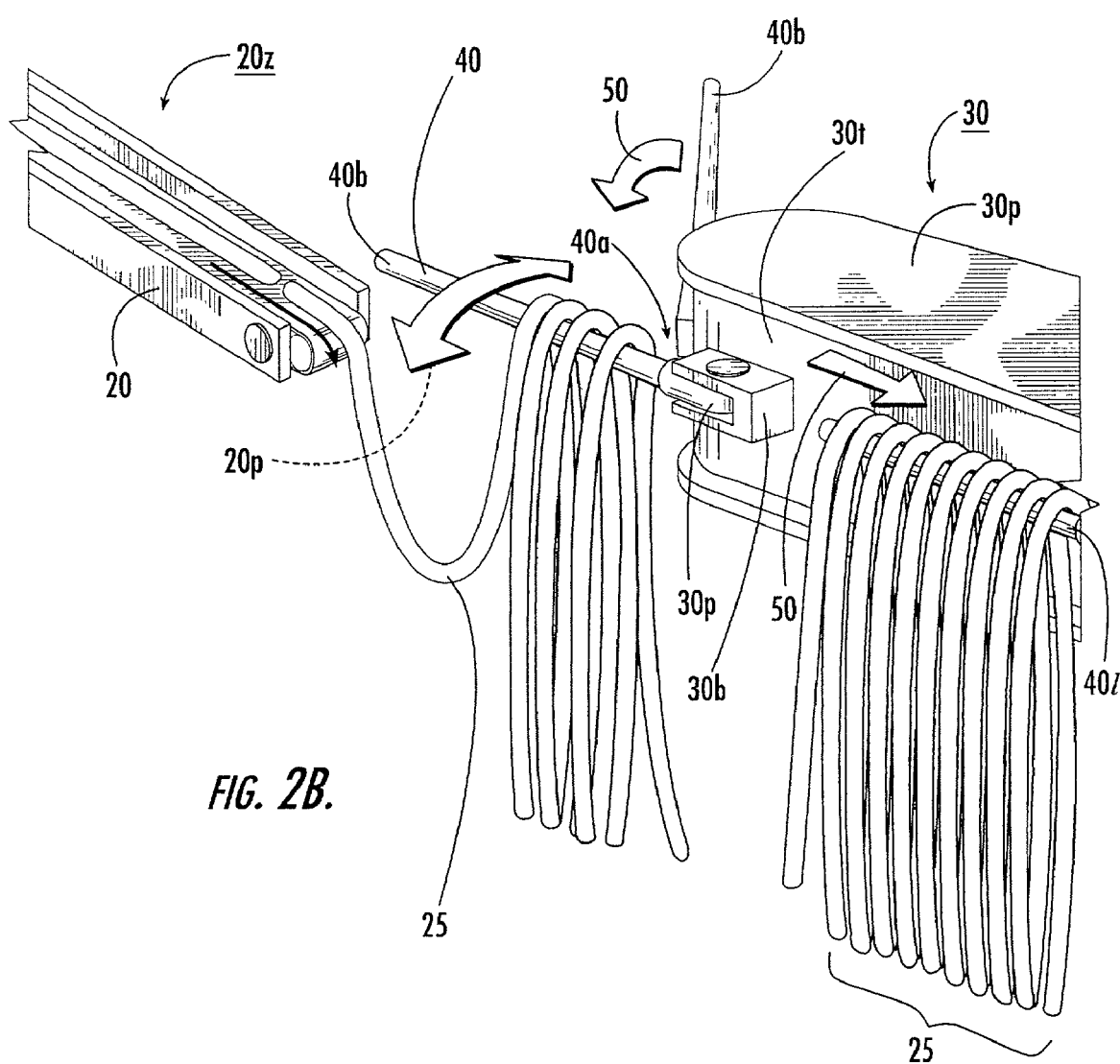
FIG. 2B is a perspective view of a portion of an automated rod positioning system and loading station according to alternative embodiments of the present invention.

In operation, as shown in FIGS. 2A, 2B the support member 40 can be aligned with the winder arm 20 at a first position that is toward the upstream end of the arm 20 and during loading can be gradually translated (typically unidirectionally) to be closer to the downstream end of the arm 20 all at substantially the same height so that the support members 40 are held in a substantially level manner during and after loading. Moving the support member 40 during the loading operation can distribute multiple strands, bights, or loops of product over the desired length of the member 40.

In certain embodiments, the support member 40 moves at a substantially constant speed along the track 30*t* that may be synchronized and/or responsive to one or more of the speed of the winding (speed of the arm), the speed of forward movement of the product 25 as it exits the arm 20, and the desired looping arrangement/configuration (length of the loops or suspended lengths) on the member 40.

The length of the winder arm 20 can vary depending on various factors, such as, but not limited to, the size of the product, the forward speed of the product, the desired winding pattern and the like. In certain embodiments, the length of the arm 20 is sized to be at least the length of the transport member 40. In other embodiments, the length of the support member is at least about 2 feet, and typically at least about 3 feet. In certain embodiments, the support member 40 can be about six feet long.

Various automated detectors can be placed at desired locations along the apparatus 30 and/or winder arm 20 to verify proper operation and to render an alert when an abnormality is indicated. Examples of such detectors include optical detectors (infrared or otherwise that respond to changes in visual intensity or generated light beams), flow meters, pressure meters, temperature sensors, and the like.

In certain embodiments, the speed of the track 30*t* and/or support members 40 held and advanced by the apparatus 30 may be between about 2–10 ft/min, and in particular embodiments, at about 4–6 ft/min.

Figure 4:
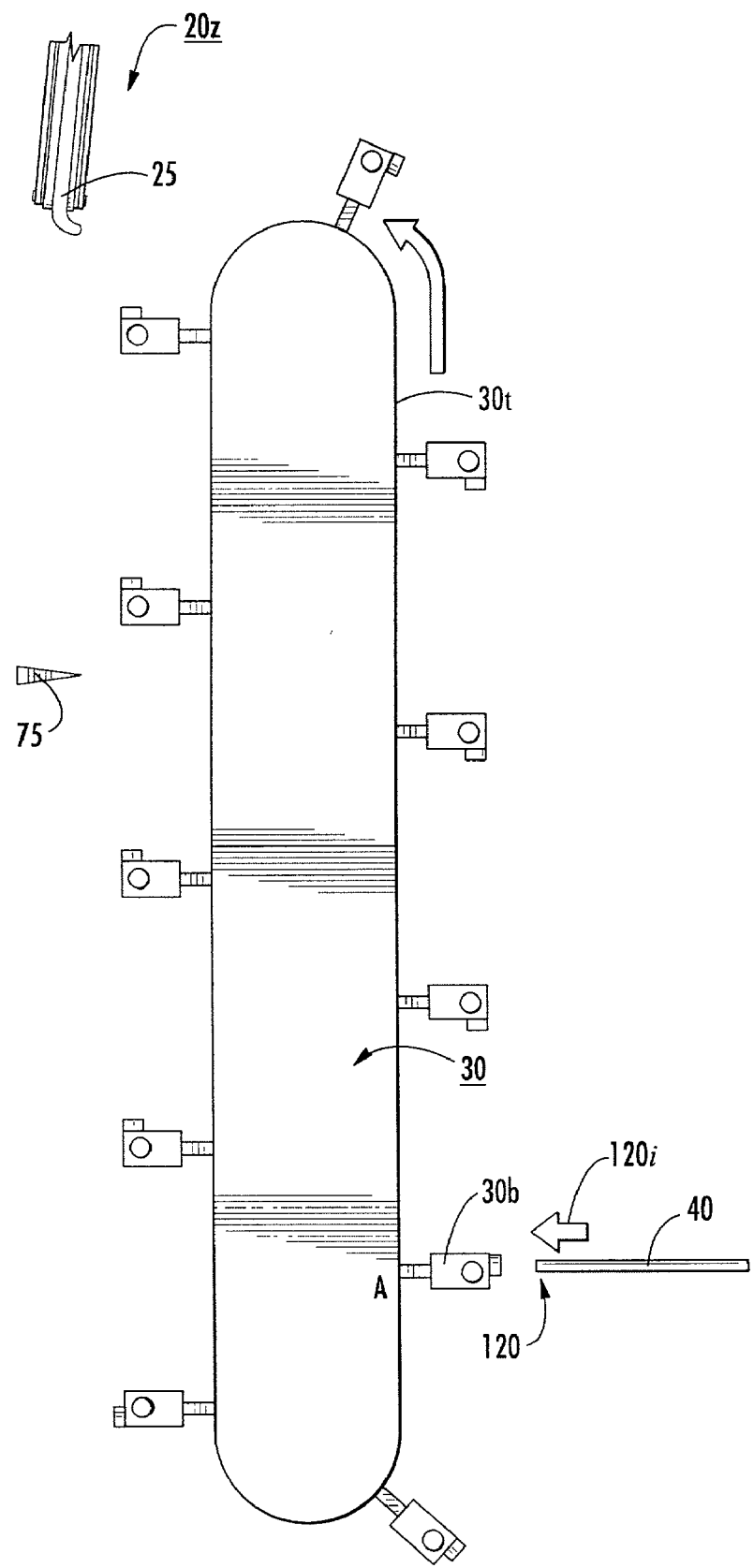
FIGS. 4–9 are schematic top views of a sequence of operations illustrating the movement of a single rod along its predetermined travel path showing empty (FIGS. 4–6) and loaded (FIGS. 8 and 9) configurations or combinations thereof according to embodiments of the present invention.

FIGS. 4–9 illustrate a sequence of operations following a single support member 40 through an exemplary travel path provided by the positioning apparatus 30. FIG. 4 illustrates the initial loading or supplying of a (empty) support member 40 onto the apparatus 30 at the supply station 120. In this embodiment, the support member 40 is loaded into the bracket 30*b* at an introduction location (shown as position A) in an orientation that is different from its upstream orientation. As shown by the curvilinear arrow, the track 30*t* continues to move the receiving bracket 30*b* forward during the supply step, automatically bringing the next adjacent bracket 30*b* forward to repeat the loading process.

Figure 5:
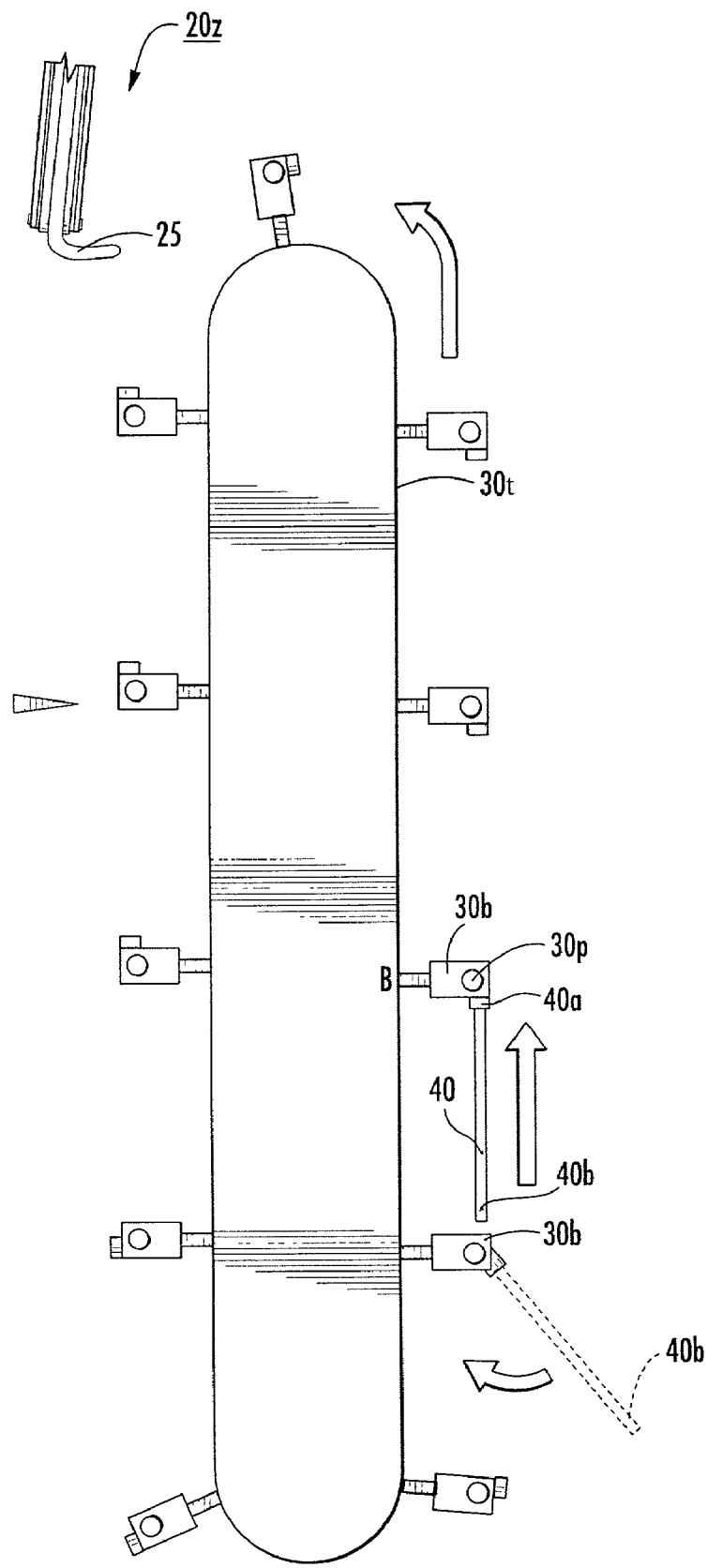

FIG. 5 illustrates that after or during insertion (proximate, and typically, downstream of location A) into the bracket 30*b*, the support member 40 can be reoriented and aligned so that the outer portion 40*b* of the support member 40 can be rotated inwardly. In the embodiment shown, the support member 40 pivots so that it is disposed substantially parallel to and evenly spaced with respect to the track 30*t* or apparatus 30 along the length of the support member 40. At full operational capacity, the apparatus 30 positions the support members 40 so that each is spaced apart but adjacent the support members 40 that are positioned immediately forward and rearward thereof about a major portion of the track 30*t* as shown in FIG. 3.

Figure 10A:
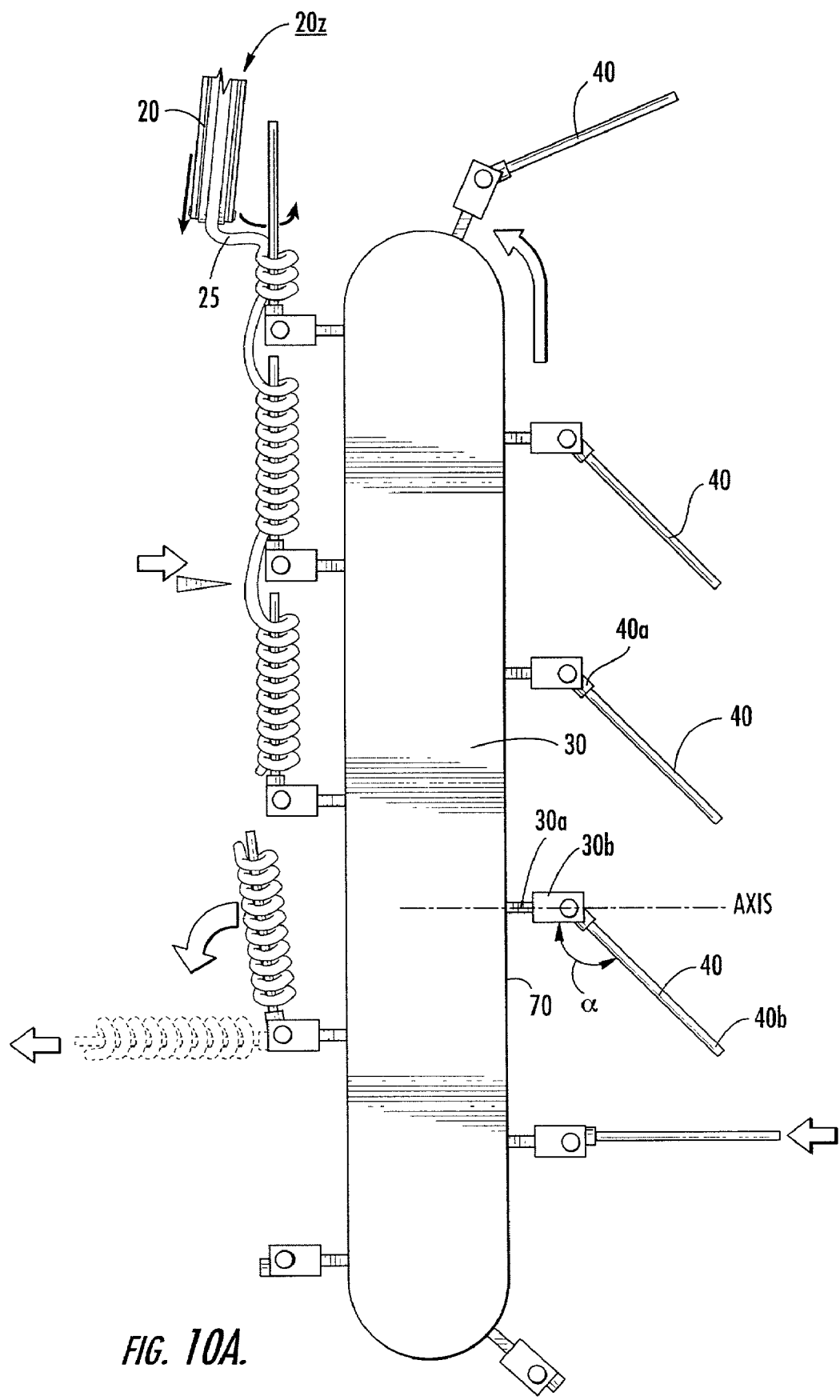
FIG. 10A is a schematic top view of an alternative configuration of an automated positioning and removal system for supplying a continuous supply of empty rods for loading according to embodiments of the present invention.

FIG. 10A illustrates that the support members 40 may be held by the apparatus 30 such that when viewed from the top, they present an angular orientation relative to the carousel 30, so that the first portion 40*a* is held closer to the track 30*t* than the second portion 40*b*. As shown in FIG. 10A, as viewed from the top, the support members 40 can be held during a portion of travel along the travel path at an obtuse angular orientation "α" that is greater than 90 degrees, typically from about 120–160 degrees, from the axis defined by an axis line (shown in broken line) extending through the bracket arm 30*a* and associated pivot joint. In other embodiments, the support members 40 may be held to be in substantially straight alignment throughout a major portion of the travel circuit. As shown in FIG. 10B, the support members 40 may be mounted on the carousel while in other embodiments the support members may be oriented to taper inwardly relative to the travel direction (not shown).

In certain embodiments, as shown in FIGS. 2A and 2B, the support member 40 is held in the apparatus or platform so that it has a free length that can be readily accessed for loading (such as aligned and positioned) at the loading zone 20*z*. As also shown in FIGS. 2A, 2B, and 4–9, one end portion 40*b* can be configured to remain free during its travel along the travel path or track 30*t*. In other embodiments, both end portions 40*a*, 40*b* of the members 40 may be held against the carousel 30 (such as via a double bracket holding arrangement) (not shown). The end portion that is held may be the end or an inward portion of the member 40. In other embodiments, one or more mounting locations may be used as well as an intermediately positioned (between the opposing end portions) mounting location may be used.

In other embodiments, as shown in FIG. 10B, a first end portion 40*a* of a support member 40 can be mounted in the bracket 30*b* with a second end portion 40*b* held in a secondary bracket 30*s* that may be disposed on a different adjacent primary bracket 30*b* (or on the track as a secondary bracket (not shown)) spaced from the first bracket 30*b*. As shown in FIG. 10B, a first end portion 40*a* of the support member can be held in the first bracket 30*b* and the second end portion 40*b* can be held on a rear bracket 30*s* that may be mounted to a bracket 30*b* located downstream of the bracket 30*b* holding the first end portion 40*a* of the support member. FIG. 10C is a side view that illustrates the secondary bracket 30*s* incorporated into the holding bracket 30*b*.

FIG. 10B also illustrates another example of a holding configuration and orientation for the support members 40 along the travel path. As shown, the support members 40 have a length and are in spaced apart relationship so that the rearward portion 40*b* of an upstream member 40 extends proximate to or beyond the corresponding adjacent downstream bracket 30*b*. In the orientation shown, the support member 40 tapers outwardly slightly from front to back, so that the rearward most portion of a forward member 40*b* resides proximate to but outwardly of the boundary of the front-end portion 40*a* of the adjacently located downstream or rearwardly positioned support member 40.

The support members 40 may be manually or automatically turned to a desired orientation or orientations along the travel path. In certain embodiments, a guide mechanism (not shown) can be disposed downstream of the introduction location A (FIG. 4) that deflects the support member 40 to a desired orientation. In other embodiments, the bracket 30*b* can be configured with a cam, linkage, or other internally mounted mechanism (not shown) that is operated to cause the support member 40 to turn to a predetermined orientation(s) as it travels along the track 30*t*.

Figure 6:
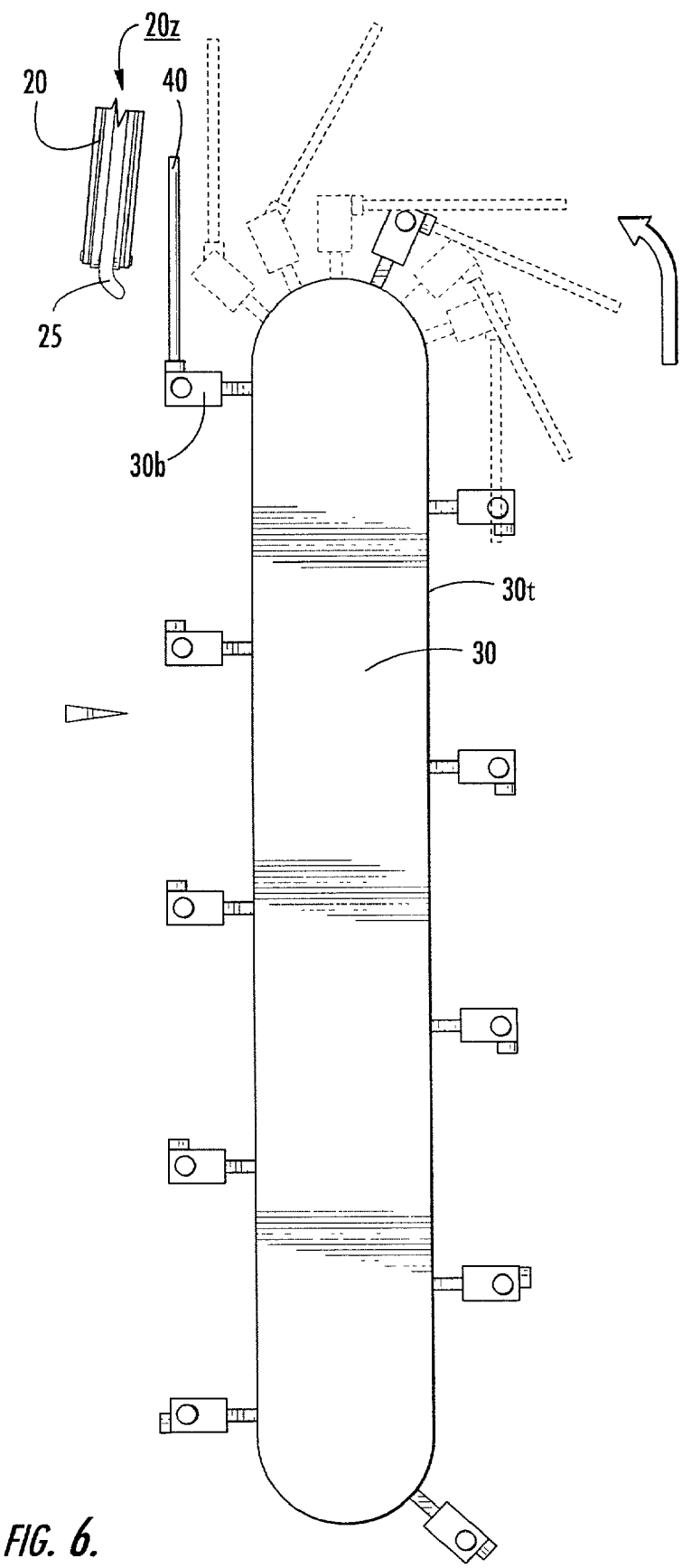

FIG. 6 illustrates, in broken line, a series of orientations that the support member 40 moves through as it travels in the arcuate region of the travel path to be aligned and positioned in cooperating relationship with the loading zone 20*z*. It is noted that where the apparatus 30 has only linear tracks, such a pattern will not be required (not shown).

Figure 7:
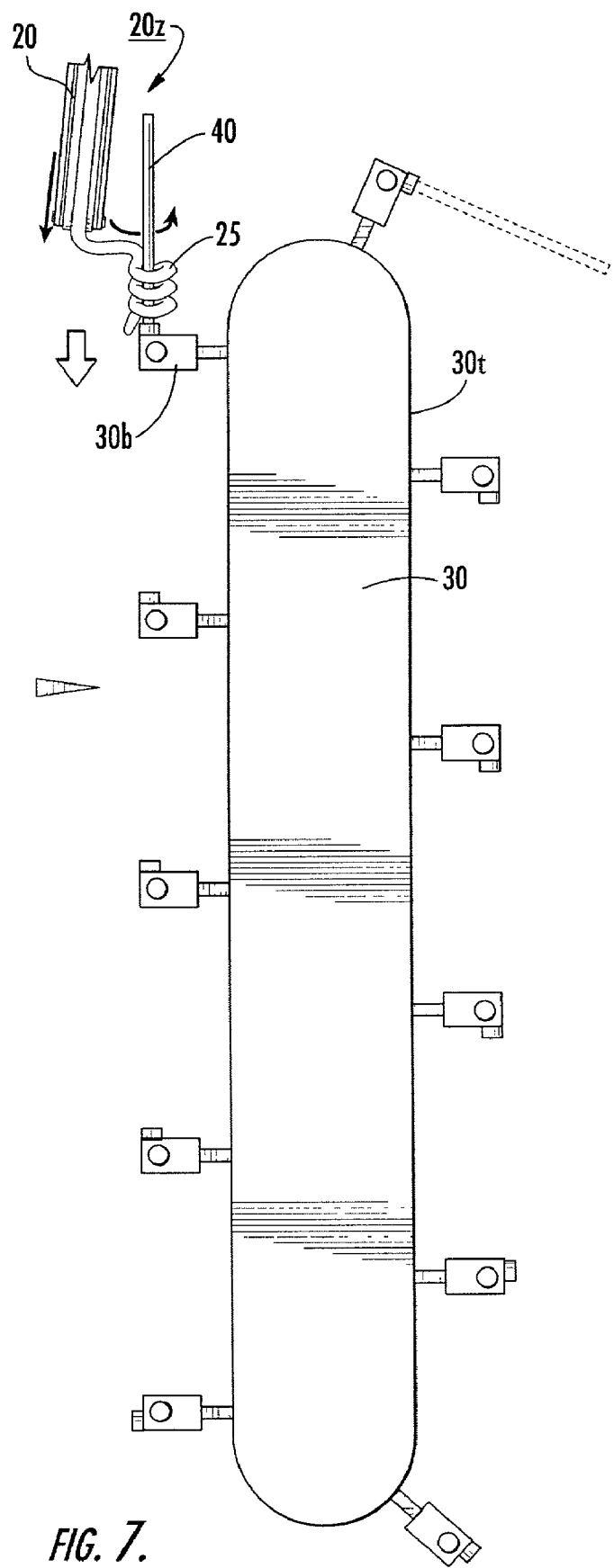

FIG. 7 illustrates that in certain embodiments, as the member 40 progresses forward at and/or away from the loading zone 20*z*, the member 40 can travel in unidirectionally. As shown, the member 40, during and after loading with product 25, can be held and moved so that it has a straight travel pattern with the member 40 held level (substantially horizontally to keep the strands, bights, loops or other straddled arrangement of product distributed along a major portion of the length of the member) and parallel to the travel track 30t.

Figure 8:
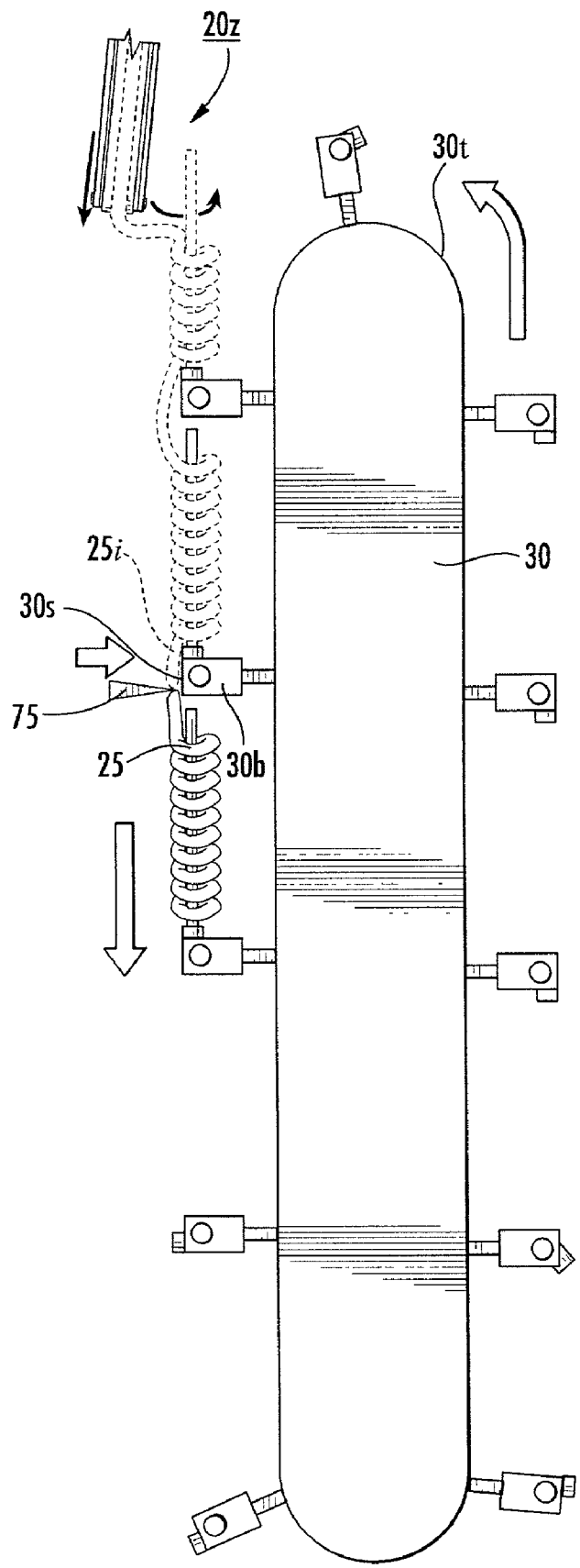

FIG. 8 illustrates that the intermediate length of product extending between two adjacent support members 40 downstream of the loading zone 20z can be parted or split. The parting can be automatically or manually performed while the adjacent support members 40 are moving, typically without disrupting the normal speed and/or continuous flow of product/support members 40 along the track 30t. The bracket 30b may include an outer surface configuration 30s that provides a solid cutting surface that is sufficient to receive the sharp edge contact of a cutting implement and/or the associated cutting force over a suitable component life. Other cutting means can also be used, including, but not limited to, lasers, ultrasonic devices, water jets, and the like.

Figure 9:
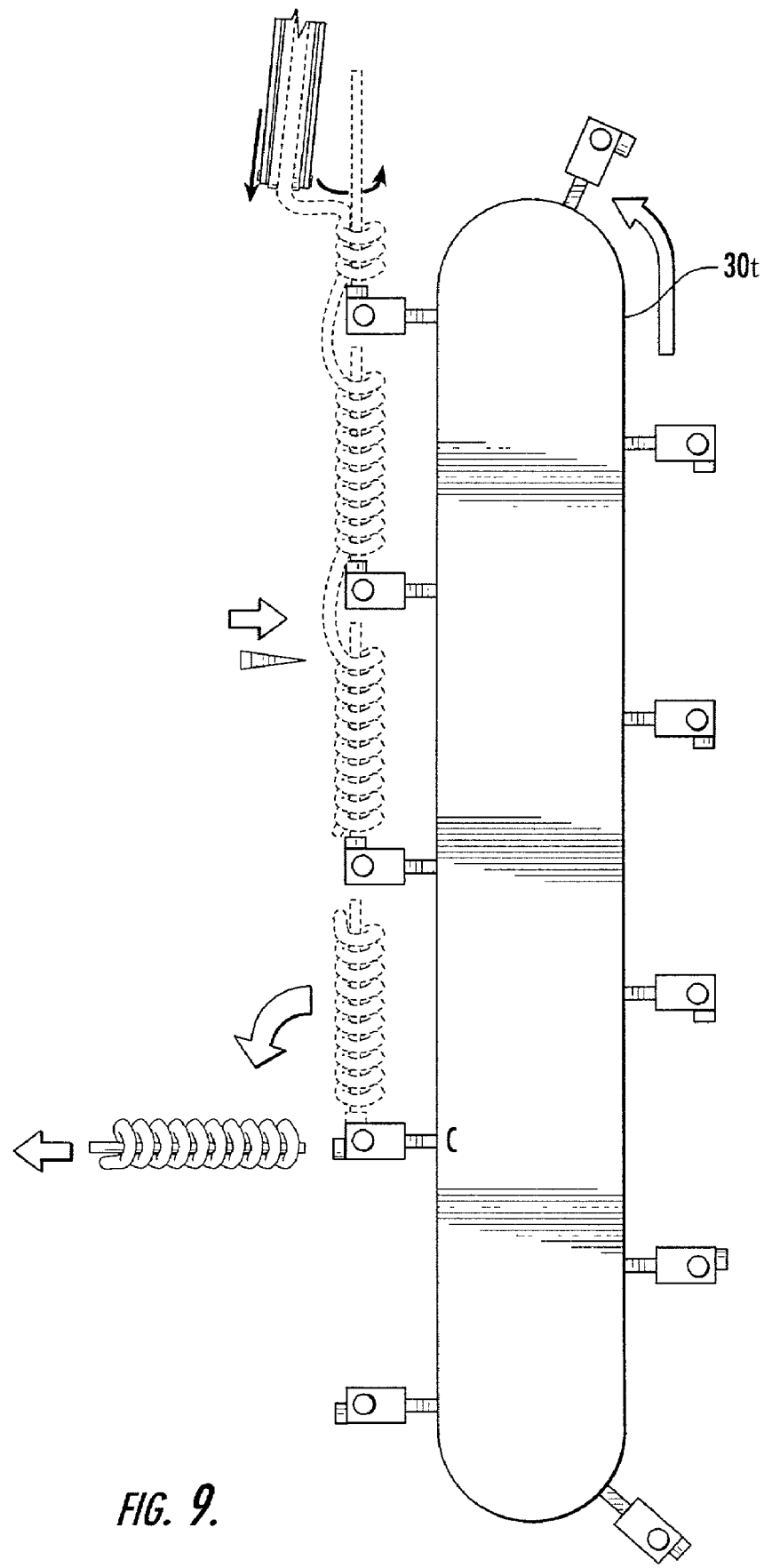

FIG. 9 illustrates that the support member 40 loaded with product 25 can be detached from the apparatus 30 at removal location "C". The detachment can be performed while the support member 40 is held at a desired removal orientation. As shown, the support member 40 is moved so that the second end portion 40b extends outwardly from the body of the apparatus 30 which may provide easier removal and/or external access to the loaded member 40.

Although illustrated as having particular loading and supply member introduction and removal locations, it is noted that other locations can be selected. For example, a plurality of different introduction locations can be used, so that a particular location loads every other bracket that passes thereby. Similarly, a plurality of different removal locations can be selectively used. In other embodiments, the supply members are mounted to travel repeatedly along the circuit to allow a number of loading operations thereon and hence, remain in position during the removal (with no single introduction or loading location needed). At a desired time, the food can be lifted, scooped, or otherwise removed from the support members 40 (at one or more desired locations). It is also noted that the support member 40, although shown as being introduced at a 90-degree orientation in certain of the figures such as FIG. 4, may employ other desirable entry or loading orientations. In addition, the support members 40 need not move into parallel alignment to the platform 30 as they travel along the track 30t. Instead they may be loaded into this orientation and remain this configuration along a major portion of the travel path or travel in alternative orientations.

In certain embodiments, two loading stations can be positioned and opposing ends of the apparatus (not shown). In these embodiments, the apparatus 30 can be configured with a sufficient length and/or configuration to include two different sets of introduction, loading, and removal locations, potentially increasing the loading capacity.

It is also noted that, in certain embodiments, as shown in FIG. 11A, the apparatus 30' may be configured with a corresponding pair of dual brackets $30b_1$, $30b_2$ at each, or selected ones, of the support member mounting positions. As such, the apparatus 30' can be configured to receive a pair of independent overlying aligned elongated support members 40 that are held in the apparatus 30' to be vertically spaced apart and concurrently moved to be simultaneously loaded with product. In this embodiment, the winder arm 20 moves a distance in its winding pattern that is sufficient to envelope and/or move around the perimeter defined by the two spaced apart rods, the upper one suspending the product 25 and the lower one helping to provide a lower dimension for the looped product. FIG. 11B illustrates that a pair of support members $40_1$, $40_2$, may be held in a single bracket 30b that defines the alignment orientation and pivotability of the members 40.

FIGS. 11C–11E illustrate examples of alternate embodiments of support members 40. As shown in FIG. 11C, the support member 40' may be configured as a pair of rods $40r_1$, $40r_2$ that may be attached. FIG. 11D illustrates that the support member 40" may be configured with a continuous sheet of material, the upper portion may have additional width and/or at least one end portion (shown as two) that allows for insertion into the bracket 30b. The body of the support members may be solid, perforated, foraminated, or include one or a plurality of apertures or be otherwise configured to reduce weight and/or promote airflow therethrough. Similarly, the member 40 may include one or more handles or other externally accessible handling means disposed along the length and/or at selected end portions thereof to promote ease of handling to transport the loaded member to a trolley or another active station (not shown). In addition, in operation, a plurality of support members, of the same or different configurations, may be sequentially (manually or automated) serially loaded and removed by aligning them with the winder 20.

Figure 12A:
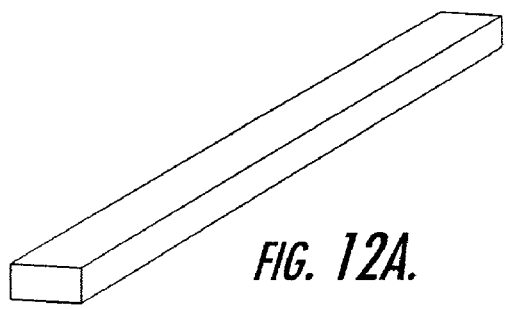
FIG. 12A is a perspective view of an additional alternative configuration of an elongated support member according to embodiments of the present invention.
Figure 12B:
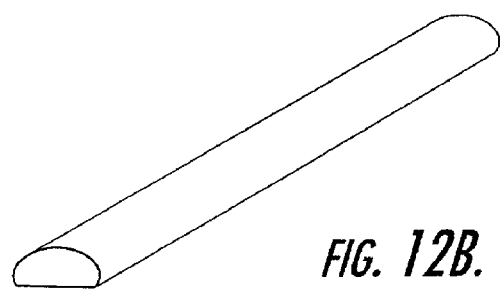
FIG. 12B is a perspective view of an additional alternative configuration of an elongated support member according to embodiments of the present invention
Figure 12C:
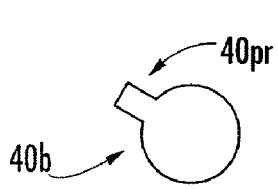
FIG. 12C is a cross-sectional view of an elongated support member according to embodiments of the present invention.
Figure 12D:
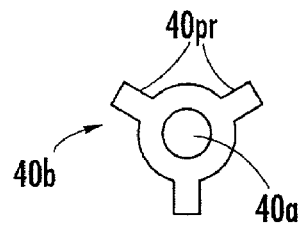
FIG. 12D is a cross-sectional view of another elongated support member according to embodiments of the present invention.
Figure 12E:
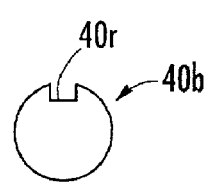
FIG. 12E is a cross-sectional view of an additional elongated support member according to embodiments of the present invention.

Examples of other configurations of support members 40 are shown in FIGS. 12A–12E. These examples are non-limiting to the contemplated scope of the invention as there are many suitable support member configurations as will be appreciated by those of skill in the art. FIG. 12A illustrates that the support member 40 may be configured as a planar bar. FIG. 12B illustrates a support member 40 configured as a rod with a semi-circular cross-sectional profile. FIG. 12A illustrates that the support member 40 may include a protrusion 40pr that is configured to mate with the bracket 30b to help releasably secure the support member 40 to the apparatus 30. Similarly, FIG. 12D illustrates that, at least one end portion 40b of the support member may be configured with a plurality of outwardly extending protrusions to releasably engage with the bracket 30b. FIG. 12D also illustrates that at least one end portion of the support member 40b may include an aperture 40a that may be used to help secure the support member 40 to the bracket 30b and/or to reduce the weight thereof. FIG. 12E illustrates that at least one end portion 40b of the support member may include a recess that can lock in position to releasably secure it to the apparatus 30.

Figure 14A:
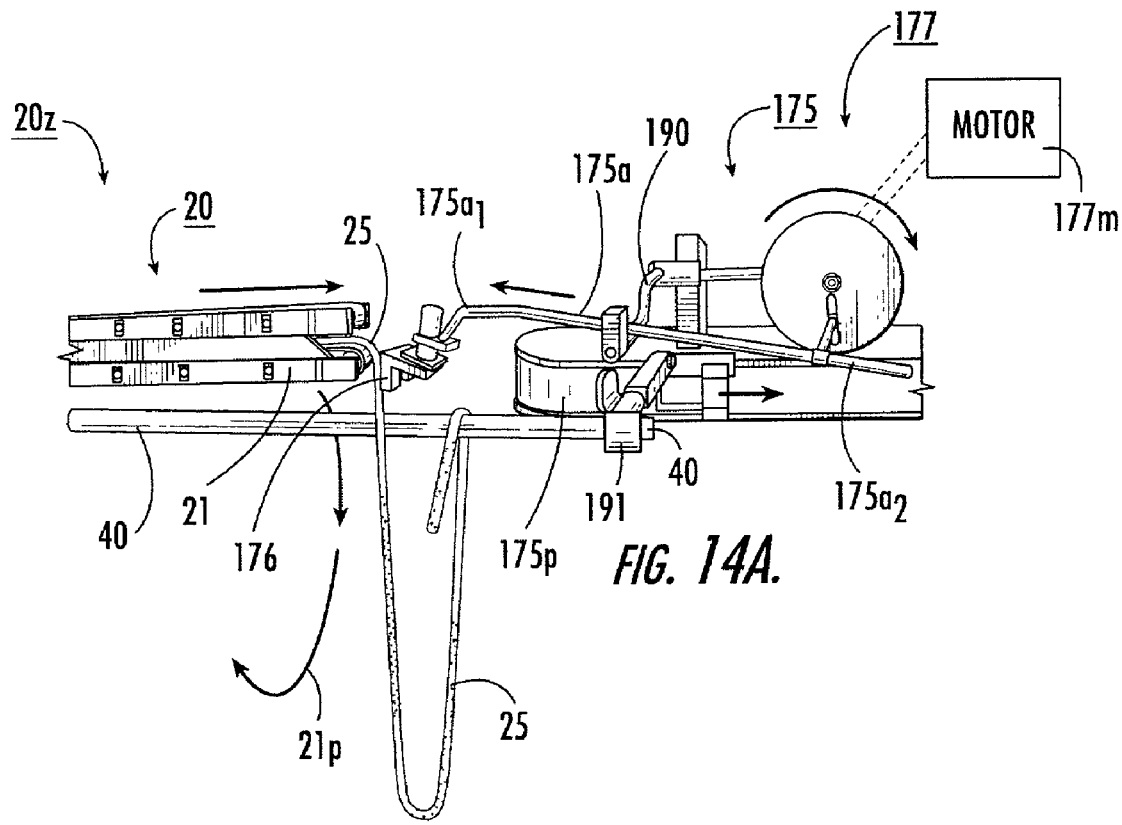
FIGS. 14A–14F are side views of a sequential series of operations used to pack product in close proximity according to embodiments of the present invention.
Figure 16:
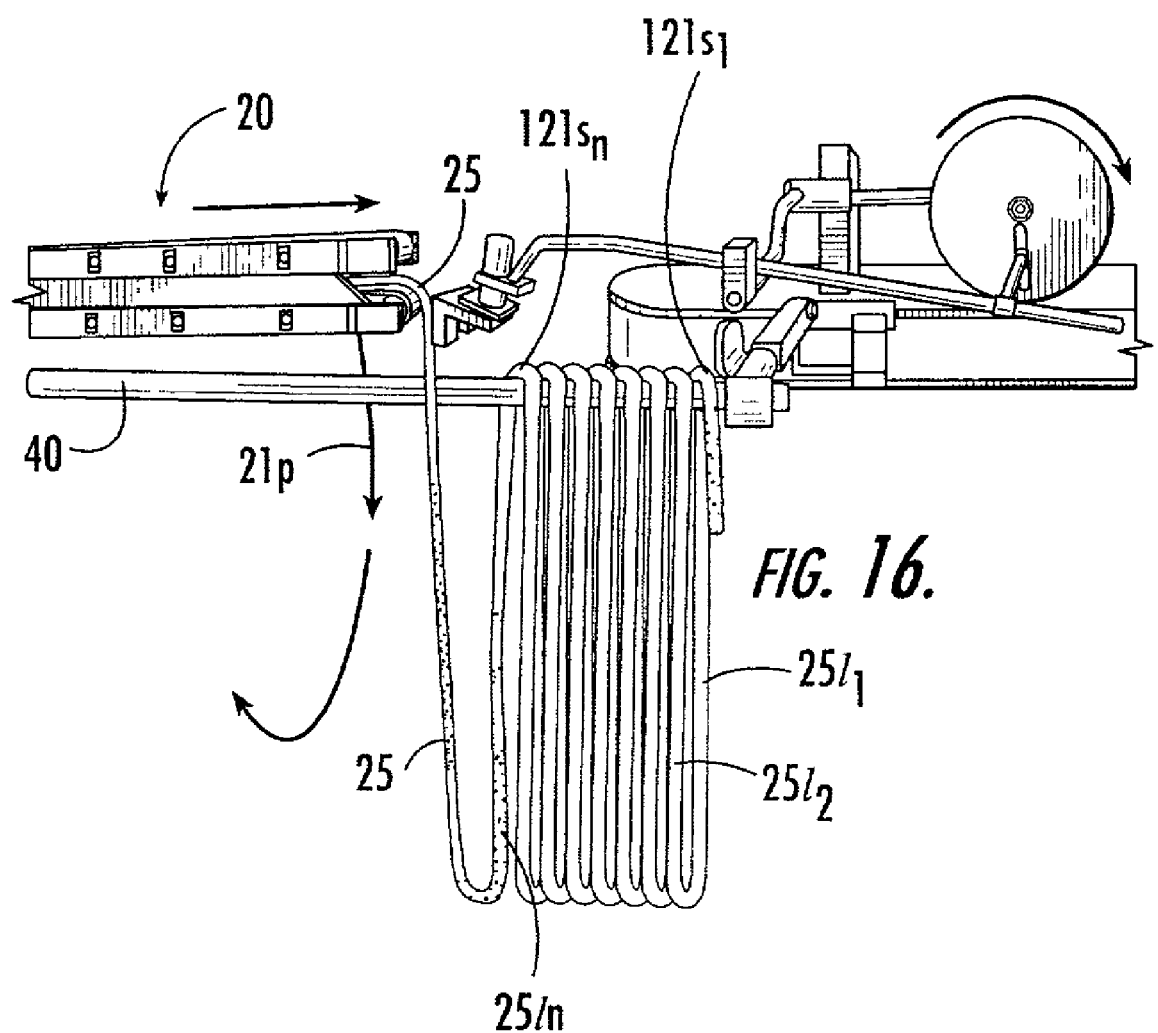
FIG. 16 is a side view of the device shown in FIGS. 14A–14F illustrating a more fully loaded carrier member with a plurality of closely spaced suspended regions held on the carrier member according to embodiments of the present invention.

FIGS. 14A–14F illustrate a sequence of operations that can be carried out to arrange suspended elongated product on the carrier member 40 according to embodiments of the present invention. As shown in FIG. 14A, a packing mechanism 175 is cooperably aligned with a carrier member 40 that is, in turn, cooperably aligned with an automated winder 20. The automated winder 20 includes a winding arm 21 and has an associated winding or motion pattern 21p that discharges and loads suspended elongated product onto a cooperably aligned carrier member 40 and is discussed in more detail below. The carrier member 40 can be loaded with at least one length of elongated product 25. As shown, the product straddles onto the carrier member 40 so that the product defines suspension regions $121S_1$–$121S_n$. The straddling can be carried out in different manners to load, suspend, hang, or drape the product 25 onto the carrier member 40. For example, as shown in FIG. 16, the straddling is performed so that the product 25 is arranged in a plurality of loops on the carrier member 40. FIG. 17C illustrates that the straddling configuration can be a continuous length of non-looped bights $B_1, B_2 \ldots B_n$ having a series of curves while FIG. 17E shows discrete lengths of products hanging from the carrier member 40.

In any event, the packing mechanism 175 includes an elongated packing arm 175a that moves through a repeating motion cycle illustrated by the arrows proximate the packing arm 175a in FIGS. 14A–14F. The packing arm 175a includes opposing first and second end portions $175a_1$, $175a_2$, respectively. The first end portion $175a_1$, can be formed as or include a fork member 176 that, in operation, periodically reaches over and down to contact the outer surface of the carrier member 40 (FIGS. 15A, 15B) and/or a portion of a suspended elongated product 25 held on a carrier member 40 to swipe, move, push, or pull regions of the product 25 in a desired direction on the carrier member 40 to provide a more closely spaced or symmetrical or desired loading/packing arrangement.

Figure 14B:
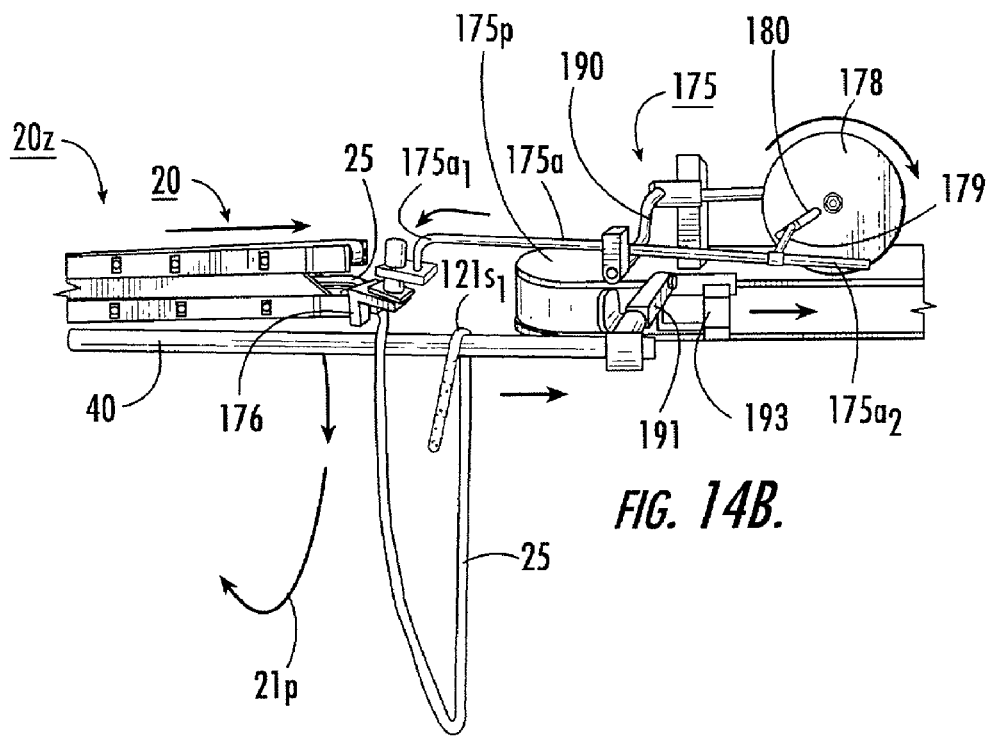
Figure 14C:
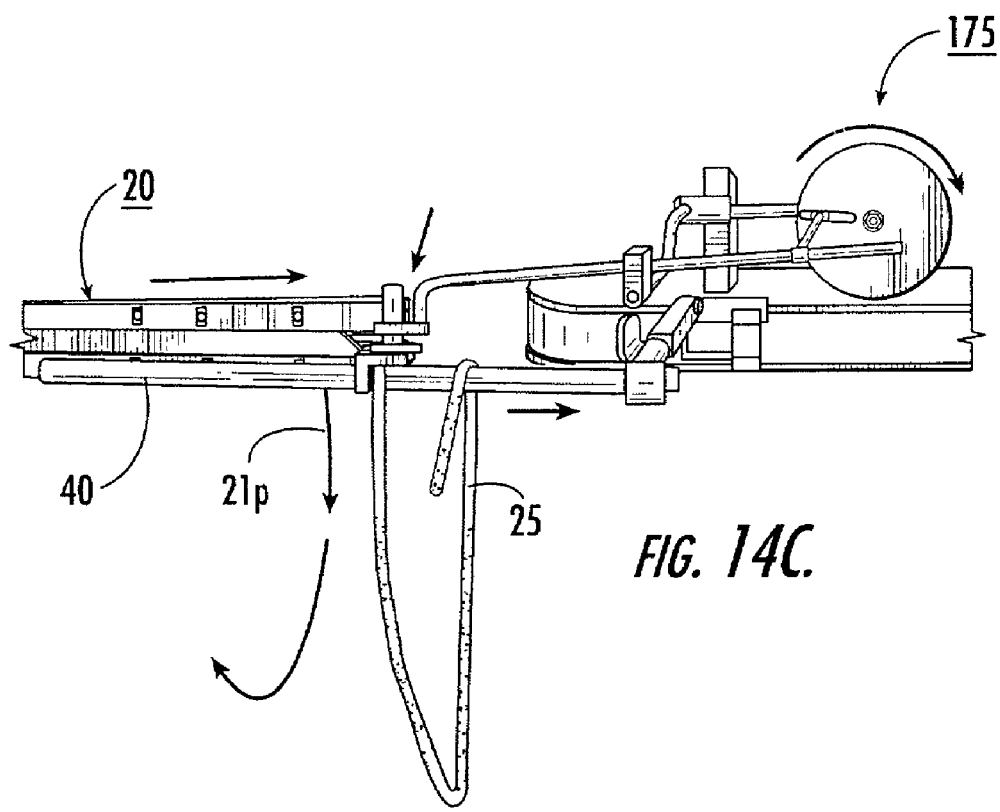
Figure 14D:
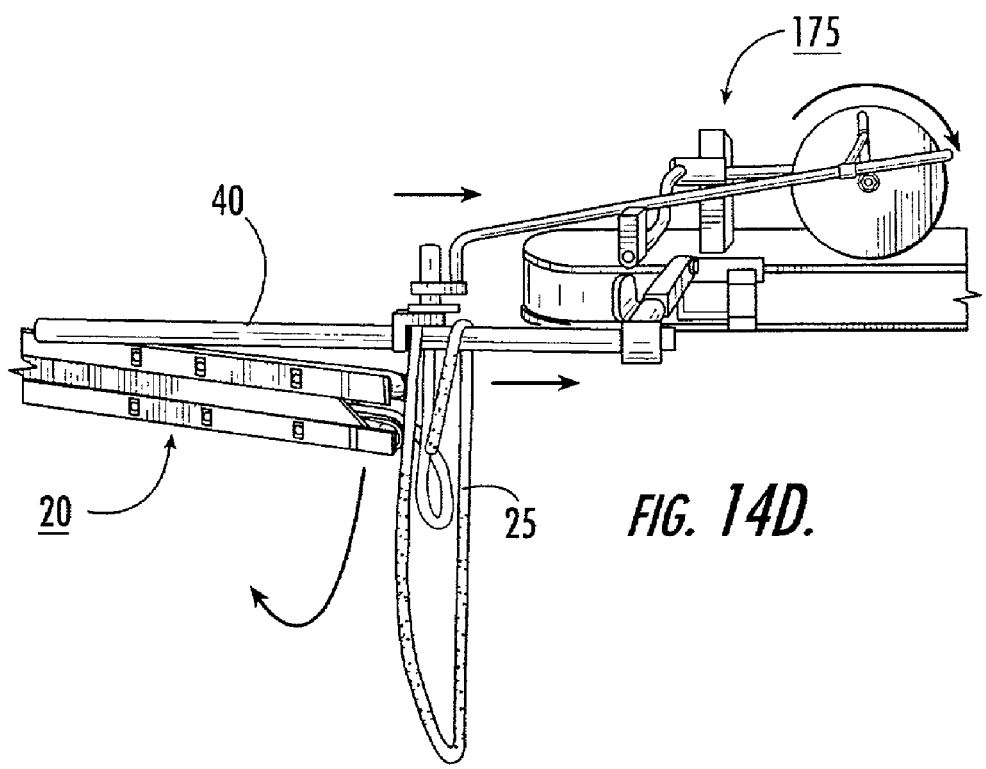
Figure 14E:
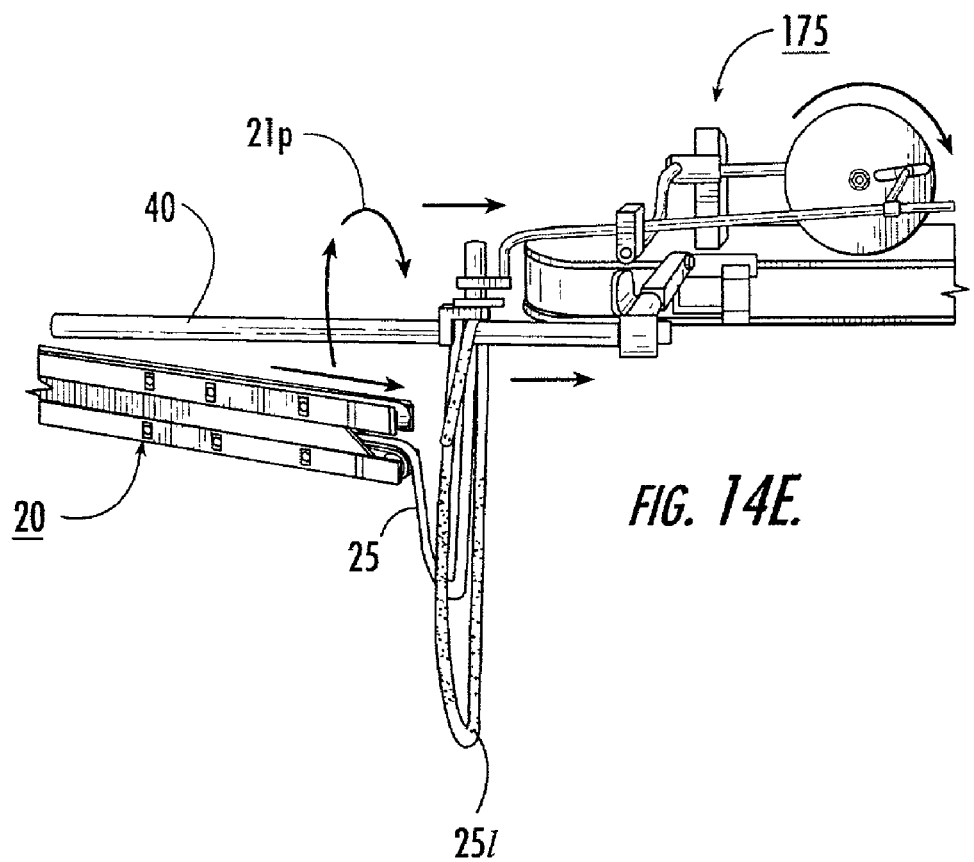
Figure 14F:
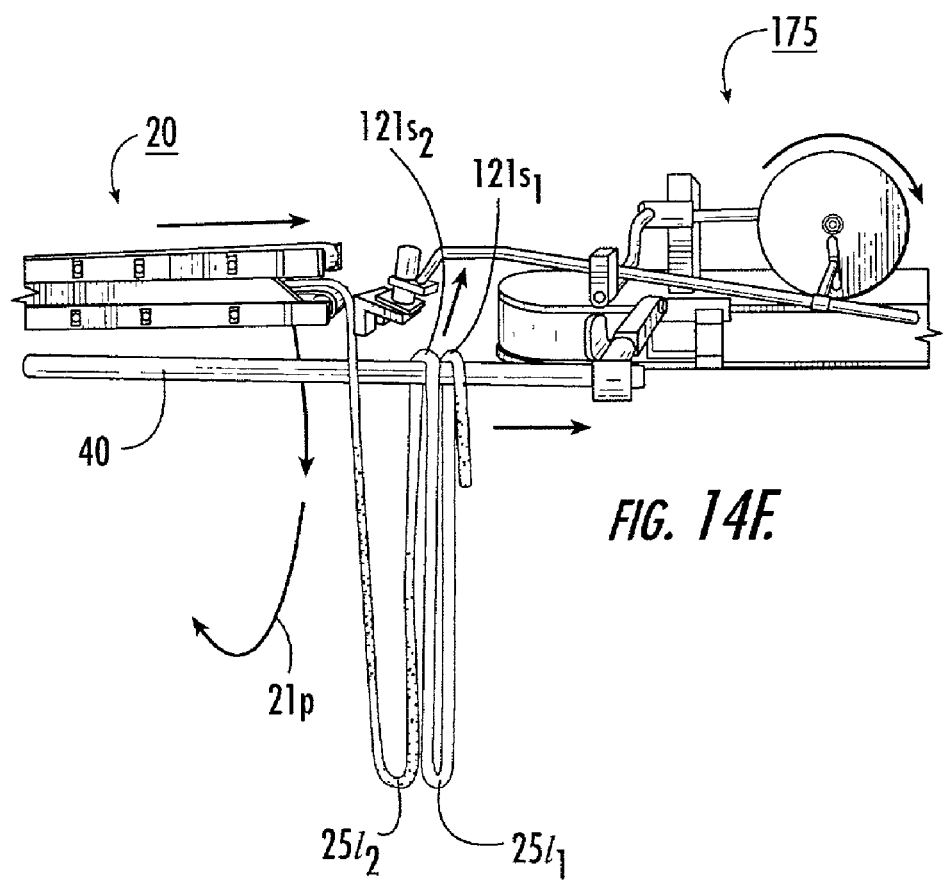

As shown in FIGS. 14A–14F, the packing mechanism 175 also includes a drive mechanism 177 attached to the second end portion of the packing arm $175a_2$ to repeatedly move the packing arm 175a through a predetermined motion cycle so that the fork member 176 serially moves through its travel cycle. The drive mechanism may be automatically or manually operated. FIG. 14A illustrates that the drive mechanism 177 can be operably associated with an automated drive means such as a motor 177m. As shown by the sequence in FIGS. 14A–14F, the cycle sequence may be such that the fork member 176 moves in a first longitudinal direction (shown in the rearward substantially longitudinal direction in FIG. 14A), travels down a desired vertical distance sufficient to cause the fork member 176 to engage the carrier member 50 (FIGS. 14B, 14C and 15A, 15B), moves in a second longitudinal direction opposite the first longitudinal direction with the fork member substantially horizontal (FIGS. 14D, 14E), then rises a distance to reside above the carrier member 40 (FIG. 14F). The arm 175a and the fork member 176 may be configured to stall for a desired interval of time during a portion of the cycle, typically after they rise (FIG. 14F) and before they descend again (FIG. 14B). The stall or static interval can be timed to define when the fork member 176 will next contact the carrier member 40. The stall interval can depend on the discharge speed of the product 25 from the winder mechanism 20, the speed of the winder 20 as it moves through its winding path 21p and the number of times it is desired for the fork member 176 to contact the carrier member 40 and/or product 25. For example, in certain embodiments, the winding arm 21a may be configured to operate with a pause of about 0.5–2 seconds at one or more locations in its travel path, as the winding arm 21a (FIG. 17A) moves about the carrier member 40. In other embodiments, increased stall times can be used, while in still other embodiments no stall time is used as the amount or speed of drag or movement of the fork member 176 can be timed to continuously move through its operative positions in a variable or constant speed. Combinations of variable speeds, constant speeds, and the use of stall intervals may also be used depending on the application.

For example, the carrier member 40 can be loaded by having the winding arm 21a present the product onto the carrier member 40 so that it is straddled in a desired suspended configuration. The straddling operation has an associated speed that is dependent upon the discharge rate of the product 25 from the winder 20 and the speed of movement of the winder arm 21a about the carrier member 50. Similarly, the packing arm 175a also has an associated speed. The packing arm 175a speed can be adjusted based on the speed of the straddling operation so that it does not disrupt the loading and can move the product 25 at desired intervals during the loading cycle.

In operation, in certain embodiments, the straddling operation is carried out by the winding arm 21a as it travels in a predetermined pattern and discharges food 25 therefrom in a forward direction while the winding arm 21a is traveling through its pattern 21p. The packing arm 175a can be configured to move rearward and forward in a repetitive packing cycle. That is, the repetitive packing cycle can be performed so that the packing arm 175a serially moves in a rearward direction above the carrier member 40 relative to the direction of the discharged food, then stops for a static interval before it declines to contact the carrier member 40 and moves forward thereby pushing the suspended region in back 176b of the packing arm 175a forward, and then rises to complete a packing cycle.

In certain embodiments, the carrier member 40 can be translated forward during the operation of the packing mechanism 175. In this situation, the fork member 176 can sequentially engage different segments of the product and/or different locations of the carrier member 40 to thereby arrange different portions of the product to be closer together. The carrier member 40 is shown as moving forward (horizontal arrows proximate the carrier member 40 in FIGS. 14B–14F) with the packing arm 175a also moving or pushing the suspended product forward on the carrier member 40 itself. However, the movement of the arm of the mechanism 175a and translation of the carrier member 40 can be reversed. In addition, in lieu of moving the carrier member 40, the winding arm 21 of the winder 20 and the packing mechanism 175 can be moved with the packing mechanism being stationary to distribute elongated product over a desired length of the carrier member 40.

Further, in certain embodiments, instead of positioning the packing mechanism 175 in front of (downstream of) the winding arm 21 as shown, the packing mechanism 175 may be placed to the side or rear of the winding arm 21 and be configured to reach in and periodically push, pull or move the suspended product forward or rearward on the carrier member 40 (not shown).

FIGS. 14A and 14B illustrate that the winding mechanism 177 can be mounted to a platform 175p that holds at least a portion of the mechanism 177 thereon. As shown, the platform 175p includes an upper bracket 190 that holds the packing arm 175a in a manner that allows the packing arm 175a to pivot thereon. The platform 175p can also include a lower bracket 191 that can hold an edge portion of the carrier member 40. The lower bracket 191 may be operably associated with a drive track 193 mounted on the platform 175p that automatically positions the carrier member 40 at the packing station and/or moves the carrier member 40 forward at a desired speed during the packing operation.

As shown in FIGS. 14A and 14B, in certain embodiments, the drive mechanism 177 can be a four-bar linkage mechanism that includes a rotatable wheel 178 that can be mounted to the platform 175p. The wheel 178 can be powered to be automatically driven by a shaft connected to a motor as shown schematically in FIG. 14A. The wheel 178 can be substantially continuously operated so as to repeat the packing cycle(s) a plurality of times for each carrier member 40 presented to the packing arm 175a. The wheel 178 is connected to a linkage 179 that may travel in a restrained slot 180 formed in the wheel 178. The linkage 179 is attached to the arm 175a. In operation, as the wheel 178 rotates, the linkage 179 repeatedly follows a defined path (shown by different locations in FIGS. 14A–14E (FIG. 14F shows the position shown in FIG. 14A), and pulls the arm 175a through a desired motion output.

Of course, any suitable mechanisms and/or components can be employed, including, but not limited to, cam/follower arrangements, pistons (pneumatic or hydraulic), combinations of differently configured linkages with any of the above as well as other electromechanical configurations that can generate the desired repeated motion.

The packing arm 175a may be configured to directly contact each suspended region $121S_1$ through $121S_n$, (FIG. 16) or only selected ones of the suspended regions. The packing arm 175a may be operated to move groups of suspended regions in a desired direction on the carrier member 40 or a selected suspended region independently of the others. In certain embodiments, the packing arm 175a repeatedly moves to push serially successive spaced-part suspended regions forward along the carrier member 40. In other embodiments, the packing arm 175a pushes non-serially successive spaced-apart suspended regions forward along the carrier member 40.

The product 25 may be arranged in a looped (FIGS. 16, 17A) or non-looped (FIGS. 17C, 17E) configuration on the carrier member 40 as will be discussed further below. FIG. 16 illustrates that a continuous length of elongated product 25 is suspended with substantially even lengths $251_1$, $251_2$, $251_n$ of product on opposing sides of the carrier member 40 over a desired length of the carrier member 40. Other product loading or draping configurations may also be employed.

Figure 15A:
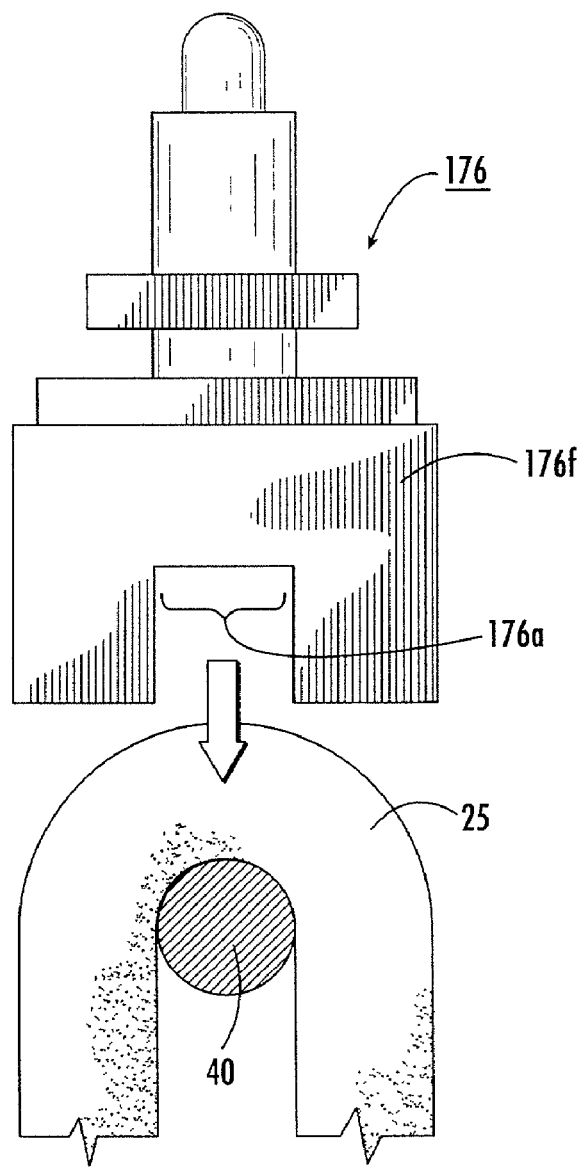
FIG. 15A is an enlarged front view of the end portion of the packing mechanism shown in FIGS. 14A–14F positioned relative to an underlying carrier member according to embodiments of the present invention.
Figure 15B:
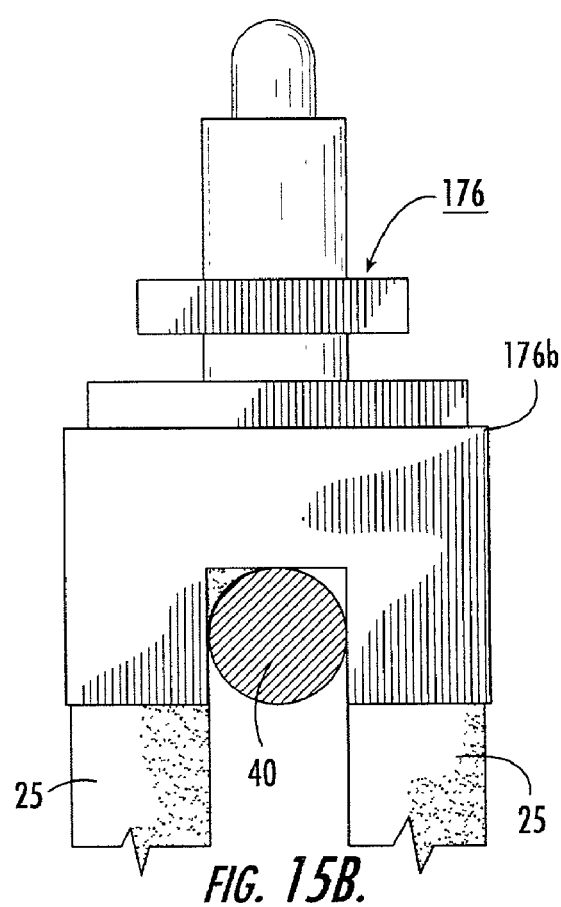
FIG. 15B is an enlarged front view of the end portion shown in FIG. 15A with the device translated a distance down so as to engage with the carrier member in front of (or behind) a selected region of suspended elongated product according to embodiments of the present invention.

FIGS. 15A and 15B illustrate an example of the fork member 176 that is attached to the end portion of the arm 175a. The fork member 176 includes a forward or front surface 176f and a rear surface 176b, and may also include an aperture 176a that is sized and configured to correspond to the width of the carrier member 40. The fork member 176 can be sized so as to rest on the carrier member 40 as it pushes, wipes, and/or moves the product on the carrier member 40. The fork member 176 may directly or indirectly contact the product and/or the carrier member 40. For example, as shown the fork member 176 can snugly abut the carrier member 40 and push the food in the desired direction. The fork member 176 may be formed of stainless steel or other material suitable for processing the product (such as food). Lubricating coatings may be employed to inhibit friction between the fork member 176 and the carrier member 40 and/or product 25. In other embodiments, the fork member 176 may be configured to controllably discharge fluid such as air, water, or other pressure applying means, in a desired orientation to move the product along the carrier member 50 (not shown).

Referring again to FIGS. 15A and 15B, in operation, the fork member 176 travels over the carrier member 40 (FIG. 15A) and then travels down a distance to cooperably engage the carrier member 40 (FIG. 15B) so as to move the product along the carrier member 40 in a desired direction to promote efficient side-by-side abutting placement or closely spaced alignment between adjacent suspended regions $121S_1$, $121S_2$, $121S_n$, as shown in FIG. 16.

Figures 17A, 17B:
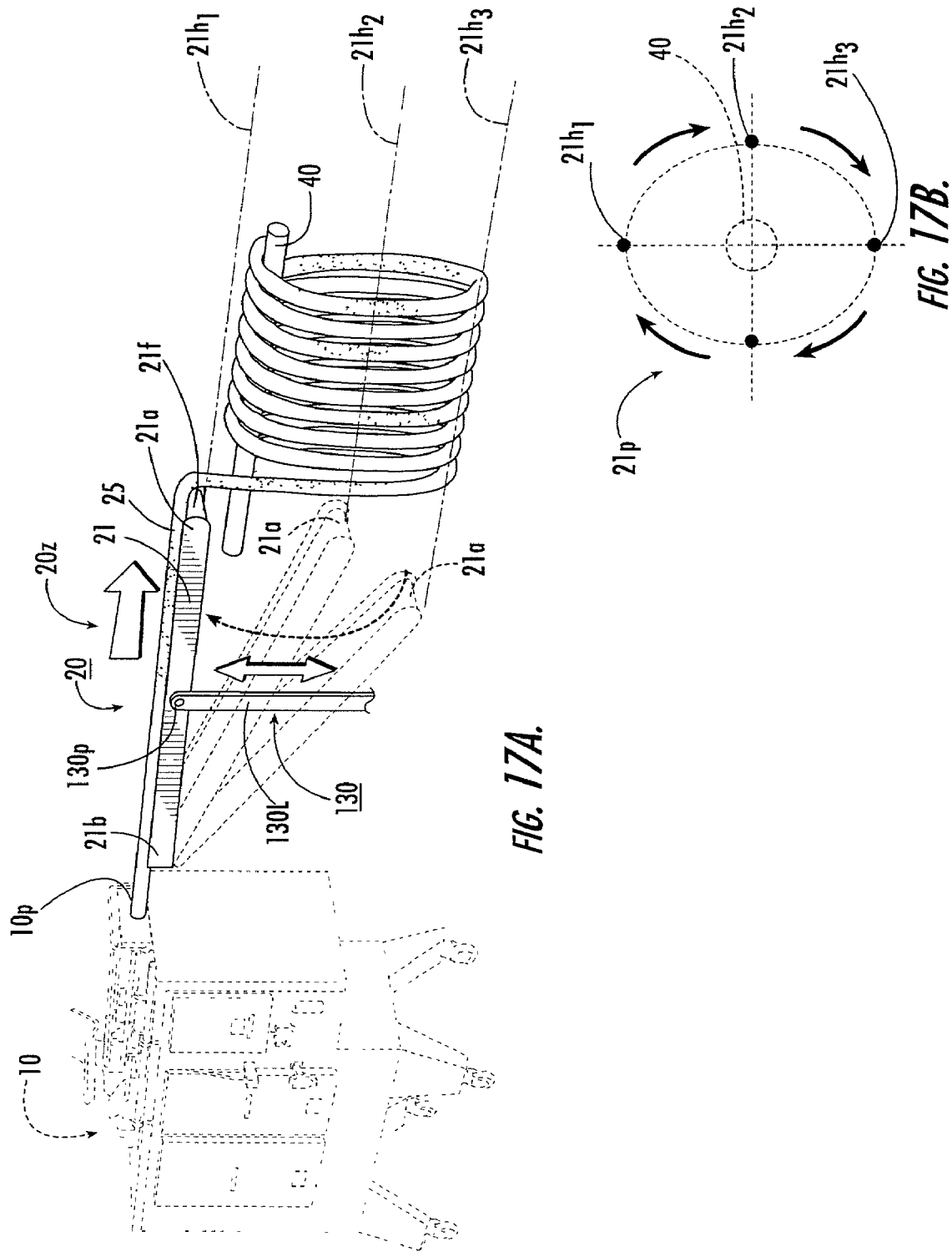
FIG. 17A is a side view of a portion of an automated winder according to embodiments of the present invention.
FIG. 17B is a schematic illustration of an exemplary motion pattern of the arm of the automated winder of FIG. 17A according to embodiments of the present invention.

Turning now to FIG. 17A, one embodiment of an automated winder 20 is shown. The automated winder 20 includes an elongated arm 21 with first and second opposing end portions 21a, 21b, respectively, and a winding mechanism 130. In this view, the winding mechanism 130 is schematically illustrated by a translation linkage 130L that is attached to the arm 21 in a manner that allows it to repetitively move the arm 21 in a desired translating motion or pattern. At the other end of the translation linkage 130L can be any number of suitable translation generation means as will be appreciated by those of skill in the art. As shown, the arm 21 directs the elongated product 25 onto a desired transport support member 40 (shown as a stick or rod). In operation, a plurality of support members 40 are serially placed in aligned cooperating position with the arm 21 of the winder 20 so that each support member 40 can be successively loaded or wound with looped elongated product 25.

In certain embodiments, the winding mechanism 130 is configured to provide a motion for the arm 21 that includes at least a substantially continuous or repeating motion (open or closed path) as indicated by the solid line arrows positioned proximate the translation linkage 130L. Additionally, the winder mechanism 30 may also be configured to translate in a more complex, multi-directional motion (as indicated by the broken-line arrows shown adjacent the solid-line arrows, the motion may also be include movement that is directionally in and out of the paper "the Z axis"). Thus, as shown by the dotted line arrows adjacent the solid line arrows, the translation linkage 130L may drive the arm 21 to move in a direction which is a closed path including two different axis of travel, typically including both X and Y axis directional components. The closed path may be shaped in any desired suitable configuration, including, but not limited to, an oval, teardrop, circular, elliptical, hourglass, square, or rectangle, so as, in operation, it causes the elongate product to wrap to the desired configuration. Further the winding mechanism 130 may be programmably configured to alter its winding pattern, winding speed, and the like, depending on certain parameters such as the product being processed and/or the loading configuration desired.

By way of illustration, as shown in FIG. 17B, the arm 21 can have a maxima position at a first vertical height $21h_1$, two intermediate positions at a second lesser height $21h_2$ (shown with the arm 21 in dotted line below the maxima height), and a minima position $21h_3$ at still a lesser vertical height (shown with arm 21 at yet another lower position at a minima height). The arm 21 is configured to move a sufficient distance above and below the transport member 40 so as to load or loop the elongate product 25 thereon.

FIG. 17B illustrates but one embodiment of a rotational motion pattern 21p for the arm 21 in which the arm 21 successively moves through a selected repeating pattern that may be traveled as an open or closed path pattern. In certain embodiments, as shown in this figure, the pattern 21p may be substantially elliptical or oval. In this pattern, the arm 21 travels through the intermediate positions both as it is moved and/or rotated in the closed path in the downward and upward directions. In position, the transport member 40 is located within the perimeter of the enclosed closed travel path defined by the translating arm 21. In certain embodiments, the transfer member 40 can be located so that it is centrally located within the boundary of the movement of the arm. In other embodiments, the transfer member is asymmetrically positioned (such as closed to the top, bottom or one side of the arm movement). The direction of travel is shown as clockwise in FIG. 17B, but may be configured to be counterclockwise as well.

FIG. 17A shows that the first end portion 21a of the arm is positioned a length away from the discharge port 10p of the upstream processing station. As shown, the upstream processing station can be the extruder 10 (such as the conventional extruders shown in FIGS. 1A–1C) and the second end portion 21b of the arm is positioned proximate to, and in cooperating alignment with, a discharge port 10p of the extruder (or stuffer) 10 or intermediately positioned member such as a chute. That is, the second end portion of the arm 21b is positioned so as to receive the elongated product 25 from the upstream device and the opposing (first) end portion 21a is configured to release the elongated product 25 after the product 25 has traveled a desired distance over the length of the arm 21. Typically, the product 25 will travel a major portion of the length of the arm, and more typically, substantially the entire length of the arm 21 before it is released. The product 25 can be released directly from the first end portion 21a, or a discharge nozzle or other discharge port can be attached to the arm 21 and used to dispense the product 25 therefrom.

In operation, the transfer member 40 can be configured to start at a first position that is toward the upstream end 21b of the arm 21 and during loading is gradually retracted or translated to be closer to the downstream end 21a of the arm 21 all at substantially the same vertical height (as shown by the horizontal arrows adjacent the transport member 40 in FIG. 17A). This motion distributes looped product over the desired length of the transport member 40. FIGS. 18A and 18B illustrate the winding translation of the arm 21 with respect to the transport member 40. The transport member 40 is located at a first position $P_1$ and is gradually moved forward to a second position $P_2$ as the arm 21 winds the product 25 thereon. Thus, the transport member 40 moves a distance $\Delta P$.

In certain embodiments, the transport member 40 moves at a substantially constant speed or increments of travel distance that is synchronized and/or responsive to one or more of the speed of the winding (speed of the arm), the speed of forward movement of the product 25 as it exits the arm 21, and the desired looping arrangement/configuration (length of the loops) on the transport member 40. In certain embodiments, the movement of the transport member 40, the winding speed of the arm 21, and/or the speed of the elongate product 25 as it moves off the arm, can vary to provide variable loading density or looping lengths. Thus, the movement distance and speed of movement of the transport member 40 can vary depending on the desired loading of the transport member and winding speed and loop configuration (length, etc.). Typically, the transport member 40 moves a distance that corresponds to a substantial portion of its length (i.e, greater than about 51–75% thereof). Although described as starting from a rearward position and moving forward, the transport member 40 can be configured to move in the reverse direction also.

FIG. 17C illustrates an alternate loading arrangement of the elongated product on the transport or receiving member 40 with an example of an associated winding pattern 21p of the arm 21. As shown, the arm 21 is configured to load the product in a suspended straddled, non-looped configuration (i.e., the product does not double over or loop to cross or close upon itself). As shown in FIG. 17C, one or more one continuous lengths of released elongated product can be loaded onto the transfer support member 40 in response to the release of the product 25 from the moving arm during the translation thereof so that the elongated product 25 is arranged in a straddled configuration with a plurality of adjacently arranged non-looped vertical lengths, such as $L_2$, $L_4$ or $L_5$, $L_7$, hanging on the same side of the transfer support member and a plurality of different adjacent non-looped lengths, such as $L_1$, $L_2$ or $L_4$, $L_5$, hanging on the opposing side of the transfer support member so that the elongated product 25 has a plurality of suspension contact points 121Sn spaced apart about a desired length of the transfer support member 40. As used herein, the term "suspension contact points" means the discrete physical contact spaces, areas, or regions between the product 25 and the transfer support member 40. The area or size of the contact points may vary depending on the size, weight, and/or width of the product, and/or the size and/or width of the transfer support member 40.

Still referring to FIG. 17C, as shown, the winding mechanism 130 is configured to configure the suspended straddled arrangement of the elongated product 25 on the transfer support member 40 such that, in serial order, a first continuous length of product is arranged so that a first vertical length $L_1$ of the elongated product extends about one side of the transfer support member 40, a second vertical length $L_2$ extends over the opposing second side of the transfer support member 40 after the first length $L_1$, a first suspension portion $121S_1$ is located intermediate the first and second lengths $L_1$, $L_2$, respectively. A third adjacent length $L_3$ laterally extends along the second side of the transfer support member 40 after the second length $L_2$, a fourth vertical adjacent length $L_4$ extends along the second side of the transfer support member 40 after the third length $L_3$, a fifth vertical adjacent length $L_5$ extends along the first side of the transfer support member 40 after the fourth length $L_4$, a second suspension portion $121S_2$ is located intermediate the fourth and fifth lengths $L_4$, $L_5$, respectively, and a sixth adjacent length $L_6$ laterally extends along the first side of the transfer support member 40 after the fifth length $L_5$.

In operation the arm 21 can move have lateral directional travel components so as to move back and forth across above the transfer support member 40. In so doing, the elongated product 25 can be discharged to hang or drape from a first side of the transfer support member 40, cross over the width of the body of the member 40 and hang or drape another vertical segment down the other opposing second side. The arm 21 continues to release the elongated food so that another vertical segment or portion hangs or drapes still on the same second side before it re-crosses over the transfer support member 40 and drapes another vertical length back on the first side of the transfer support member. The non-looped straddled product can be arranged so that the suspended vertical draped lengths are substantially the same, dissimilar, or combinations thereof. The draping motion can be continued so as to substantially fill a major portion or substantially all of the length of the transfer support member with the elongated product 25. The lateral lengths of product (i.e., $L_3$, $L_6$) can be disposed so that they are substantially horizontal as shown, or in other desired configurations. The length of the lateral segments can alter and can be controlled by the movement pattern and speed of discharge, the speed of the motion of the arm, and the movement and speed of the transfer support member 40 during the loading process or operation.

FIG. 17E illustrates that in lieu of a single continuous length of product 25, a plurality of discrete product lengths can be straddle loaded onto the transfer support member 40. In operation, the winding mechanism 130 causes the arm 21 to release a plurality of discrete lengths of elongated item 25 so that the items are arranged in a suspended laterally spaced apart straddled configuration, each discrete length having opposing first and second end portions $25p_1$, $25p_2$ and an intermediate portion $121S_1$, $121S_2$, therebetween, respectively. In position, the first and second end portions $25p_1$, $25p_2$, respectively, vertically extend to reside adjacent to each other on opposing sides of the transfer support member 40 and the respective intermediate portion $121S_1$ or $121S_2$, defines a respective one suspension contact region that contacts the transfer support member 40.

Referring to FIG. 17C, stated differently, certain embodiments of the suspended straddle configuration of elongated product 25 on the transfer support or carrier member 40 is provided so that sections of the elongated product form bights $B_1$, $B_2$ ... $B_n$ that are draped from the rod, with longitudinally consecutive or serially positioned bights, being formed and/or located on opposing sides of the carrier member. The bights are sections of the elongated product that bend or curve but do not intersect. As such, the elongated product has adjacent or serially consecutive bights, each of which can have a series of bends or curves (i.e., defined by serially consecutive vertical, longitudinal, and vertical segments) that are draped on one side of the carrier member 40 before the next bight starts across the other side of the carrier member 40. The loaded transfer member 40 can define a loaded carrier member assembly with elongated product thereon. The product can be arranged on the carrier member so that the elongate product is suspended in a straddled configuration, draped from the carrier member, so that sections of the elongated product form bights, with serially consecutive bights being formed on opposite sides of the carrier member. Each or selected bights can have a plurality of bends or curves and the adjacent bights do not intersect or crossover each other.

FIG. 17D illustrates an exemplary loading motion $21p$ of the arm 21 that can be used to provide the straddle arrangement shown in either FIG. 17C or 17E. As shown, the loading motion is an open path that has a boundary that has lateral components that permits the arm 21 to travel back and forth across the width of the transfer support member 40. As shown, the arm 21 is disposed so that the travel path boundary primarily extends above the underlying transfer support member 40. FIG. 17D also shows that the travel motion $21p$ can be substantially arcuate with the shape defined by lowermost points $21p_1$, $21p_3$, and the maxima position $21p_2$. In operation, the arm 21 can repetitively travel in the motion pattern shown $21p$ or in other suitable motion patterns. FIGS. 27A–27G illustrate exemplary straddle loading motion patterns $21p$, some of which are open and some of which are closed travel paths.

FIGS. 27A, 27C, 27D, and 27E illustrate different open arcuate patterns $21p$. FIG. 27A illustrates that the arcuate pattern $21p$ can be reversed so that it turns upward with opposing end portions $21p_1$, $21p_2$, that are above the transfer support member 40 and a minima location $21m$ disposed therebetween. FIGS. 27G and 27F illustrate closed path motion patterns $21p$ for the arm 21. The pattern $21p$ shown in FIG. 27G is above the rod and has increased vertical travel distance relative to the amount of lateral travel distance. FIG. 27F illustrates that the path $21p$ may have increased horizontal or lateral travel distance relative to the amount of vertical travel distance. FIG. 27F illustrates that in certain embodiments, no matter whether an open or closed path, and notwithstanding the configuration thereof, the travel motion pattern $21p$ can be offset, inclined about, and/or not centered on or over the transfer support member 40.

FIGS. 18C and 18D illustrate the translation of the arm 21 with respect to the transport member 40 (each moving during the loading operation) that can be used to straddle load the transport member 40 with product 25 such as shown in FIGS. 17A–17C. As shown, the transport member 40 is located at a first position $P_1$ and is gradually moved forward, typically in a unidirectional manner, to a second position $P_2$ as the arm 21 drapes or hangs the product 25 thereon. Thus, in the portion of the loading cycle illustrated, the transport member 40 moves a distance $\Delta P$. The travel path of the transport member can be such that it is generally below and different from that of the arm 21. In certain embodiments, the arm 21 travels side to side over the transport member with a constant or variable speed while the transport member 50 moves unidirectionally forward held substantially horizontally at a desired speed.

The length of the arm 21 can vary depending on various factors, such as, but not limited to, the size of the product, the forward speed of the product, the desired winding pattern and the like. In certain embodiments, the length of the arm 21 is sized to be at least the length of the transport member 40. In other embodiments, the length of the arm 21 is such that the elongate product 25 travels at least about 2–8 feet, and typically at least about 6 feet, before being discharged therefrom onto the support member 40.

Figure 21:
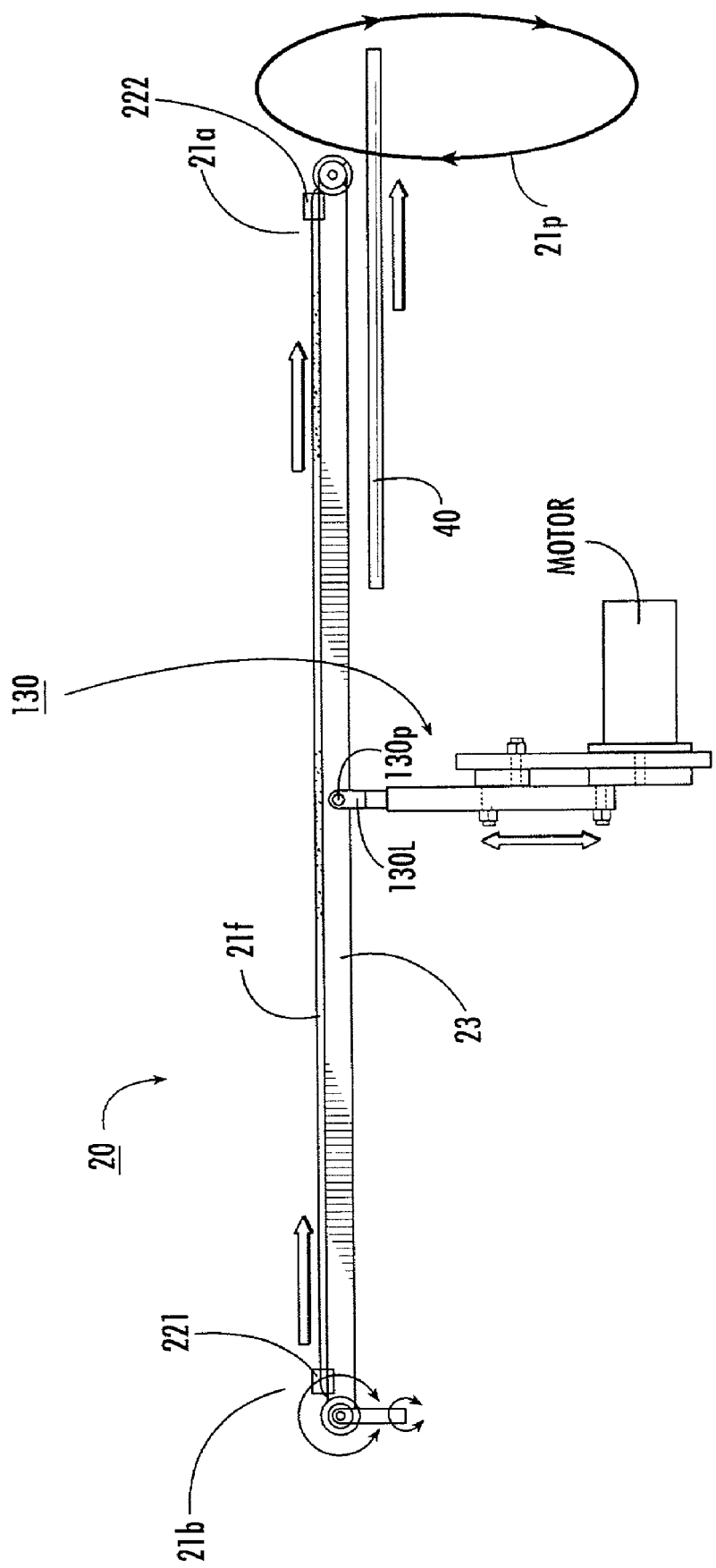
FIG. 21 is a side view of an automated winder system illustrating the winder attached below the winding arm according to embodiments of the present invention.
Figure 23:
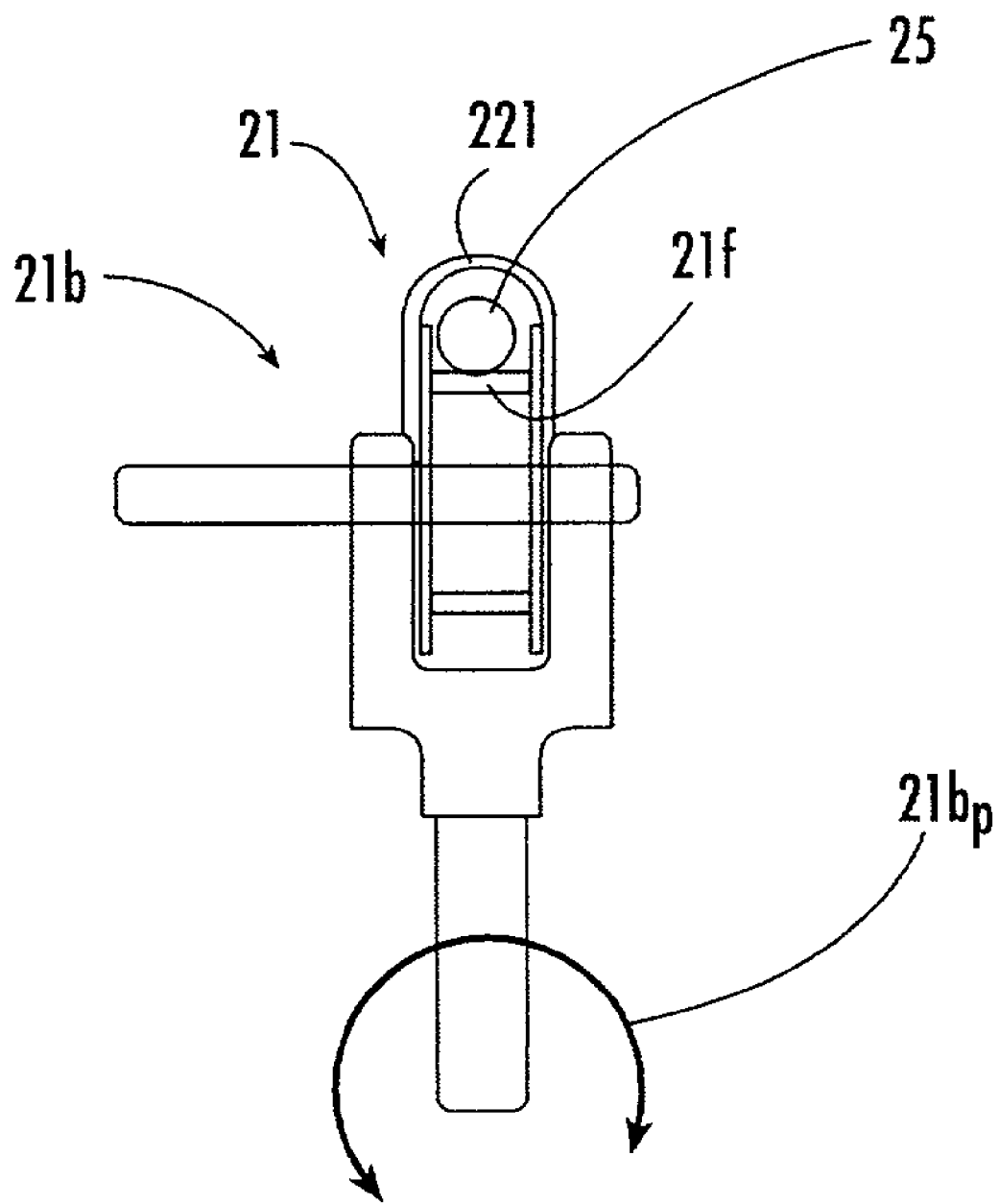
FIG. 23 is an end view of the winder arm shown in FIG. 21.

The automated winder 20 may be configured to be self-supporting or free-standing and portable or free-standing and secured to the production floor relative to the related upstream and/or downstream equipment, as desired. In other embodiments, the second end portion $21b$ of the arm can be attached to the extruder or upstream device 10 so as to be in communication with the discharge port $10p$. As such, the second end portion $21b$ is stationary but can be pivotally attached to the device 10. In certain embodiments, the second end portion $21b$ is mounted so as to be able to move bi-directionally; the mounting or attachment can be configured in any suitable manner, such as, but not limited to, a universal joint, ball joint, bearing, elastomeric joint, and the like. FIG. 23 illustrates an end view of one embodiment of the arm 21 with an end portion $21b$ configured to be mounted to an extruder or other upstream-positioned device. As shown, the end portion $21b$ is configured to be affixed to a device 10 so that it is stationary or fixed in place but allowed to translate in a bi-directional manner in response to forces introduced by the movement of the arm 21 as it, in turn moves in response to forces introduced by the winding mechanism 130 (FIG. 21).

The arm 21 can be any desired shape or configuration. The arm 21 includes a floor $21f$ that supports the elongate product 25. The floor $21f$ can be stationary or moving, or combinations thereof. For example, the floor $21f$ can comprise rollers, low-friction coatings or surfaces, a conveyor belt(s), and the like. In certain embodiments, the floor $21f$ is defined by an endless conveyor 23 (FIG. 21) that wraps around the arm 21 to continuously convey the product 25 forward and then return to the starting position by traveling back underneath the floor $21f$. As shown in FIG. 20B, the arm 21 can include a channel or chute $21ch$ that is configured with a shape that complements the elongated product 25. For example, for a substantially circular cross-section product 25, the floor $21f$ may include an arcuate or semicircular channel $21ch$ formed into the floor that is configured to receive a portion of the perimeter of the body of the product therein. In certain embodiments, the channel $21ch$ may be sized to be slightly larger, i.e, have a sectional height and/or width that is about 0.1–10% greater, than the height and/or width of the product 25. The channel $21ch$ may be formed over all or portions of the length thereof. The elongate product 25 can be held in the channel $21ch$ as it travels over the length of the arm 21.

As shown in FIGS. 20A and 20B, the arm 21 may include a cover member $21c$ that covers the floor $21f$ and encloses the elongate product 25 therein. In certain embodiments, the channel $21ch$ and the cover $21c$ may be formed from two or more matable shell members or, alternatively from a housing or a conduit that is positioned on the arm 21 to define an enclosed channel $21ch$. The cover $21c$ may be transparent or translucent or include viewing windows along the length thereof so that a machine or operator may view or inspect product flow at desired points (or substantially all or all of the travel path). The cover 21c may be formed of a solid material. In other embodiments, a permeable or mesh-like cover (not shown) can be used.

Various automated detectors can be placed at desired locations along the arm to verify proper operation and to render an alert when an abnormality is indicated. Examples of such detectors include optical detectors (infrared or otherwise that respond to changes in visual intensity or generated light beams), flow meters, pressure meters, temperature sensors, and the like.

As shown in FIG. 17A, the winding mechanism 130 is configured to approach the arm 21 from the lower or bottom surface. As such, the winding mechanism 130 can be attached, directly or indirectly, to one or more of the bottom side (lower primary surface) and/or one or more sides (minor surfaces) of the arm 21. FIG. 19 illustrates that the winding mechanism 130' may alternatively be mounted to approach the arm from the topside. As such, the winding mechanism 130' can be configured to suspend the arm 21 and may be attached, directly or indirectly, at the upper primary surface and/or one or more sides of the arm 21. Still other embodiments can be configured so that the winding mechanism 130, 130' is attached via one or more end portions 21a, 21b, of the arm (not shown). Combinations of the attachment configurations noted above may also be used.

Referring to FIGS. 17A, 17B, and 21, the winding mechanism 130 may be attached at an intermediate position at one or more attachment locations, the attachment locations being a distance away from each of the first and second end portions 21a, 21b. Although the winding mechanism may be attached to the arm 21 at any desired length from the respective end portions 21a, 21b, in particular embodiments, the winding mechanism 130 is attached at a primary pivot location that is located inward of the ends of the arm, typically at a location that is inward at least about 20% of the length of the arm (away from each of the ends of the arm). The term "primary pivot location" describes the location on the arm 21 at which the winding mechanism drives the repetitive motion of the arm. It can be a single point contact, a plurality of points, or a region or regions, depending on the configuration of the winding mechanism itself. The attachment position/configuration, the length of the arm, and the weight of the arm and product may influence the amount of physical movement needed by the winding mechanism 130 to generate the desired translation at the end portion 21a of the arm.

FIG. 21 illustrates one embodiment in which the winding mechanism 130 is attached at a primary pivot location 130p that is approximately centrally located between each of the opposing ends of the arm 21. That is, it is located to be within about 10% of the middle location of the arm 21. In certain embodiments, as shown, the arm 21 may also include an initial enclosed entry port 221 (FIG. 23) that is configured to direct the elongated product to travel in its desired substantially linear travel path over the arm 21. Similarly, the arm 21 may include an exit block member 222 that inhibits through passage of the elongated product 25 thereby facilitating the sideward (discharge) of the elongate product 25. In other embodiments, the pivot or winding mechanism 130 can be located closer to the discharge port, i.e., proximate to or adjacent the product inlet port 21b, this position may allow the arm 21 to be shortened (not shown).

Figure 22:
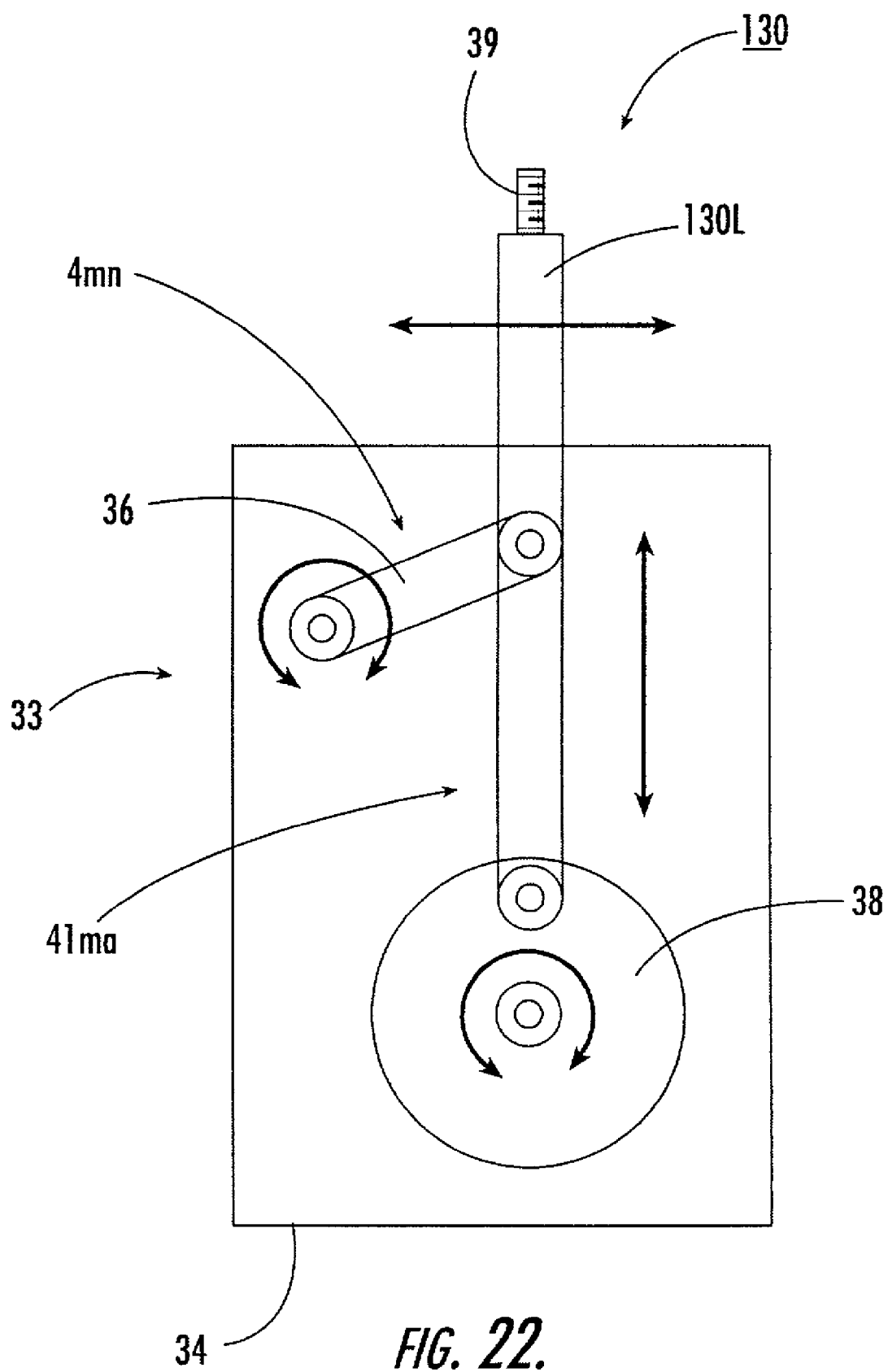
FIG. 22 is an end view of the winding mechanism shown in FIG. 21.

Referring to FIG. 22, an exemplary embodiment of a winding mechanism 130 is shown. This figure is a side view of the device shown in FIG. 21. In this embodiment, the winding mechanism 130 comprises a four-bar linkage 33 that is mounted on a stationary mount bracket 34. The four bar-linkage 33 includes a pivotably mounted rotating link 36, and a stationary mounted wheel 38, a center linkage 130L that is pivotably attached to both the pivotably mounted link 36 and the stationary mounted link 38. In operation, the link 36 and the center link 130L define a minor axis of motion control 41mn while the wheel link 38 and the center link 130L define a major axis of motion control 41ma. The center linkage 130L can include upwardly extending threads 39 that can be used to attach the winding mechanism (directly or indirectly) to the arm 21.

The wheel 38 can be driven by a gear or shaft (not shown) to automatically turn the wheel 38 at a desired speed (constant and/or variable). Generally described, as the wheel 38 turns, the center link 130L follows the rotation of the wheel 38, making the center link 130L move both laterally (indicated by the side-to-side arrows in the upper portion of the linkage) and vertically (indicated by the vertical arrows) all the while limited by the pivotably attached link 36 that limits the lateral motion of the center linkage 130L. In this way, the winding mechanism 130 causes the arm 21 to travel through a repetitive substantially elliptical pattern 21p as shown in FIG. 21. Of course any suitable winding mechanism can be employed, including, but not limited to, cam/follower arrangements, pistons (pneumatic or hydraulic), combinations of linkages and any of the above as well as other electromechanical configurations that can generate the desired repeated winding motion.

Figure 24A:
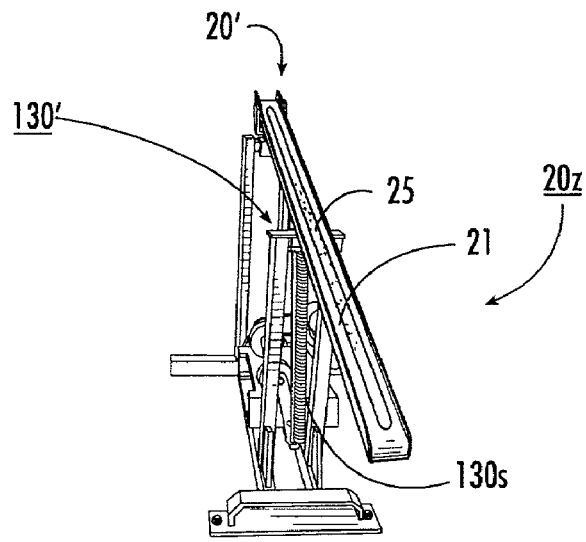
FIG. 24A is a perspective view of an alternative embodiment of an automated winder according to the present invention.
Figure 24B:
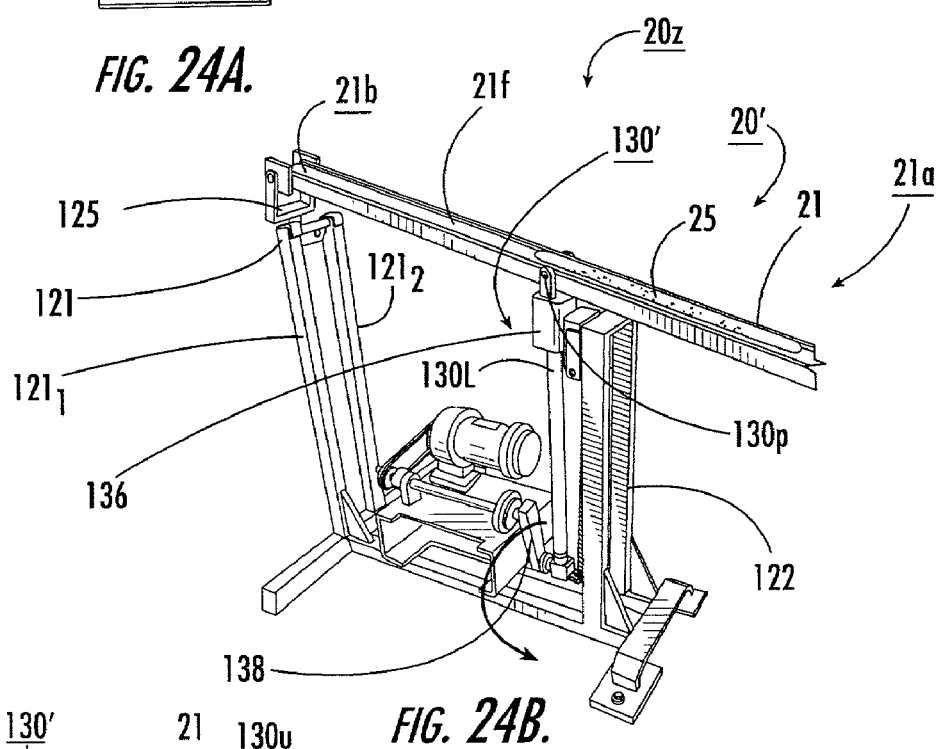
FIG. 24B is a side perspective view of the device shown in FIG. 24A.

FIGS. 24A–24B illustrate another embodiment of a winder 20'. As shown, the arm 21 has two spaced apart floor support mounting brackets 121, 122, a first one 121 positioned proximate the second end portion 21b of the arm and another second one 122 positioned upstream of the first one 121. The first mounting bracket 121 has a junction member 125 that is pivotably mounted to two upwardly extending arms 121₁, 121₂. The junction member 125 supports the arm 21 while cooperating with the winding mechanism 30 so that it allows the arm 21 to move in a multidirectional manner in response to movement of the arm as driven by the winding mechanism 30.

Figure 24C:
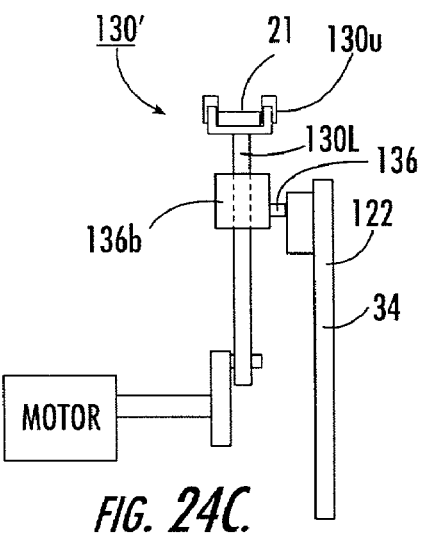
FIG. 24C is a front view of the device shown in FIG. 24A.

FIG. 24B shows that the winding mechanism 130' is attached to the arm 21 at a primary pivot region 130p that is upstream of the first floor support mounting bracket 121. The primary pivot region 130p is at the attachment position of the winding mechanism linkage 130L to the arm. As shown in FIG. 24C, the linkage 130L includes a fork-like upper portion 130u that spans the width of the arm 21 and attaches to opposing sides thereof. Similar to the embodiment shown in FIG. 22, the winding mechanism 130' shown in FIGS. 24A–24C can be operated to cause the arm to move in a substantially elliptical rotational movement pattern. In this embodiment, the winding mechanism 130' includes a vertically elongate linkage 130L (such as a piston or rod) that slidably moves through linkage 136 proximate the upper portion of the vertically elongate linkage 130L and that is connected at the lower portion thereof to a rotational member 138. As shown by the arrows located adjacent the lower rotational member 138 in FIG. 24B, in operation, the clockwise rotation of member 138 forces the vertically elongate linkage 130L to move forward and downward and then rearward and upward relative to the arm 21. A counterclockwise arrangement may also be used. The movement of the vertically elongate linkage 130L is further limited or shaped by the movement of the upper linkage 136 that pivots side to side with respect to the arm 21 (indicated by the arcuate arrows proximate the upper link 136) as the linkage 130L slides through the block 136b that cooperates with the upper link 136. The upper link 136 is pivotably mounted to a block 136*b* and is mounted to the platform 122 via stationary mounting bracket 34. A spring 130*s* can be mounted to the platform 122 to help control and/or dampen the movement of the winding mechanism 30' and/or linkage 130L. As the linkage 130L is rotated by the lower linkage 138 it slides upwardly and downwardly through the linkage 136*b* that in response pivots in lateral direction relative to the arm 21 to cause the repetitive rotation cycle.

Figure 24D:
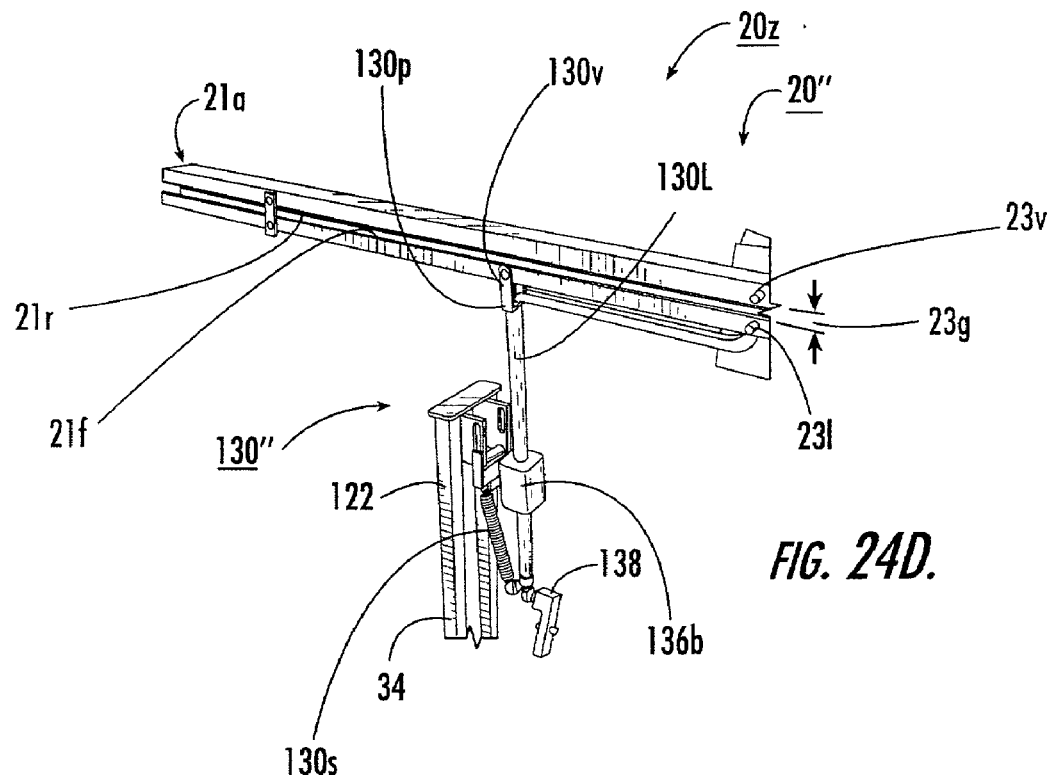
FIG. 24D is a side perspective view of a portion of a winder according to other embodiments of the present invention.
Figure 24E:
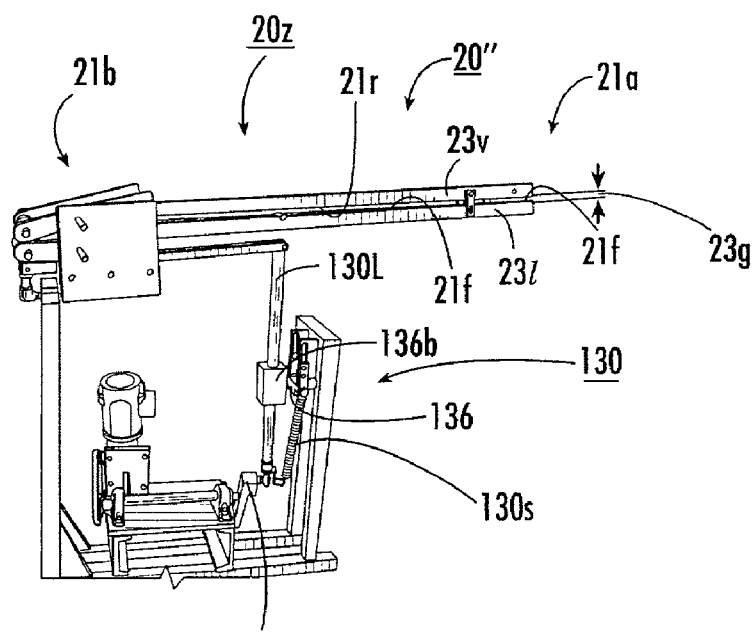
FIG. 24E is side view of the winder shown in FIG. 24D.
Figure 24F:
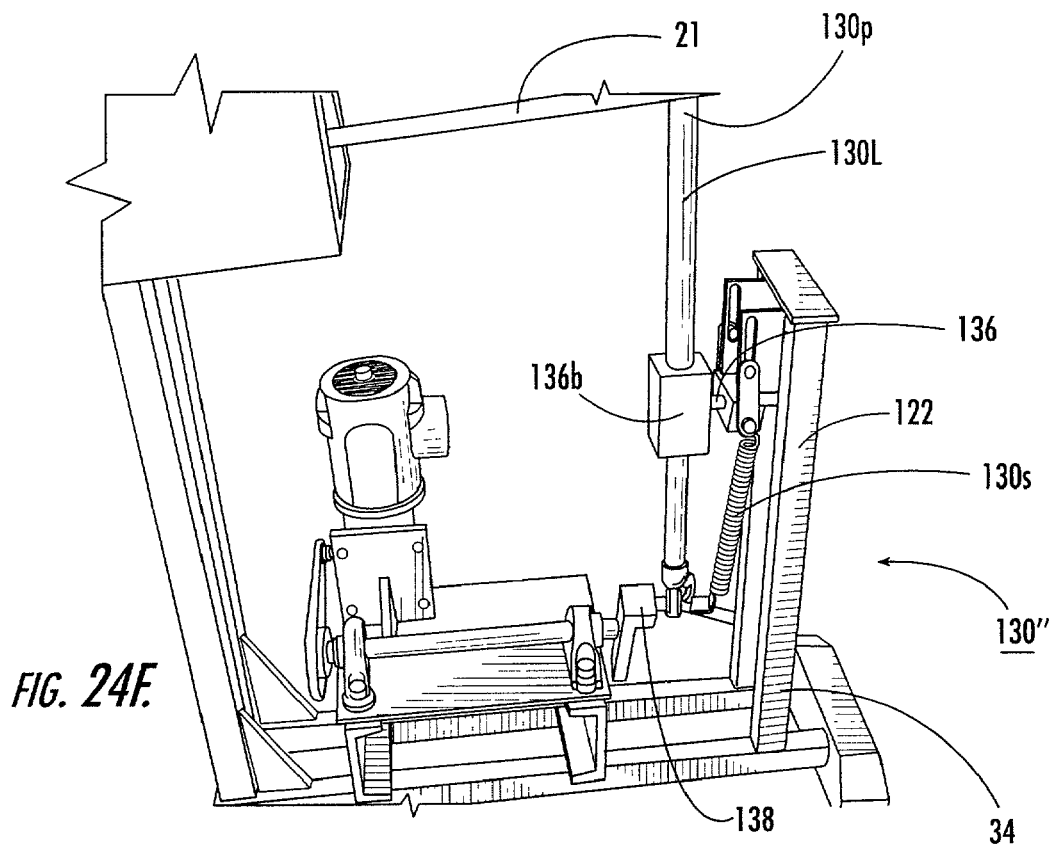
FIG. 24F is an enlarged side view of a winding mechanism shown in FIG. 24E.
Figure 24G:
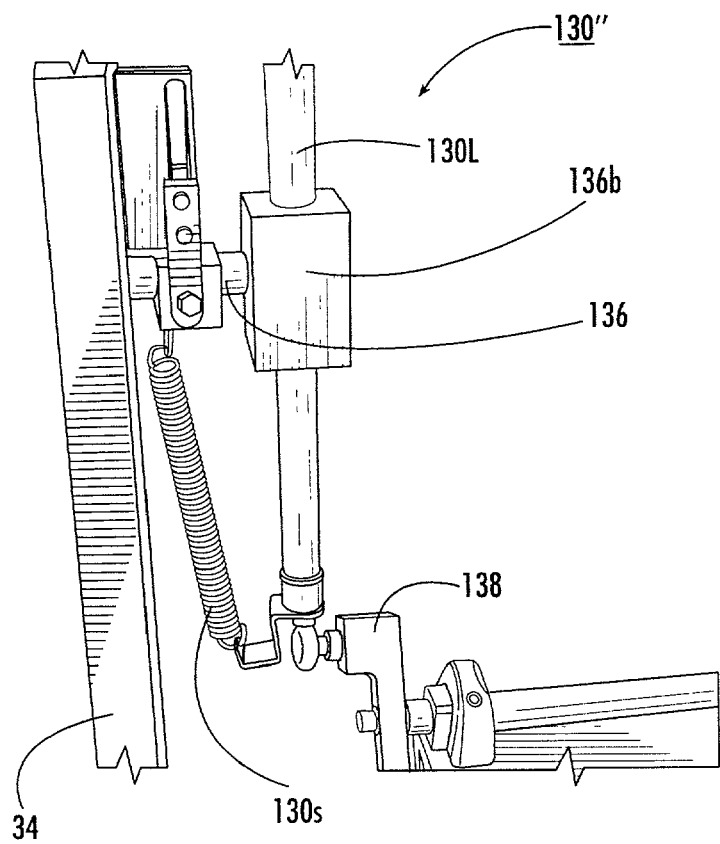
FIG. 24G is an enlarged side perspective view of a portion of the mechanism shown in FIG. 24F.

FIGS. 24D–24E illustrate an additional embodiment of the winding mechanism 20". This embodiment illustrates both a different floor or arm configuration (two overlying conveyors with an intermediate food travel path), and a variation on the winding mechanism linkage assembly. Referring to FIG. 24G, an outer perimeter portion of the rotatable link 138 is shown attached to the lower portion of the link 130L. As the link 138 rotates, the elongated link 130L is directed to travel in a multidirectional motion (up and down and sideways). In operation, the rotatable link 138 is substantially constantly rotated or driven by an electric motor. One suitable motor is a ¼ HP 480V three-phase motor having about a 1750 rpm output with a 2.2 ratio.

In addition, as shown in FIGS. 24E and 24G, the upper link 136 can be (pivotably) attached to the block 136*b* the link 136 can be (pivotably) attached to the platform 122 via a stationary mounting bracket 34. The spring 130*s* can be attached to the lower portion of the linkage 130L (proximate the connection to the rotatable link 138) on one end portion and the platform 122 (or bracket 34) at a location proximate the upper link 136 at the other end portion to help control/dampen and/or stabilize the motion generated by the winding mechanism 130".

FIGS. 24D and 24E also illustrate an arm configuration that can employ two overlying aligned and vertically spaced apart surfaces that define a roof or ceiling 21*r* and a corresponding floor 21*f*. In certain embodiments, the roof 21*r* and/or floor 21*f* may be formed from one or more conveyors (shown as two spaced apart endless conveyors) 23*u*, 23*l*. The lower conveyor 23*l* defines the floor 21*f* for food or other item over the arm travel path. The two surfaces 21*r*, 21*f* that may be defined by conveyors 23*u* (roof), 23*l* (floor) can be spaced sufficiently apart so as to define a gap therebetween 23*g*. The gap 23*g* can be sized so as to allow both conveyor primary surfaces (those facing each other) to contact the food in opposing locations in a manner that does not deform the shape of the food as it travels between the two surfaces 21*f*, 21*r* and/or conveyors 23*u*, 23*l*, but sufficiently close so as to help guide the food in the travel direction. In other embodiments, the gap 23*g* may be such that the roof, ceiling, or upper conveyor resides a distance above the food. The two conveyors 23*u*, 23*l* may be configured to move at the same speed. In certain embodiments, the speed of the conveyors may be operated between about 2–10 ft/sec, and in particular embodiments, at about 6.5 ft/sec linear movement. The conveyors 23*u*, 23*l* may be set to vary speed during operation and may be in communication with a variable speed or frequency controller from AC Tech. The drive motor may be configured similar to that described above for the winder mechanism 30. Although described as two endless conveyors, other configurations can also be used. For example, the floor 21*f* and/or roof 21*r* can be formed from more than one conveyor. In other embodiments, the roof can be comprised from 2 or more conveyors creating a channel configuration having a triangle or other multi-sided configuration. The floor can also comprise a plurality of conveyors also defining a multi-sided shape (such as a triangle, open square, hexagon, and the like). In addition, portions of the floor and/or ceiling may be configured as stationary components. Combinations of the above may also be used.

In other embodiments, the floor 21*f* of the arm 21 can be configured as a "V" or "U" shape (using a conveyor surface formed in that configuration or a plurality of conveyors spaced and oriented to define the desired shape) (not shown) to help hold the food therein as it travels along the arm. Combinations of the above may also be used.

Figure 25A:
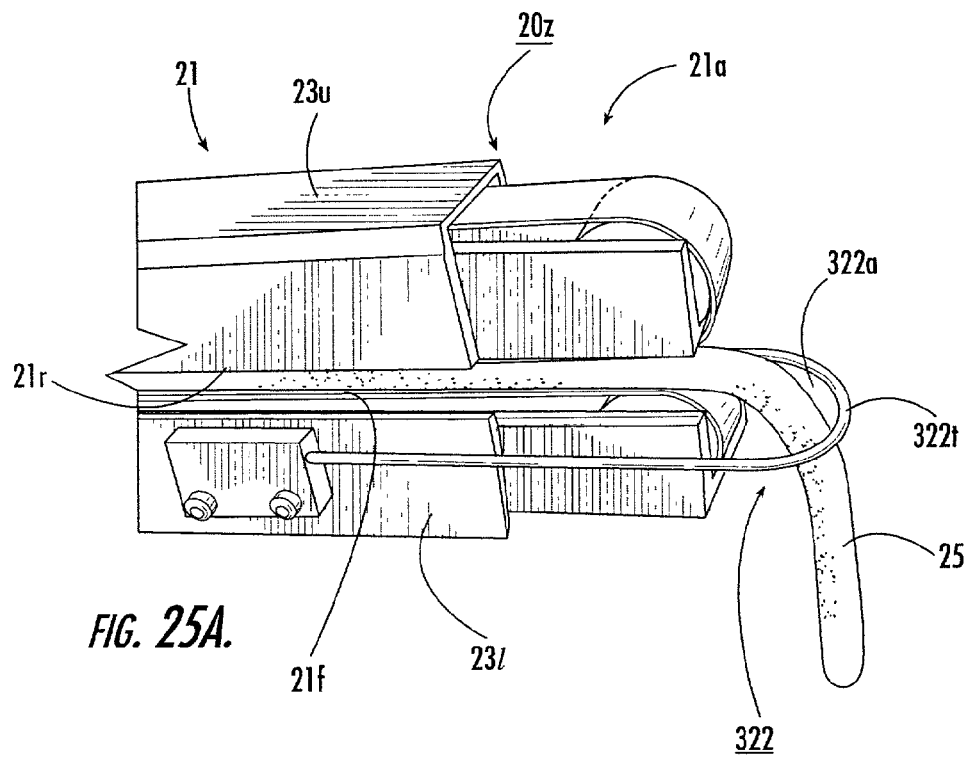
FIG. 25A is a side view of a discharge portion of the arm illustrating an end guide according to certain embodiments of the present invention.
Figure 25B:
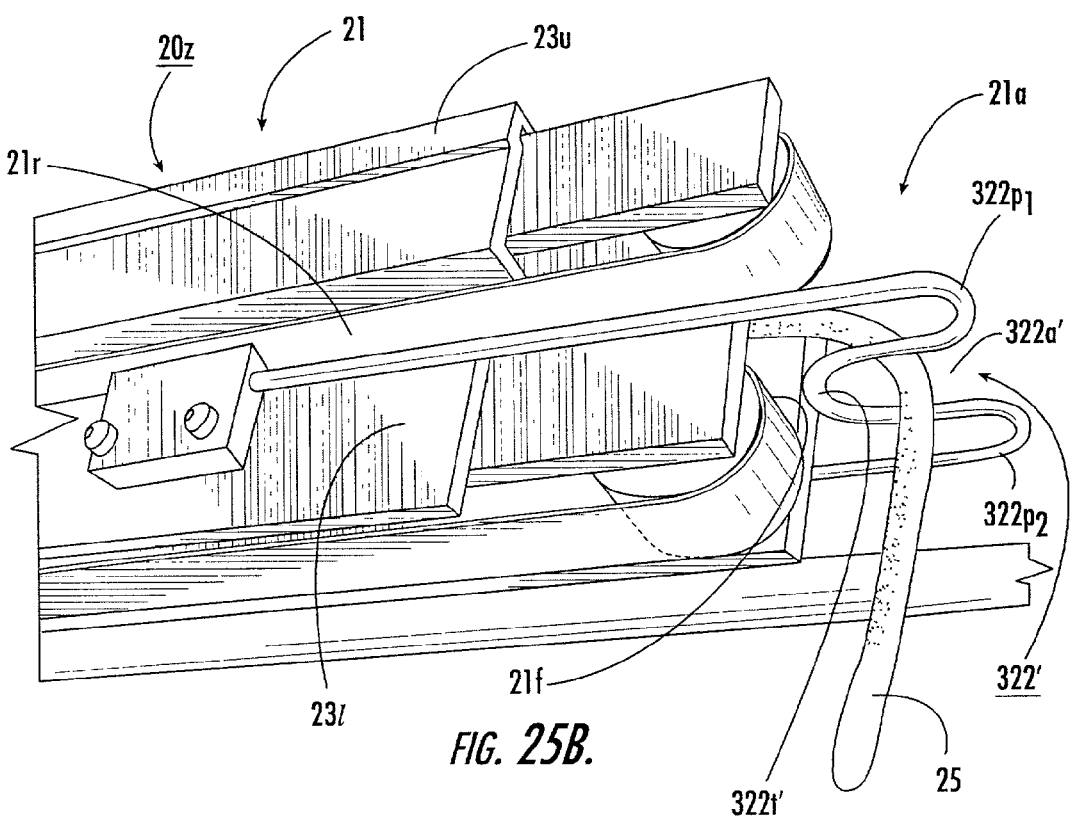
FIG. 25B is a side perspective view of an alternate configuration of an end guide according to certain embodiments of the present invention.

FIG. 25A illustrates that the distal end portion 21*a* of the arm 21 can be configured with an end guide 322 that helps to direct the movement of the food as it exits off the arm 21 during the winding operation as the arm moves in its desired winding motion pattern. In operation, the elongated item 25 (shown in broken line) travels through an aperture 322*a* defined by the end guide 322. The guide 322 may have an outer perimeter that is looped and defines a tongue 322*t* with an open center. FIG. 25B illustrates an alternate embodiment of an end guide 322'. The guide 322' includes an inwardly oriented tongue 322*t*' that defines the aperture 322*a*' and spaced apart prongs 322*p*₁, 322*p*₂. In this embodiment, in operation, the food 25 travels outwardly over the perimeter innermost portion of the tongue 322*t*. Other configurations of guides 322, 322' may also be used. The end guide 322, 322' is illustrated with the arm configuration that employs a ceiling or roof and floor 21*f*, 21*r*; however, the end guide 322, 322' is not limited thereto and may be used with any desired arm configuration. In certain embodiments, the end guide 322, 322' may be positioned proximate to and substantially vertically aligned with the floor 21*f*. In other embodiments, the end guide 322, 322' may be configured to extend outwardly at a vertical level that is below the floor 21*f*. In yet other embodiments, the end guide 322, 322' may be configured to rise above the floor 21*f*.

Figure 26A:
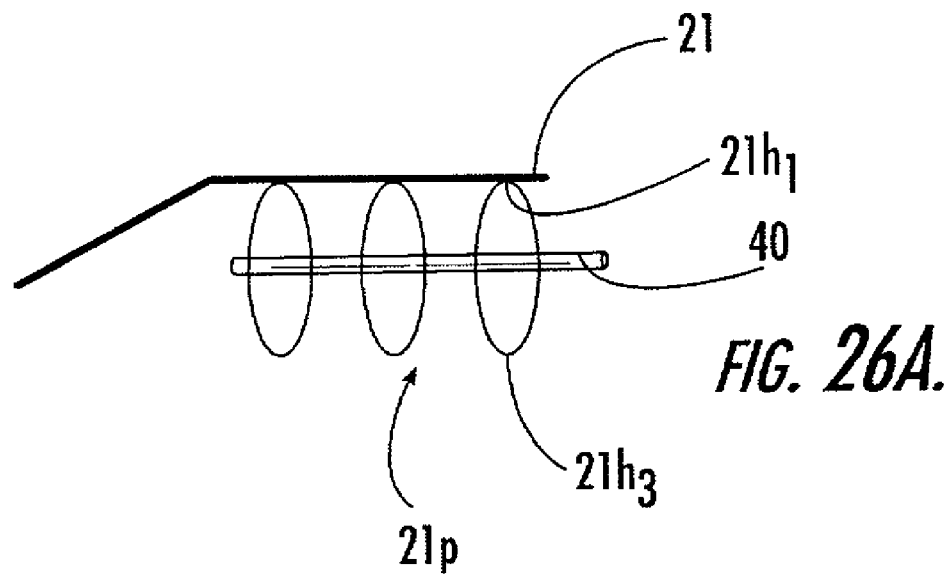
FIG. 26A is a schematic of a winding pattern according to embodiments of the present invention.
Figure 26B:
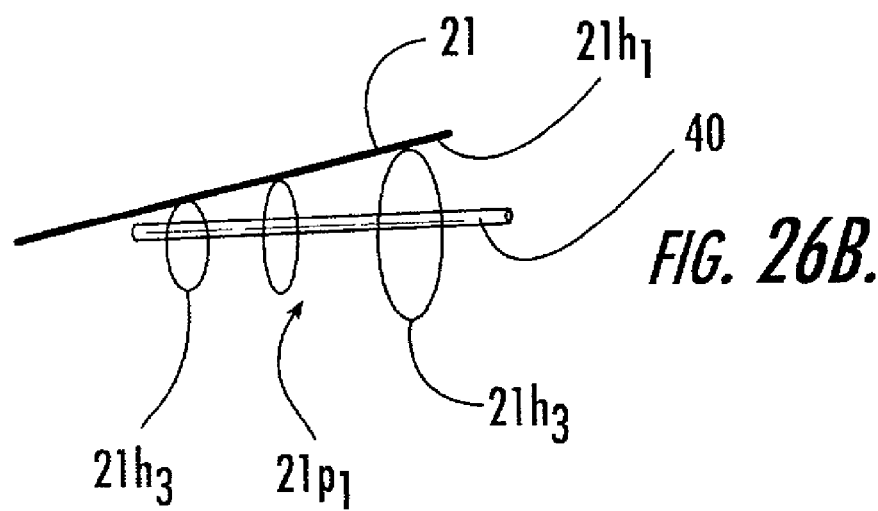
FIG. 26B is a schematic of another winding pattern according to embodiments of the present invention.

FIGS. 26A and 26B illustrate exemplary winding motion patterns 21*p*, 21*p*' contemplated by certain embodiments of the instant invention. FIG. 26A illustrates a pattern 21*p* that is substantially constant over the winding of the length of the loading member 40 and that the arm 21 can be held substantially planar (horizontal) as it moves through the winding motion. FIG. 26B illustrates that a variable winding motion pattern 21*p*' can be generated. As shown, the winding pattern 21*p*' increases or amplifies from left to right to have greater minima and maxima height $21h_1$, $21h_3$ at various positions along the loading member (or between different loading members or products and/or can increase from left to right). FIG. 26B also illustrates that the arm 21 may be inclined during the winding operation (the arm can also be declined or operated at various times to be a combination of inclined, declined, or level. In addition, the winding pattern 21*p*, 21*p*' can vary in other manners (shape or pattern) along the length of winding a particular carrier member 40 or vary for each or selected loading members or products.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is That which is claimed is:

1. A method for supplying and loading carrier members at a loading station comprising a winding mechanism with an associated winder arm, comprising:
    automatically advancing in spaced-apart relationship, a plurality of elongate carrier members having opposing first and second ends and an associated width and length, along a predetermined endless travel path to a loading station;
    presenting, in serial order, the carrier members to the loading station in a substantially horizontal orientation responsive to the automatic advancing step;
    discharging elongated product from a winder arm that moves in a selected pattern about the carrier member at the loading station;
    straddling elongated product over a generally horizontal length of each respective carrier member at the loading station responsive to the discharging step so that portions of the elongated product are automatically serially and directly draped over the respective elongate carrier member along a length thereof, the straddling being carried out so that certain lengths of the elongated product hang from opposing sides of the carrier member to define a plurality of generally horizontal suspension segments that contact the carrier member to suspend adjacent lengths of the elongated product that hang a distance down from the opposing sides of the carrier member, the suspension segments being axially spaced apart along a length of the carrier member; and
    automatically advancing the carrier members loaded with the straddled product away from the loading station with the carrier members held in a generally horizontal orientation along the predetermined travel path to cause the loaded members to travel downstream of the loading station.

2. A method according to claim 1, wherein the elongate carrier member is a rod, further comprising moving the respective carrier member linearly forward while the carrier member is held substantially horizontally at a desired speed during the discharging and straddling steps, whereby the suspension segments are draped along greater than a major length of the rod, with each neighboring carrier member being generally axially aligned as the respective neighboring loaded carrier members move downstream away from the loading station.

3. A method according to claim 1, wherein the carrier members are continuously moving forward held in a generally constant horizontal orientation along the predetermined travel path during the presenting, straddling and advancing steps.

4. A method according to claim 3, wherein the straddled product on the carrier member comprises a plurality of adjacent suspension segments, the method further comprising automatically pushing or pulling the straddled product on the carrier member so that adjacent segments are translated to reside closer together over a desired length of the carrier member during the discharging and straddling step used to load a respective carrier member while a respective carrier member is moving in a direction that is downstream of the loading station.

5. A method according to claim 3, wherein a portion of the predetermined travel path is curvilinear.

6. A method according to claim 4, wherein the pushing or pulling step comprises:
    moving at least one of the suspended segments on the carrier member in a predetermined direction at a first time; and then
    moving another one of the at least one of the suspended segments on the carrier member in the predetermined direction at a subsequent second time to move the suspended segments closer together on the carrier member.

7. A method according to claim 1, wherein the first and second advancing steps automatically move the carrier member along the predetermined travel path, and wherein the method further comprises pivotably rotating the carrier members during the first advancing step from a first orientation where the carrier member is held generally horizontal and substantially orthogonal to the direction of travel associated with the predetermined travel path to a second orientation wherein the carrier member is held generally horizontal and substantially parallel to the direction of travel associated with the predetermined travel path.

8. A method according to claim 7, wherein the elongate carrier members automatically pivot from the first orientation to the second orientation as they advance along a portion of the predetermined travel path in advance of the loading station.

9. A method according to claim 1, wherein each support member is a substantially linear rod having a length of at least about two feet.

10. A method according to claim 8, wherein the first and second advancing steps are performed substantially continuously to serially load a plurality of carrier members.

11. A method according to claim 1, wherein the first and second advancing steps automatically move the carrier members along the predetermined travel path, and wherein the travel path is defined by an associated predetermined endless travel track having a closed perimeter with a circuit length held by a carousel, and wherein the carrier members travel less than the entire circuit length of the predetermined travel track.

12. A method according to claim 11, wherein the closed perimeter track has a generally oval shape when viewed from the top, the method further comprising individually introducing empty carrier members to the predetermined travel track at a location that is upstream of the loading station.

13. A method according to claim 12, further comprising detaching the loaded carrier members individually from the predetermined travel track at a location that is downstream of the loading station.

14. A method according to claim 11, further comprising releasably holding a first end portion of the carrier member adjacent the predetermined travel track in a manner that allows the second end portion to pivot generally horizontally toward the carousel during at least the first advancing step.

15. A method according to claim 11, further comprising permanently holding a first end portion of the elongated member adjacent the predetermined travel track in a manner that allows the second end portion to pivot generally horizontally inward toward the carousel during at least the first advancing step.

16. A method according to claim 1, wherein the discharging step releases a pre-determined length of elongated product therefrom, and wherein the straddling step is carried out so that a continuous length of product extends intermediately between adjacent ones of the generally horizontally oriented loaded carrier members as the carrier members automatically move away from the loading station in spaced apart axial alignment along the predetermined travel path.

17. A method according to claim 16, further comprising automatically cutting the intermediate lengths of the product to separate product loaded on one loaded carrier member from product loaded on another adjacent loaded carrier member.

18. A method according to claim 1, wherein the carrier member has opposing trailing and leading edge portions and the winder arm has opposing product discharge and intake portions, wherein the straddling step is carried out by moving the winder arm in a path having a perimeter associated therewith, and wherein the first and second advancing steps are carried out so that the trailing edge of the carrier member moves forward in a generally horizontal orientation from a starting location that is proximate the winder arm intake portion and travels through the perimeter of the path of the winder arm during the straddling step.

19. A method according to claim 1, wherein the elongated product is an extruded product held in a casing.

20. A method according to claim 1, wherein the elongated product is a stuffed product held in a casing.

21. A method according to claim 1, wherein the elongated product is a meat product.

22. A method according to claim 21, wherein the elongated product is a continuous length of portioned or linked meat product.

23. A method according to claim 21, wherein the elongated product is a contiguous length of non-chain linked meat product.

24. A method according to claim 1, wherein the elongated product is a non-cased food product.

25. A method according to claim 6, wherein the first and second moving steps are carried out by serially pushing successive spaced apart suspended segments forward along the carrier member.

26. A method according to claim 6, wherein the first and second moving steps are carried out by serially pushing non-successive spaced apart suspended segments forward along the carrier member.

27. A method according to claim 6, wherein the first and second moving steps are carried out by directly contacting consecutive suspended segments.

28. A method according to claim 6, wherein the first and second moving steps are carried out by directly contacting a subset of the suspended segments.

29. A method according to claim 1, wherein the winder arm has a length with opposing product intake and discharge end portions, wherein the carrier member is an elongate member with opposing leading and trailing edge portions, and wherein the advancing and presenting steps are carried out to automatically serially position respective carrier members so that at the loading station at a beginning of the straddling step, the leading edge portion of the carrier member is downstream of the discharge end portion of the winder arm and the trailing edge portion of the carrier member is upstream of the discharge end portion of the winder arm, then during the straddling step each respective carrier member travels in a generally straight line for a distance that is at least a major portion of the winder arm length.

30. A method according to claim 29, wherein the winder arm travels over and side to side of the carrier member during the straddling step.

31. A method according to claim 30, wherein the winder arm loops the elongate product around the carrier member during the straddling step.

32. A method according to claim 29, wherein the carrier member is an elongate rod that is held generally horizontally and axially aligned with the direction of forward movement during the straddling step.

33. A method according to claim 1, wherein the carrier member predetermined travel path is defined by at least a portion of a mechanized curvilinear endless travel circuit having a perimeter that includes opposing first and second arcuate portions with linear portions therebetween, wherein the winder arm is positioned outside the perimeter of the endless travel circuit proximate a selected arcuate portion thereof, and wherein the advancing step comprises automatically moving the carrier members in concert so that as respective corner members move away from the selected arcuate portion of the endless travel circuit, a major portion of the carrier member is located downstream of a forward edge portion of the winder arm.

34. A method according to claim 1, wherein the carrier member is devoid of hooks.

35. A method according to claim 1, wherein the carrier member is a substantially straight rod having a length of at least about 2 feet, and wherein the winder arm has a length that is at least the length of the rod.

* * * * *

UNITED STATES PATENT AND TRADEMARK OFFICE
CERTIFICATE OF CORRECTION

PATENT NO. : 7,040,975 B2
APPLICATION NO. : 10/172331
DATED : May 9, 2005
INVENTOR(S) : Shefet et al.

It is certified that error appears in the above-identified patent and that said Letters Patent is hereby corrected as shown below:

On the Title Page,
Abstract 57, line 10 should read -- carrier member along a length thereof, the straddling being --

Column 32,
Line 37 should read -- respective carrier members move away from the selected --

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,040,975 B2 | Page 1 of 1 |
| APPLICATION NO. | : 10/172331 | |
| DATED | : May 9, 2006 | |
| INVENTOR(S) | : Shefet et al. | |

It is certified that error appears in the above-identified patent and that said Letters Patent is hereby corrected as shown below:

On the Title Page,
Abstract 57, line 10 should read -- carrier member along a length thereof, the straddling being --

Column 32,
Line 37 should read -- respective carrier members move away from the selected --

This certificate supersedes Certificate of Correction issued September 5, 2006.

Signed and Sealed this

Seventh Day of November, 2006

JON W. DUDAS
*Director of the United States Patent and Trademark Office*